United States Patent
Zeng et al.

(10) Patent No.: US 10,430,051 B2
(45) Date of Patent: Oct. 1, 2019

(54) MULTI-USER CONTENT PRESENTATION SYSTEM

(71) Applicant: Facebook, Inc., Menlo Park, CA (US)

(72) Inventors: Sharon Zeng, San Francisco, CA (US); Leo Litterello Mancini, Middle Village, NY (US); Dolapo Omobola Falola, London (GB)

(73) Assignee: Facebook, Inc., Menlo Park, CA (US)

( * ) Notice: Subject to any disclaimer, the term of this patent is extended or adjusted under 35 U.S.C. 154(b) by 672 days.

(21) Appl. No.: 14/983,142

(22) Filed: Dec. 29, 2015

(65) Prior Publication Data

US 2017/0185268 A1 Jun. 29, 2017

(51) Int. Cl.
G06F 3/048 (2013.01)
G06F 3/0484 (2013.01)
G06F 3/0488 (2013.01)

(52) U.S. Cl.
CPC ...... *G06F 3/04845* (2013.01); *G06F 3/04842* (2013.01); *G06F 3/04883* (2013.01)

(58) Field of Classification Search
CPC ............. G06F 3/04845; G06F 3/04847; G06F 3/04882; G06F 3/04842
See application file for complete search history.

(56) References Cited

U.S. PATENT DOCUMENTS

| | | | | |
|---|---|---|---|---|
| 2011/0205163 A1* | 8/2011 | Hinckley | ............. | G06F 3/0483 345/173 |
| 2011/0280497 A1* | 11/2011 | Berger | ............. | G06F 17/30274 382/306 |
| 2012/0176401 A1* | 7/2012 | Hayward | ............. | G06T 3/0093 345/619 |
| 2013/0141009 A1* | 6/2013 | Jin | .................... | H05B 33/0863 315/292 |
| 2013/0235071 A1* | 9/2013 | Ubillos | ................. | G06F 3/0484 345/600 |
| 2013/0339907 A1* | 12/2013 | Matas | ..................... | G06T 11/60 715/853 |
| 2015/0172534 A1* | 6/2015 | Miyakawa | ......... | H04N 5/23216 348/222.1 |
| 2016/0188181 A1* | 6/2016 | Smith | .................... | G06F 3/048 715/765 |
| 2016/0267094 A1* | 9/2016 | Darnell | ............... | G06F 17/3089 |
| 2016/0277802 A1* | 9/2016 | Bernstein | ........... | H04N 21/4788 |
| 2016/0283106 A1* | 9/2016 | Thorne | ............... | G06F 3/04886 |
| 2017/0199652 A1* | 7/2017 | Campbell | ........... | G06F 3/04845 |

* cited by examiner

Primary Examiner — Andrew T Chiusano
(74) Attorney, Agent, or Firm — Keller Jolley Preece

(57) ABSTRACT

One or more embodiments of the disclosure provide systems and methods for providing content presentations to users of a content presentation system. A content presentation generally includes a plurality of content items provided by one or more users of the content presentation system. In one or more embodiments, the content presentation system may enable a user to modify multiple content attributes using a simple gesture. In addition, the content presentation system can provide users dynamic and interactive notifications that correspond to content items and/or other co-user activities within the content presentation system.

20 Claims, 25 Drawing Sheets

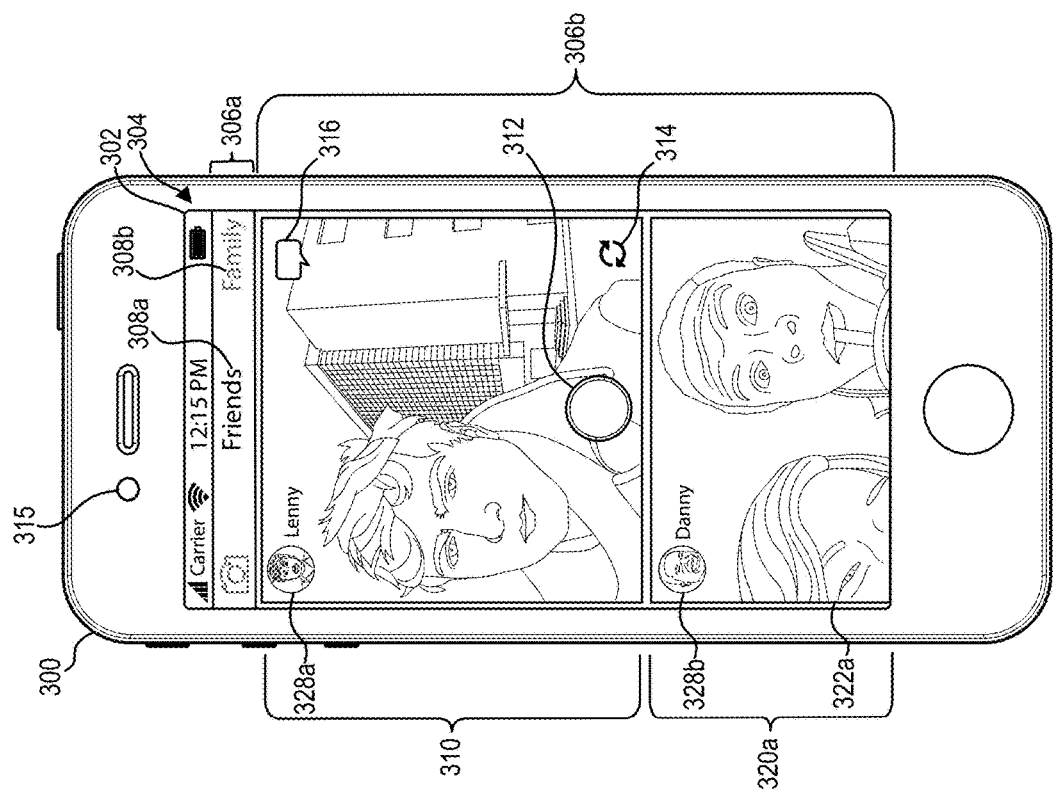

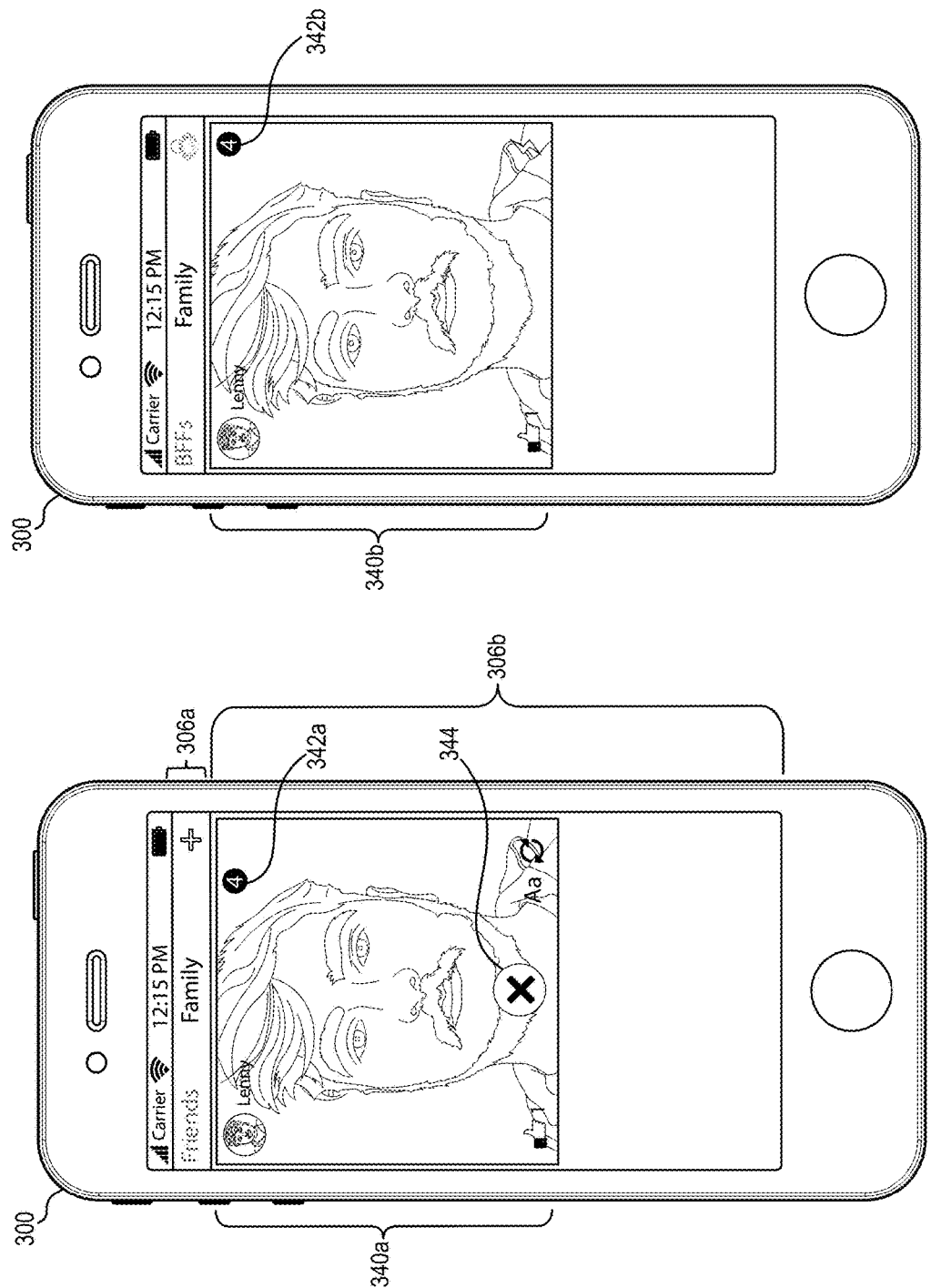

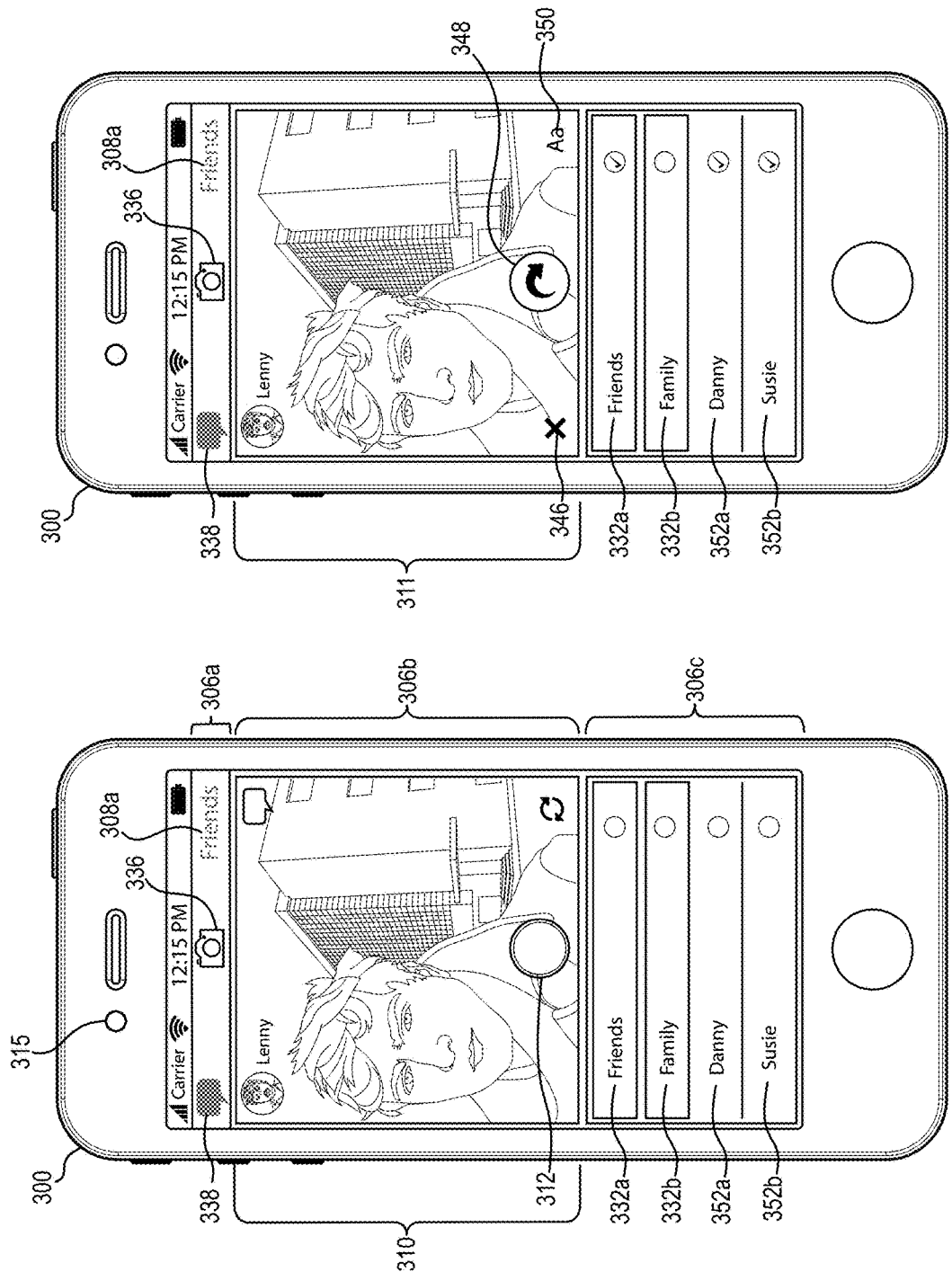

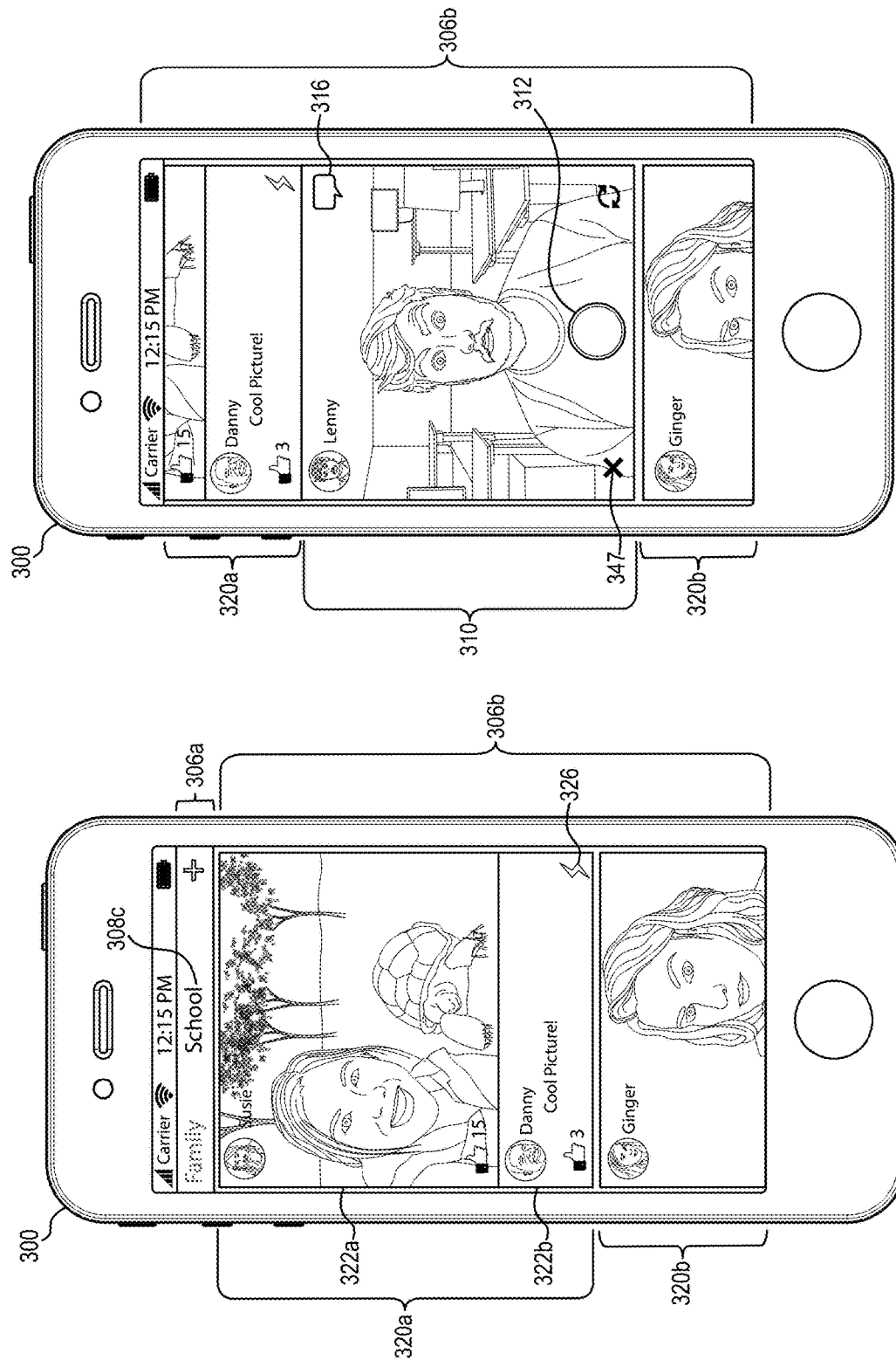

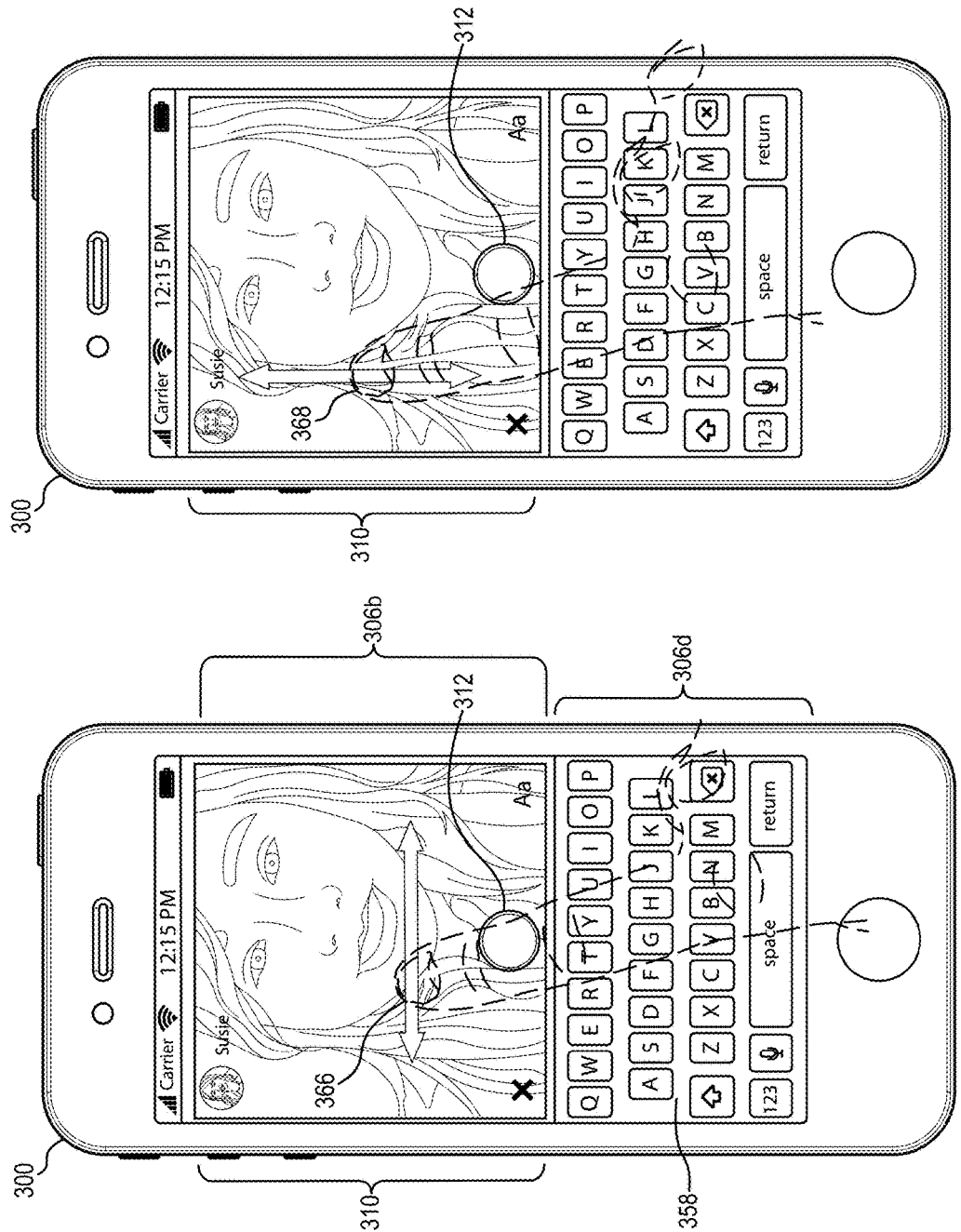

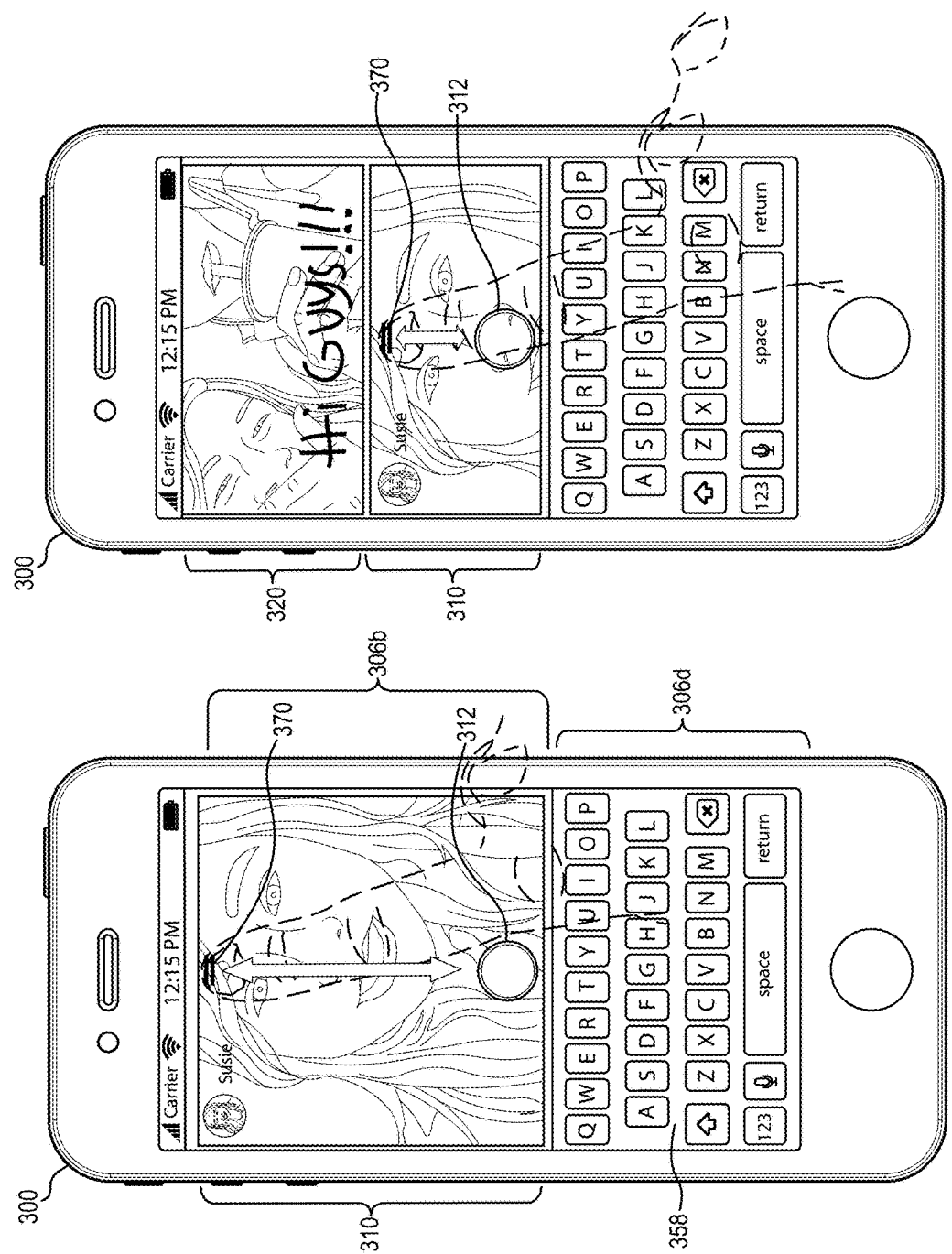

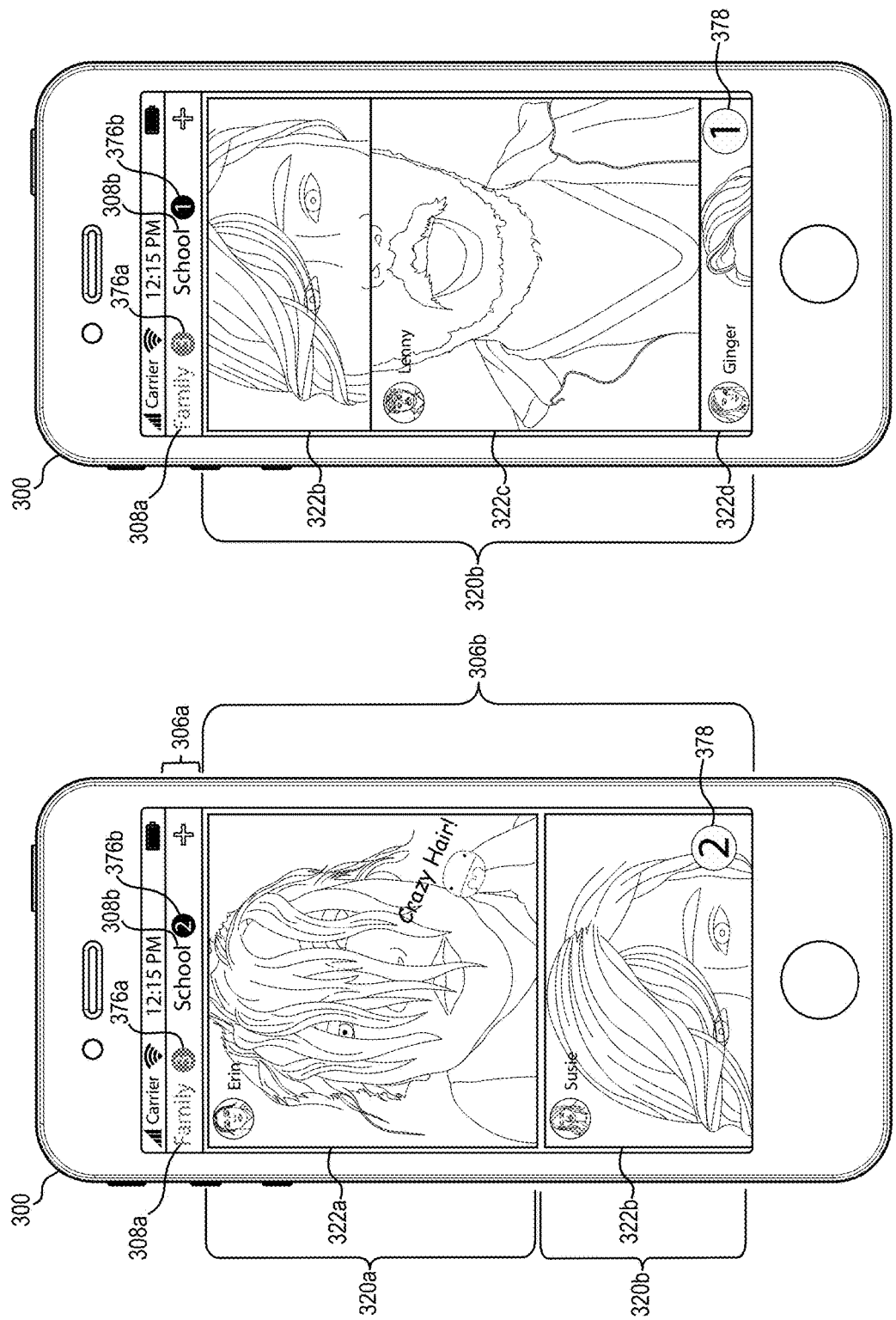

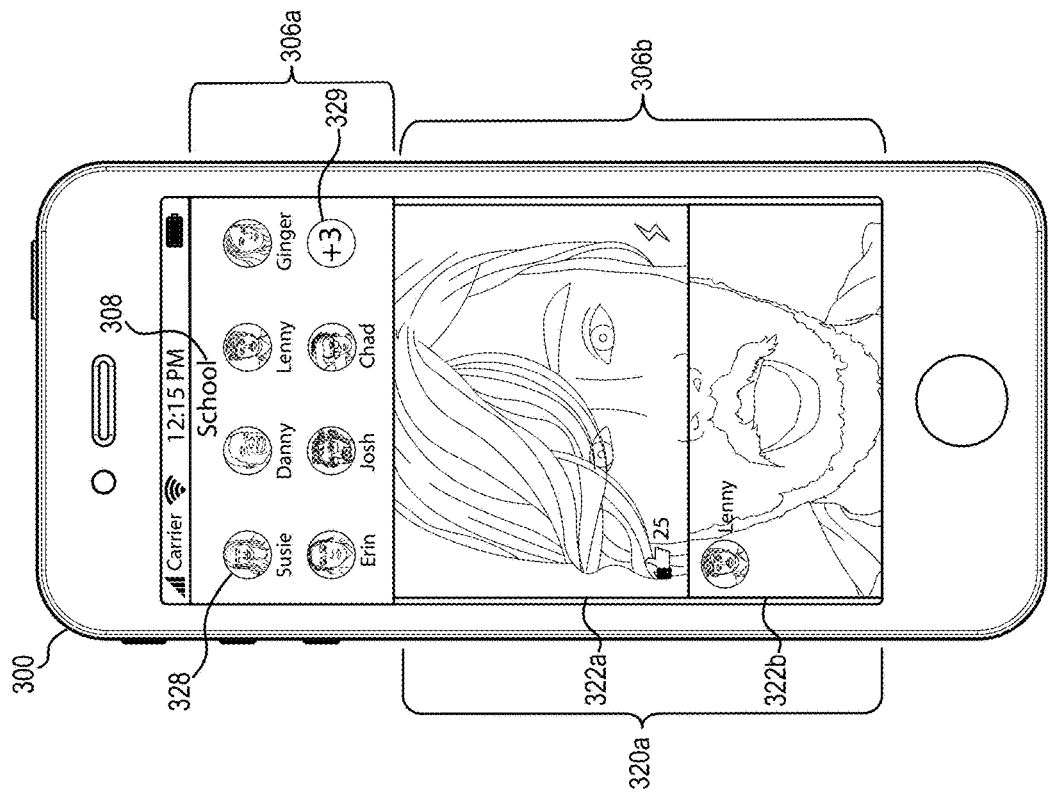
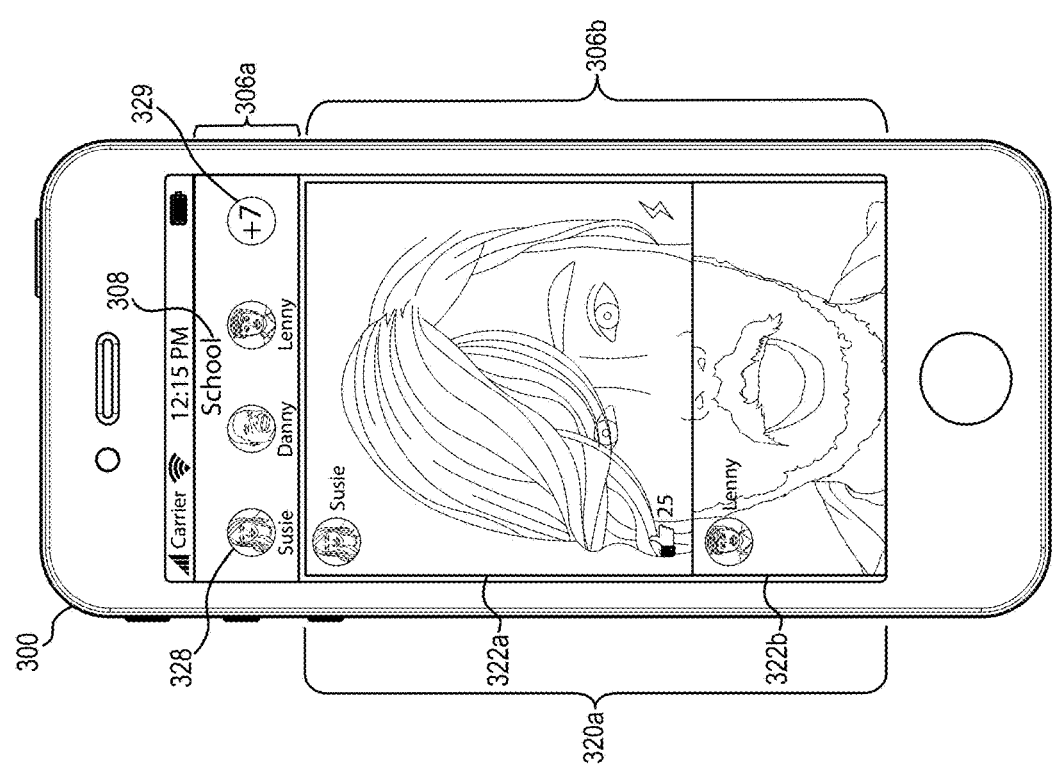

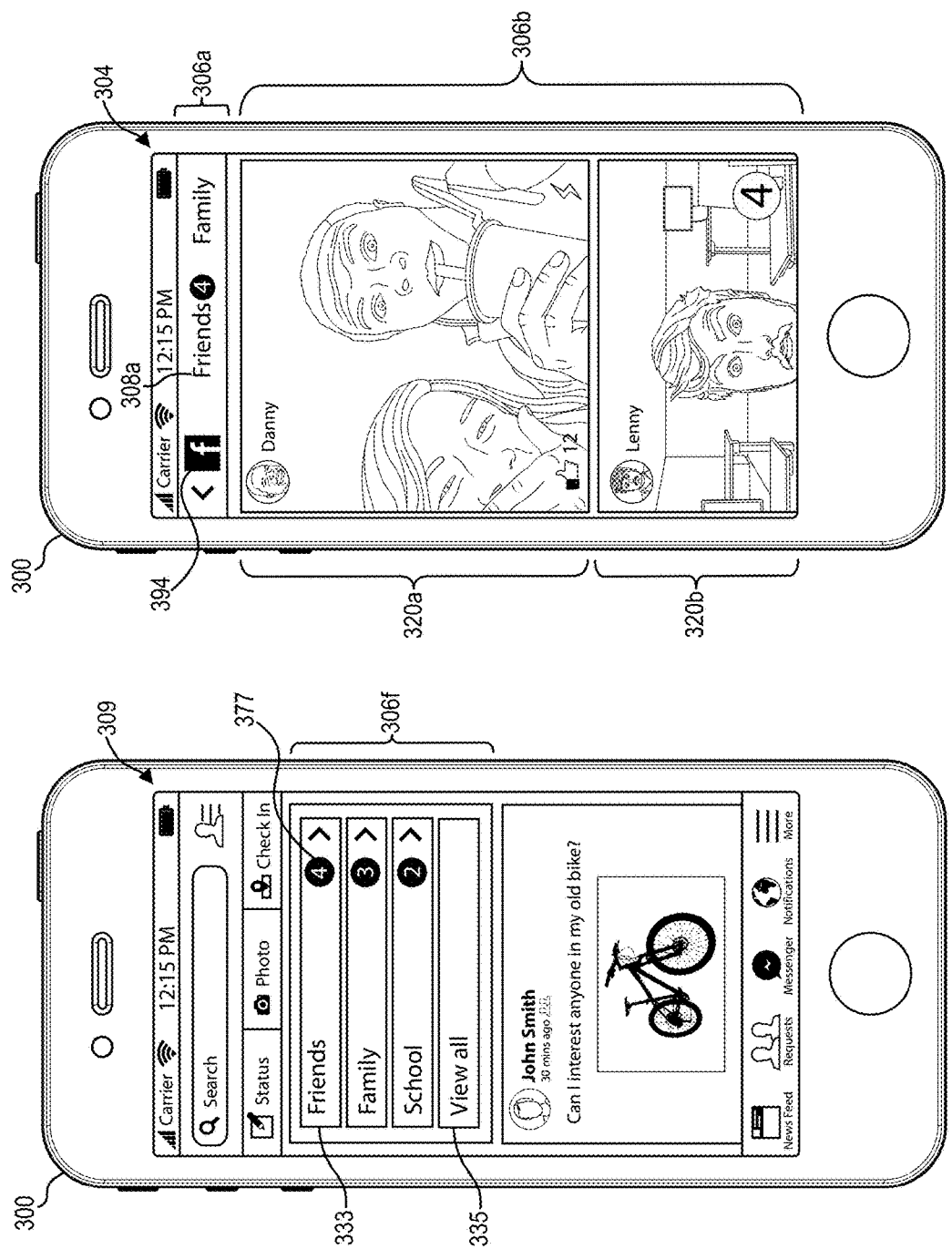

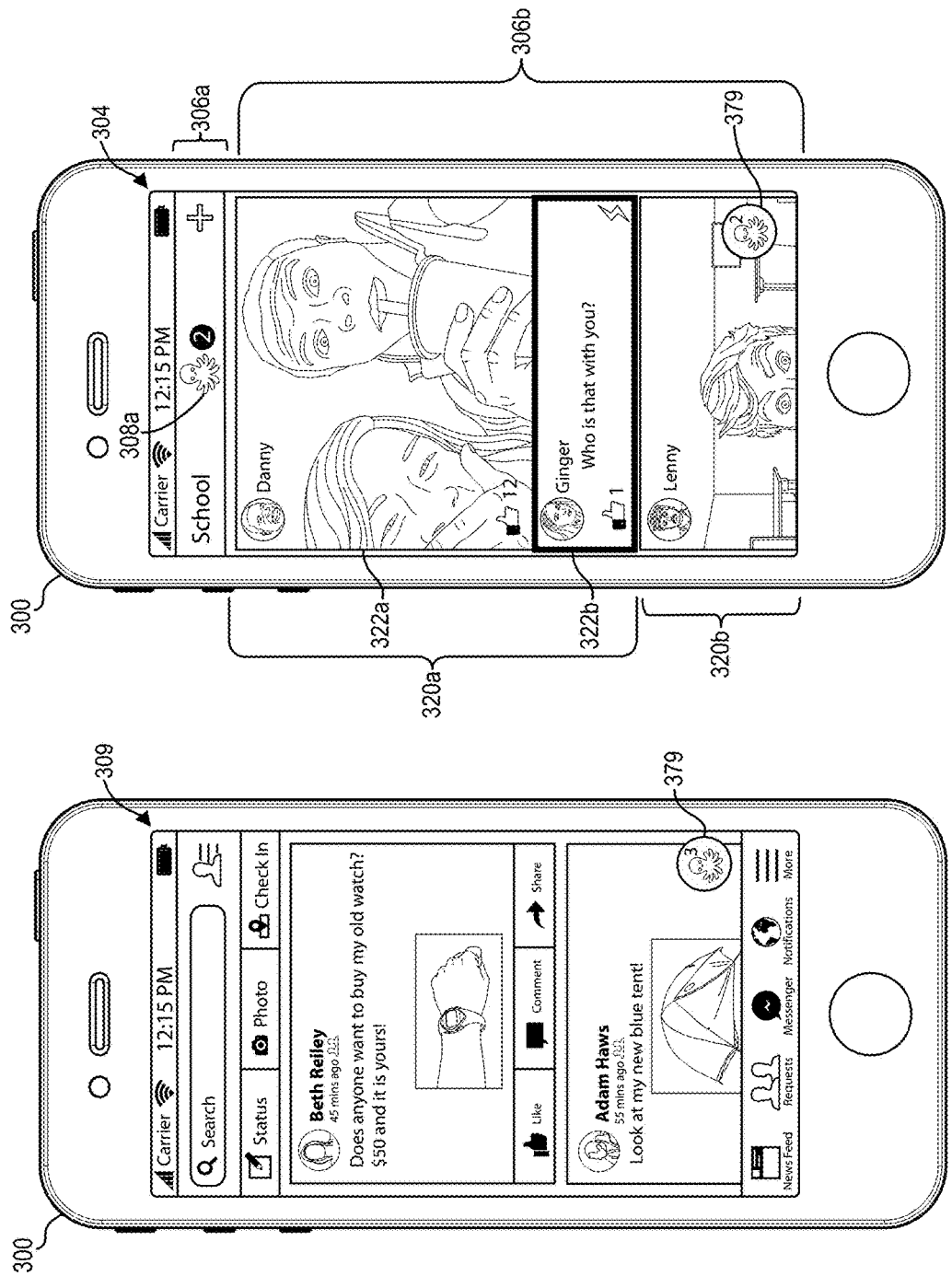

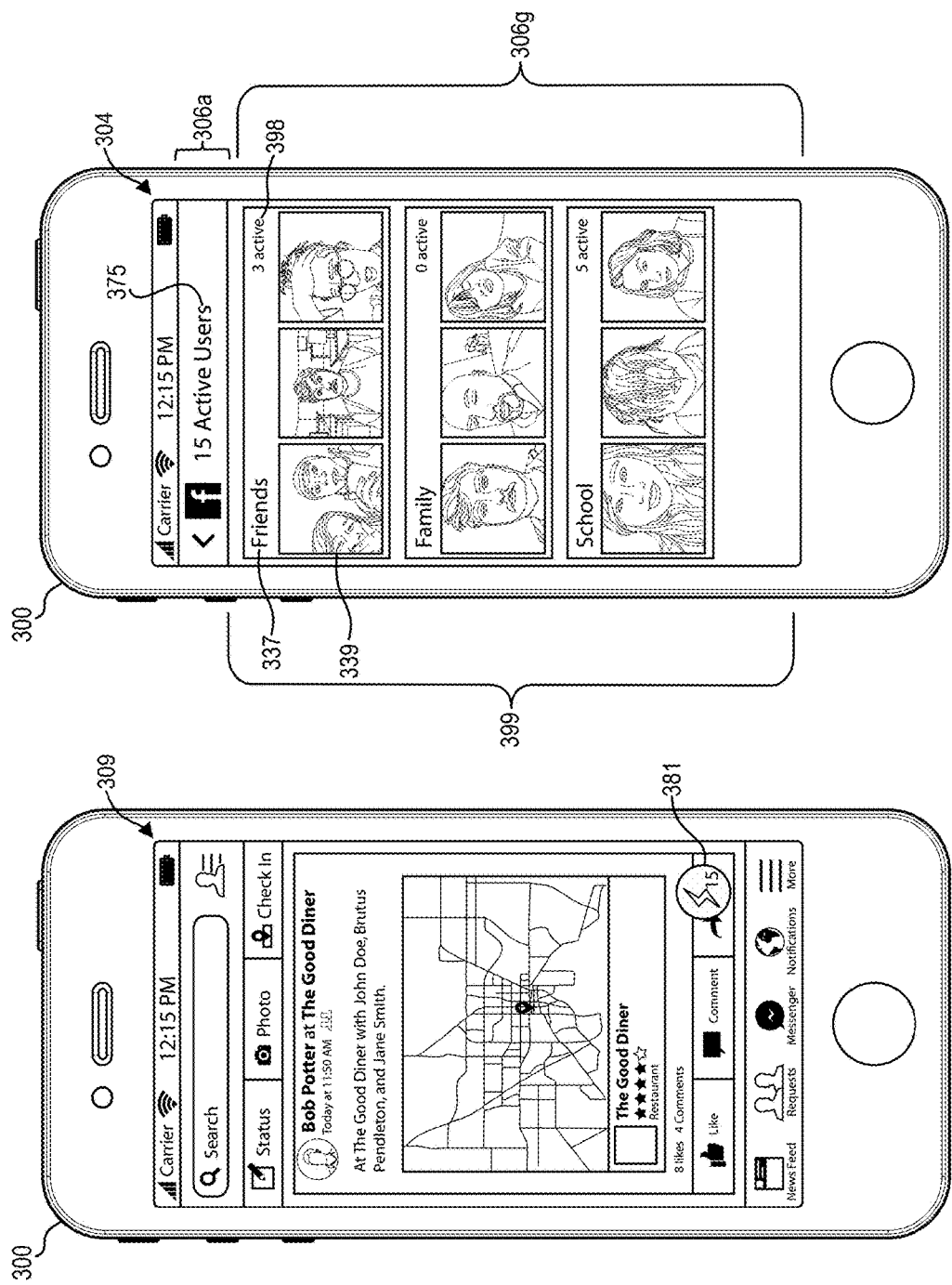

MULTI-USER CONTENT PRESENTATION SYSTEM

BACKGROUND

1. Technical Field

One or more embodiments relate to systems and methods for capturing and providing media content between multiple users. More specifically, one or more embodiments of the present invention relate to systems and methods for capturing content within content items and distributing the content among multiple users.

2. Background and Relevant Art

Advancements in computing devices and computing technology provide users with the ability to share user-generated media with other users. As such, users are increasingly capturing and sharing media using various computing devices. To illustrate, modern mobile devices enable users to capture media, such as pictures, videos, audio, and text. Further, a user can share user-generated media with a group of friends via a variety of communication systems (e.g., IM, text, or social networks).

Despite advances in technology, a number of drawbacks remain for a user wanting to share user-generated media with other users. For example, conventional communication systems that allow users to share user-generated media often provide a cluttered and confusing presentation of the shared content. To illustrate, a user can create a new media post upon sharing a picture or video with a group of co-users. One or more co-users in the group may respond to the post by sharing another picture or video with the group in an additional post. Accordingly, the user, the co-user, and other co-users in the group can continue to share pictures and/or videos in separate posts. As the number of shared pictures and shared videos increase, conventional systems typically create lists of response posts, which can become long, cluttered, and difficult to navigate.

Another disadvantage is that conventional systems are often directed toward media posts that are focused on an individual user. In other words, conventional systems often provide a thread of posts that focus on interactions between a user that created the post and the other co-users interacting with the user, rather than a group of users interacting with each other as a group. As such, many conventional systems do not provide an environment where a group of users can co-create and share group-created media with each other as a group. Therefore, conventional systems often fail to create a true group environment that supports and creates a sense of togetherness for a group as a whole.

In addition, many conventional systems often include substantial user interface friction that results is a poor user experience, especially when offering users the ability to access additional features that can customize a user's electronic communications. For example, conventional systems often include bulky user interface flows that require users to perform several time-consuming and frustrating steps when creating, editing, or modifying content. For example, a user modifying content attributes may need to perform two, three, or more steps within a conventional system user interface to modify a single content attribute. Because of the hassle and inconvenience of the several steps, users will often forgo performing the function rather than performing the several steps, resulting in less customized and more generic communications between users.

Further, bulky user interfaces can also led to increases in operational time for a user to create, view, or otherwise experience electronic communication. For example, conventional systems often have separate user interfaces that must be accessed to complete a particular function (e.g., create content, view content, edit content, etc.). Therefore, each time a user wishes to perform a different function, many conventional systems have to load a new user interface, access content, and populate the loaded user interface with the content. The process of changing from one user interface to the next and waiting for content to load each time a user accesses a different user interface can create time lags, thus frustrating a user and reducing the quality of the user experience.

Accordingly, there are a number of considerations to be made in improving a user experience in relation to creating and sharing electronic communication with one or more users.

SUMMARY

One or more embodiments described herein provide benefits and/or solve one or more of the foregoing or other problems in the art with systems and methods of creating and viewing collaborative media content between users. For example, principles described herein provide systems and methods that allow a user to create, contribute to, and view content presentations that include content items generated and provided by users associated with a defined group. In particular, one or more embodiments described herein include systems and methods for reducing the complexity and number of steps necessary to modify attributes of content within a content item. In addition, the principles described herein provide systems and methods for notifying a user of new content items and intelligently navigating a user to the new content items within a content presentation without the need of navigating between multiple user interfaces.

In general, the systems and methods disclosed herein allow a group of users to create and share collaborative content presentations. For example, the systems and methods enable a user in a group of users to easily create a new content presentation, or append additional content to an existing content presentation created by another user. In addition, the systems and methods disclosed herein provide a graphical user interface that enables efficient navigation between content presentations within a presentation feed of content presentations, as well as navigation between various presentation feeds associated with different groups of users (e.g., a family presentation feed, a friends presentation feed, a school presentation feed etc.) In this manner, the systems and methods disclosed herein provide for efficient and intuitive navigation within a presentation feed as well as between multiple presentation feeds.

Further, the systems and methods disclosed herein enable a user to easily modify content of a content item within a content presentation, without requiring the user to perform extra steps. For example, based on a single gesture, such as a touch gesture, the systems and methods can detect multiple user inputs and modify a plurality of content attributes associated with a content item. Further, the systems and methods disclosed herein can provide continuous real-time visual feedback showing the modifications to the content attributes as the user provides the simple gesture.

As another example, the systems and methods disclosed herein enable a user to quickly navigate and experience content presentations in a manner that minimizes user interface friction (e.g., reduces the amount of steps a user must perform to accomplish a task), reduces user interface lag and overall loading time, and thus increases the quality of the user experience. In particular, in one or more embodiments a user interacts with a notification corresponding to one or more content items within a presentation feed, the systems and methods intuitively navigate to the corresponding content item without leaving the presentation feed. Further, the systems and methods can provide additional visual cues to assist a user in identifying new content. Overall, the systems and methods disclosed herein allow a user to navigate through content items within a presentation feed in an intuitive, efficient, and enjoyable manner.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of one or more embodiments can be obtained, a more particular description will be rendered by reference to specific embodiments thereof that are illustrated in the accompanying drawings. It should be noted that the figures are not drawn to scale, and that elements of similar structure or function are generally represented by like reference numerals for illustrative purposes throughout the figures. These drawings depict only typical embodiments, and are not therefore considered to be limiting of its scope. Accordingly, various embodiments will be described and explained with additional specificity and detail using the accompanying drawings.

FIGS. 3A-3E illustrate an exemplary graphical user interface showing example presentation feeds in accordance with one or more embodiments described herein;

FIGS. 4A-4B illustrate an exemplary graphical user interface showing an example process of sharing a content item in accordance with one or more embodiments described herein;

FIG. 5A-5D illustrate an exemplary graphical user interface of an example process of adding content items to content presentations within a presentation feed in accordance with one or more embodiments described herein;

FIGS. 7A-7B illustrate an exemplary graphical user interface for modifying content within a content item using simple touch gestures in accordance with one or more embodiments described herein;

FIGS. 8A-8B illustrate an exemplary graphical user interface for resizing a content item within a presentation feed in accordance with one or more embodiments described herein;

FIGS. 10A-10D illustrate an exemplary graphical user interface for providing notifications to a user and navigating to specific content items based on the user's interaction with the notifications in accordance with one or more embodiments described herein;

FIGS. 11A-11B illustrate an exemplary graphical user interface for displaying co-users within a presentation feed in accordance with one or more embodiments described herein;

FIGS. 16A-16B illustrate an exemplary graphical user interface for providing notifications to a user within a social networking system in accordance with one or more embodiments described herein;

FIGS. 17A-17B illustrate another exemplary graphical user interface for providing notifications to a user within a social networking system in accordance with one or more embodiments described herein;

FIGS. 18A-18B illustrate still another exemplary graphical user interface for providing notifications to a user within a social networking system in accordance with one or more embodiments described herein;

DETAILED DESCRIPTION

Figure 1:
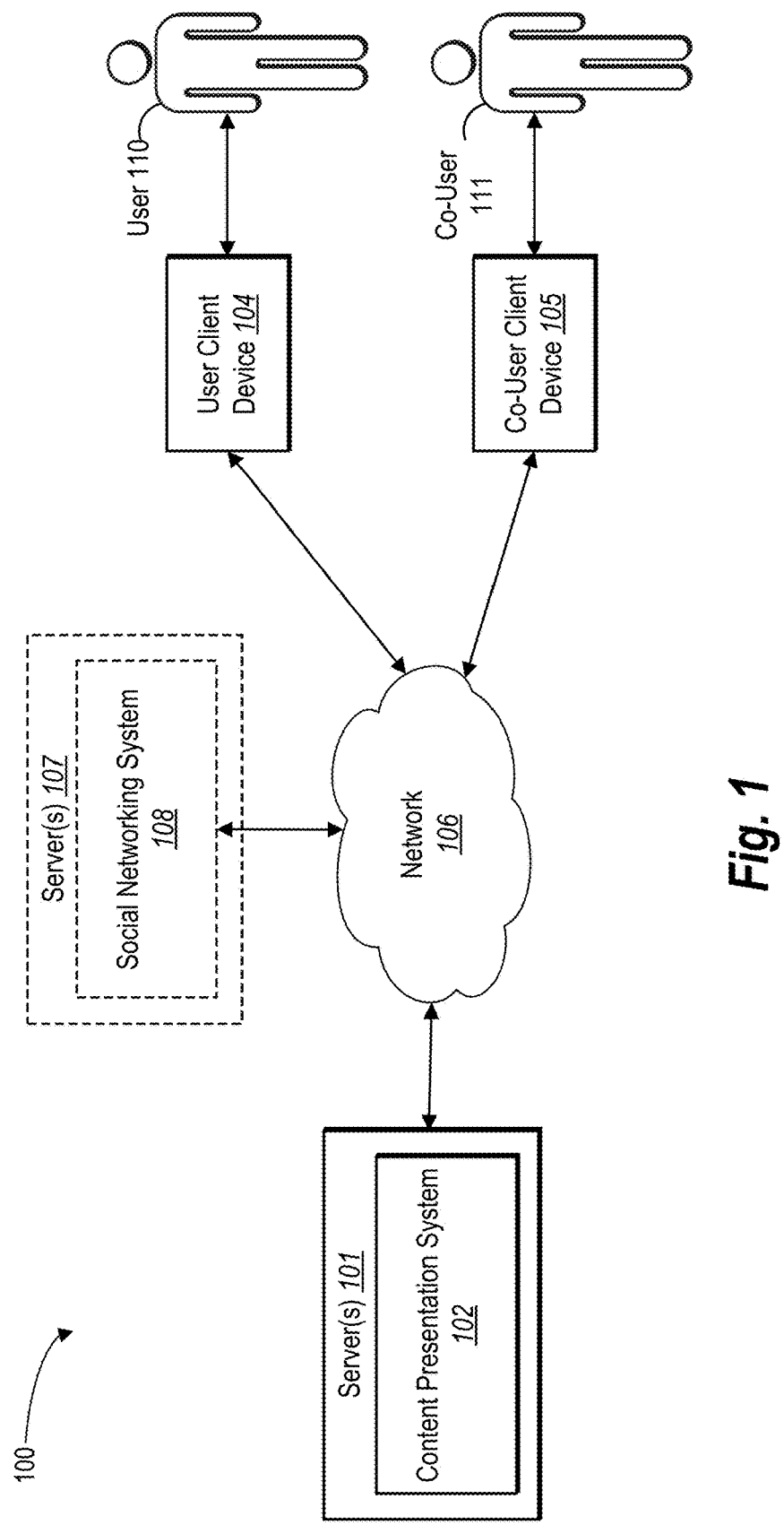
FIG. 1 illustrates a schematic diagram of a communication system in accordance with one or more embodiments described herein.

Embodiments disclosed herein provide benefits and/or solve one or more of the abovementioned or other problems in the art with a content presentation system that improves a user's experience for creating and participating in collaborative multimedia conversations with other users. In general, the content presentation system easily allows a user to receive, view, contribute to, and create content presentations, which include one or more content items. More specifically, one or more embodiments of the content presentation system enable a user to easily modify one or more properties of content within a content item using a single touch gesture. Additionally, in one or more embodiments, the content presentation system provides an intuitive graphical user interface that allows a user to efficiently navigate to and view content items in a presentation feed with respect to notifications.

In general, one or more embodiments of the content presentation system allow users in a group to create, collaborate, and share content presentations with each other. For example, a number of friends, classmates, teammates, or coworkers may form a group and share content items (e.g., pictures, texts, graphics, videos, live video streams, etc.) between members of the group. For each group of users, the content presentation system can organize content presentations shared by members of the group within a presentation feed associated with the group. To illustrate, if a user is member of three different groups (e.g., friends, family, and classmates), the content presentation system can provide a presentation feed for each group, where each presentation feed includes content presentations provided by members of the respective groups.

In one or more embodiments, a user can create content items, such as pictures, texts, graphics, videos, live video streams, etc., which the user can then share with other users in one or more groups. As part of creating a content item, the user can add, edit, and remove content within the content item. As further described below, the content presentation system enables the user to change a plurality of attributes and properties of the content with simple gestures, such as single touch gestures or click gestures.

As an example, in some embodiments, the content presentation system enables a user to change the color and transparency of a content item using a single touch gesture. For instance, prior to a user sharing an image with a group of users, the user may add color (e.g., a color layer) to the image. In particular, the user may interact with the image with a selection element (e.g., initializing a touch gesture with a finger) to add a color layer. Further, the user may move the selection element in a first manner (e.g., a radial movement), and change the color of the color layer based on the movement of the selection element in the first manner.

The content presentation system may adjust other attributes based on different manners of movement. For example, based on the same interaction (e.g., the same touch gesture) the user may move the selection element in a second manner (e.g., a linear movement) to modify the transparency levels of the color, ranging from fully transparent to fully opaque. Accordingly, as the user provides continuous user input (e.g., a single continuous touch gesture), the content presentation system may enable the user to change multiple content attributes with a single gesture. Further, the content presentation system can provide a real-time preview to the user of the modified image.

As another example, the content presentation system can allow a user to modify user-generated enhancements to a content item with a single gesture. For example, in one or more embodiments, the user selects user-generated text within a content item with a selection element (e.g., initializing a touch gesture with a finger). While the text is selected, as the user moves the selection element in a circular manner, the content presentation system may change the color of the text. Further, as the user moves the selection element in a linear manner away from the text, the content presentation system can modify the saturation of the currently selected text color. As the user moves the selection element, the content presentation system may enable the user to view a real-time preview of the text. Then, upon releasing the selection element, the text may retain the last color and color saturation level selected by the user. Thus, in providing a single continuous gesture, the user can modify multiple properties of a content item before sharing the content item with other users.

In addition to easily and efficiently modifying and customizing content items, one or more embodiments of the content presentation system provides a intuitive and easy to use notifications to alert and direct a user to content items that are of interest to the user. For example, the content presentation system can provide a notification of the new content item to a user in the presentation feed when another user in a group posts a new content item. In addition, when multiple new content items are posted in the same presentation feed the content presentation system may display a notification indicating multiple new content items in the presentation feed, for example, by displaying a number that indicates the quantity of new content items in the presentation feed. Further, the content presentation system can provide distinct notifications corresponding to new content items for each presentation feed.

In one or more example embodiments, in response to a user selecting a notification, the content presentation system can navigate the user within the presentation feed to one of the new content items that correspond to the notification. In doing so, the content presentation system does not jump between user interfaces, but rather just moves within the content presentation feed and/or content presentation within a the content presentation feed to present the particular content item. As such, and different from conventional systems, the content presentation system does not load additional user interfaces. Rather, the content presentation system directly navigates to a content item corresponding to the notification without exiting the presentation feed.

When a notification within a presentation feed relates to multiple new content items, the content presentation system can navigate to each new content item within the presentation feed as the user interacts with (e.g., selects) the notification. Further, in one or more embodiments, the content presentation system can decrease the displayed number each time the content presentation system navigates to an unviewed content item. When the user has viewed all of the content items that correspond to the notification, the notification within the presentation feed can disappear. Likewise, if the user is viewing content items within a presentation feed and a new content item is added to the presentation feed, the content presentation system can increase the number displayed in the notification.

While the content presentation system can provide one or more notifications within presentation feeds, in one or more embodiments, the content presentation system can provide notifications in additional systems, such as a communication system. For example, in one or more embodiments the content presentation system provides a notification (e.g., the same or similar notification that is described in the preceding paragraph) in the newsfeed of a social networking system. Upon selecting the notification from within the social networking system, for example, the content presentation system can respond by navigating to the presentation within the presentation feed while also continuing to display the notification. Then, as described above, a user can continue to interact with the notification to seamlessly navigate the user to additional content items within the presentation feed corresponding to the notification (e.g., any unviewed content items). In this way, the content presentation system can provide a notification that bridges a user experience by allowing a user to interact with a notification outside of a presentation feed to navigate to a presentation feed, and then continuing to provide the same notification after navigating to the presentation feed to allow the user to continue to interact with the same notification to navigate to other content items within the presentation feed. The below description will describe the above general features and advantages in additional detail.

The term "content," as used herein refers to digital data that may be transmitted over a communication network. Examples of content include, but are not limited to, digital media, text, digital photos, messages, digital video files, digital audio files, and/or streaming media. Accordingly, content may refer to images, video, audio, text, animations, or any other audio/visual content that may be transmitted over a communication network. In addition, examples of content can include user-generated content (e.g., content that a user captures using a capturing feature of a smart phone, such as digital photos or videos) as well as nonuser-generated content (e.g., content generated by a party other than a user, but to which the user has access). Further, content can be transmitted in various forms using various types of technology. Moreover, a content presentation system can transmit content in the form of a discrete file, or additionally, the content presentation system can send content in the form of streaming digital content (i.e., a media stream).

The term "content item," as used herein refers generally to a discrete portion of content. A content item may include an image, text, video segment, and/or an audio segment. For example, a content item can include multiple types of content, e.g., a digital image overlaid with user-generated text. As another example, a content item may include a digital video clip that includes audio.

As used herein, the term "content presentation" refers to a defined set of one or more content items. For example, a content presentation can include a plurality of content items contributed by one or more users. As such, in one or more embodiments, a content presentation can include a compilation of content items composed by multiple users. For example, a content presentation may include a thread of related content items captured by one or more users in a conversation with each other about a particular topic. Additionally, a content presentation can include a single content item, provided by a user (e.g., the creation of a new content presentation), to which other users can append one or more additional content items.

Further, as used herein, the term "presentation feed" refers generally to a collection of one or more content presentations that are presented to a user. For example, a client device can present a user with a presentation feed that includes multiple content presentations. A presentation feed can be associated with a user group, as described below. Additionally, a client device may present a user with multiple presentation feeds. In such instances, the client device enables a user to navigate between the multiple presentation feeds. Further, content presentation feeds can be organized in a variety of manners, such as chronologically, alphabetically, by topic, by user, by channel, etc.

As used herein, the terms "interact" or "interacting" refer generally to any type of interface activity between a user and a client device. For example, interacting can include a user viewing, browsing, accessing, and/or otherwise experiencing content. Moreover, interacting can include selecting graphical elements shown on a client device (e.g., with a selection element), such as selecting menu options or graphical buttons to create a content presentation or add a content item to an existing content presentation. For instance, a user can interact with a client device to capture a content item, replay a captured content item, approve a captured content item, add a captured content item to a content presentation, or cancel capture of a content item. In one or more embodiments, a user can interact with a client device using one or more user input devices, such as a touch screen, touchpad, or mouse, as described below.

FIG. 1 illustrates an example embodiment of a communication system 100 (or simply, "system 100") in accordance with one or more embodiments described herein. As shown, the system 100 may include one or more server(s) 101 comprising a content presentation system 102, a user client device 104, and a co-user client device 105 (collectively "client devices"), that are communicatively coupled through a network 106. Although FIG. 1 illustrates a particular arrangement of the content presentation system 102, client devices 104/105, and the network 106, various additional arrangements are possible. For example, the user client device 104 may directly communicate with the content presentation system 102, bypassing the network 106.

Optionally, the system 100 may include one or more server(s) 107 that include a social networking system 108. When the system 100 includes the social networking system 108, users of the social networking system 108 may be able to use the features and functionalities of the content presentation system 102, as described herein, via the social networking system 108. In some example embodiments, the content presentation system 102 may be a part of, or directly connected to, the social networking system 108. In other example embodiments, the content presentation system 102 is separate from the social networking system 108, but users of the social networking system 108 can access the content presentation system 102 via the social networking system 108.

In the event the content presentation system 102 interfaces with the social networking system 108, the user 110 and/or the co-user 111 may have accounts with the social networking system 108. For example, the co-user 111 may authorize the content presentation system 102 to access the social networking system 108 to obtain information about the co-user 111, such as the user's profile, social network behavior, social networking contacts, and affinity to other users. The content presentation system 102 may also use the social networking system 108 to share content presentations among users of the content presentation system 102. For instance, the user 110 may add a content item to a content presentation, and send the content presentation to the social networking system 108. The co-user 111 may then view the content item via the social networking system 108.

Regardless of the presence of the social networking system 108, the components of the system 100, including the one or more server(s) 101, the client devices 104/105, and the one or more optional server(s) 107 can communicate via the network 106. The network 106 may include one or more networks and may use one or more communication platforms or technologies suitable for transmitting data and/or communication signals. Additional details relating to the network 106 are explained below with reference to FIGS. 20 and 21.

As further illustrated in FIG. 1, the user 110 may interact with the user client device 104, and the co-user 111 may interact with the co-user client device 105. The user 110 and the co-user 111 may each be an individual (i.e., human user), a business, a group, or any other entity. For purposes of explanation, FIG. 1 illustrates only one user 110 and one co-user 111, however, it should be understood that the system 100 may include any number of users and/or co-users interacting with the system 100 using one or more corresponding client devices. Likewise, it should be understood that the terms "user" and "co-user" are generally used for purposes of explanation, and that the user 110 and the co-user 111 are both simply users of the content presentation system 102 and are both capable of capturing, sharing, and accessing media using the content presentation system 102.

As mentioned above, the user 110 and the co-user 111 may interact with the co-user client devices to communicate with the content presentation system 102 and/or social networking system 108. The client devices may represent various types of client devices. For example, the client devices can include a mobile device, such as a mobile telephone, a smartphone, a PDA, a tablet, or a laptop. Furthermore, client devices can include a non-mobile device, such as a desktop or server. In addition, the client devices may include display devices such as televisions, LCD displays, LED displays, monitors, projectors, etc. Generally, as used herein, client devices can include any type of computing device. Additional details and examples with respect to the client devices are discussed below with respect to FIG. 20.

In general, the client devices 104/105 may enable a user (e.g., the user 110 or co-user 112) to view one or more content presentations, for example, as part of a presentation feed. For example, the client devices 104/105 include processing components and a display screen that enable a user to view content presentations within presentation feeds. Additionally, the client devices can also include components (e.g., a camera and/or a microphone) to capture content, as well as send the captured content to other devices via the content presentation system 102. As will be explained in further detail below, the content presentation system 102, shown in FIG. 1, can manage each user's interaction with the content presentation system 102. More specifically, the content presentation system 102 can communicate with the client devices 104/105 to collect, organize, notify, and distribute content items within each presentation feed associated with the user 110 and co-user 111.

Figure 2:
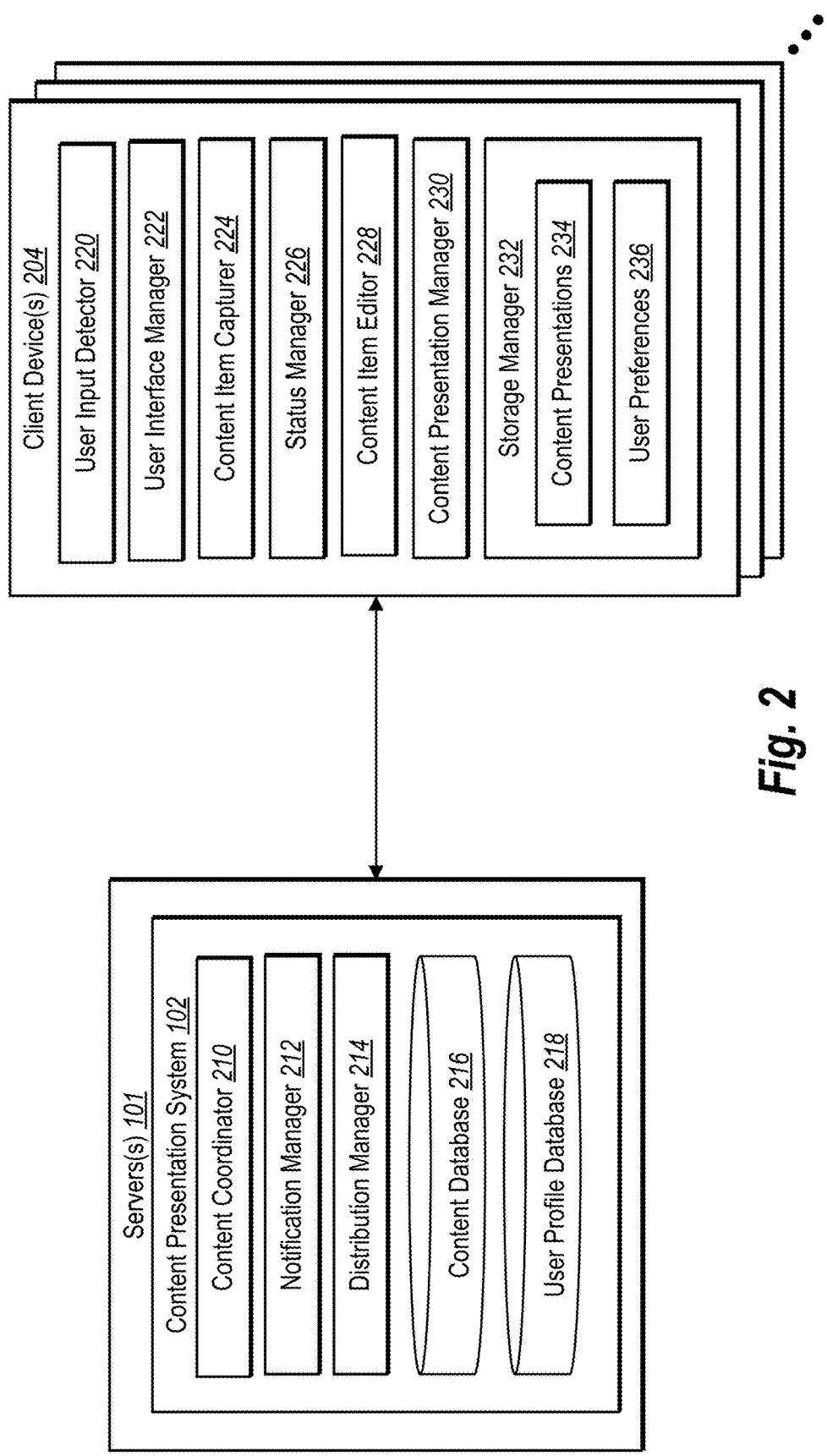
FIG. 2 illustrates a schematic diagram of a content presentation system in communication with one or more client devices in accordance with one or more embodiments described herein.

FIG. 2 illustrates a schematic diagram of one or more server(s) 101 that include a content presentation system 102 in communication with one or more client device(s) 204. The content presentation system 102 in FIG. 2 can represent one or more embodiments of the content presentation system 102 discussed above with reference to FIG. 1. Similarly, the client device(s) 204 shown in FIG. 2 may represent one or more embodiments of the user client device 104 and/or the co-user client device 105 discussed above with reference to FIG. 1. For instance, the content presentation system 102 and the client device(s) 204 in FIG. 2 can be part of the communication system 100 illustrated in FIG. 1.

As illustrated in FIG. 2, the content presentation system 102 can include, but is not limited to, a content coordinator 210, a notification manager 212, a distribution manager 214, a content database 216, and a user profile database 218. In general, the content coordinator 210 organizes content items received from the client devices(s) 204 into content presentations as well as associates content presentations with user groups (e.g., presentation feeds). The notification manager 212 issues notifications to the client device(s) 204 (e.g., notifications of new content items, co-user messages/comments, etc.). The distribution manager 214 provides content presentations to one or more client device(s) 204 for presentation to one or more users of the content presentation system 102. The content presentation database 216 can maintain a plurality of content presentations and/or content items, and the user profile database 218 can maintain user information for users of the content presentation system 102.

Each component of the content presentation system 102 may be implemented using a computing device including at least one processor executing instructions that cause the content presentation system 102 to perform the processes described herein. In some embodiments, the components of the content presentation system 102 can be implemented by a single server device, or across multiple server devices. Although a particular number of components are shown in FIG. 2, the content presentation system 102 can include more components or can combine the components into fewer components (such as a single component), as may be desirable for a particular embodiment.

As briefly mentioned above, and as illustrated in FIG. 2, the content presentation system 102 may include a content coordinator 210. The content coordinator 210 may organize content items based on content presentations, users, and/or presentation feeds. For example, the content coordinator 210 may use a content item table stored as part of the content database 216 to link content items to content presentations, and to track which content presentations belong to which presentation feed.

To illustrate, the content coordinator 210 receives a content item from a client device 204. The content coordinator 210 uses a content item identifier associated with the content item to determine whether the content item belongs to an existing content presentation. If the content coordinator 210 determines that the content item is associated with a content presentation, the content coordinator 210 can append the content item to the content presentation. Otherwise, if the content item is not associated with a content presentation, the content coordinator 210 can create and associate the content item with a new content presentation.

Similarly, the content coordinator 210 can associate a content item with one or more presentation feeds. For example, multiple users can create a user group within the content presentation system 102, and in response, the content coordinator 210 can create a corresponding presentation feed that is shared among the users of the group. Further, the content coordinator 210 can use the content item's identifier to associate a content item with one or more presentation feeds. For example, the content coordinator 210 may match the identifier of a content item to an entry for a content presentation that indicates which content items belong to the content presentation, and to which presentation feed the content presentation belongs.

In addition, the content coordinator 210 can store content items within the content database 216. For example, upon receiving a content item from the client device(s) 204, the content coordinator 210 can store a copy of the content item in the content database 216. In this manner, the content coordinator 210 can store a single copy of a content item even when the content item is included in multiple presentation feeds. Further, the content database 216 can store metadata and other information associated with the content item (e.g., likes, shares, views, etc.).

As mentioned above, FIG. 2 illustrates that the content presentation system 102 includes the notification manager 212. The notification manager 212 manages notifications for each user of the content presentation system 102. In particular, the notification manager 212 tracks when to serve a notification to a user, via the user's client device, when to update notifications, and when to cancel or clear a served notification. For instance, the notification manager 212 can maintain a notification database (e.g., as part of the content database 216) that indicates that the notification manager 212 should send a notification to a user, detects that the user interacted with a notification, as well as determines to update/cancel a notification.

As an illustration, upon the content coordinator 210 adding a content item to a user's presentation feed, the notification manager 212 may send a notification to the client device associated with the user (e.g., client device 204) indicating the new content item. The notification may be specific to the content item, a content presentation, or a presentation feed associated with the content item. Further, upon the content coordinator 210 adding multiple new content items, the notification manager 212 may update the previous notification to indicate that multiple new content items are present. Alternatively, the notification manager 212 may provide separate notifications for each new content item added to a user's presentation feed.

In addition to providing notifications indicating new content items, the notification manager 212 can provide notifications to indicate a variety of events within the content presentation system 102. For example, the notification manager 212 can notify a user when other co-users are active on a presentation feed. Similarly, the notification manager 212 can notify a user when another co-user joins a group to which the user belongs. Further, the notification manager 212 can provide a notification announcing when a co-user is providing a live content media stream.

The notification manager 212 can also update, cancel, or remove notifications. For instance, when an event occurs that corresponds to a current notification (e.g., a user views a new content item, a co-user becomes inactive on a presentation feed, a user interacts with the notification, etc.), the notification manager 212 may modify, or in some cases remove altogether, the corresponding notification. For example, the notification manager 212 may track the status of current notifications in a notification table, described above, and update or remove the current notifications from the notification table in response to detecting a corresponding event. Additional detail regarding providing, updating, and removing notifications will be described below with respect to the subsequent figures.

The content presentation system 102 also includes a distribution manager 214, as mentioned above. In general, the distribution manager 214 distributes or otherwise provides content presentations to users of the content presentation system 102. More specifically, the distribution manager 214 can distribute content items to client devices associated with one or more users of the content presentation system 102.

As part of distributing content items to users of the content presentation system 102, the distribution manager 214 determines a distribution audience for a particular content item. For example, the distribution manager 214 may access the content database 216 to identify one or more users that belong to a distribution audience for a particular content item. Once the distribution manager 214 identifies the users within an appropriate distribution audience, the distribution manager 214 sends the content item to the identified users within the distribution audience.

As described above, the content coordinator 210 may store a copy of a content item in the content database 216. When the distribution manager 214 distributes a content item, the distribution manager 214 may access the copy if the content item from the content database 216 and provide the content item to the distribution audience. Further, in some embodiments, the distribution manager 214 may determine, for example using the content database 216, that a content item belongs to multiple presentation feeds for a user. In such an example, the distribution manager 214 may send only one copy of the content item, but sends a configuration file to the client device that identifies each of the content presentations to which the content item belongs. For example, the distribution manager 214 may send instructions to a client device along with a content item indicating that the content item belongs to content presentation A.

Further, the distribution manager 214 can distribute content items and/or content presentations through a variety of distribution channels. For example, in addition to distributing content presentations to users of the content presentation system 102, in some example embodiments, the distribution system 102 can distribute content presentations to a communication system, such as a social networking system. To illustrate, the distribution manager 214 may distribute a content presentation that a user creates to a social networking system, which in turn can share the content presentation with one or more of the user's social networking connections (e.g., directly or through a plug-in that integrates the content presentation system 102 in the social networking system). In some cases, the distribution manager 214 may post a content presentation on the newsfeeds of one or more social networking users connected to the user via the social networking system. In some example embodiments, the content presentation system 102 may allow other users to reply (e.g., add a content item to the content presentation) via the social networking system. Additionally, in some embodiments, the content presentation system 102 may integrate with the social networking system and allow users of the social networking system to create, edit, and/or add to a content presentation from within the social networking system (e.g., directly or through a plug-in).

As shown in FIG. 2, the content presentation system 102 includes a content presentation database 216. The content presentation database 216 may store content items and/or content presentations as well as other files structures and databases described above. The content presentation database 216 can also store metadata associated with content presentations, such as identifiers for each content item, each content presentation, and/or each presentation feed, the number of users that have accessed or viewed each content item, the creator or contributors to each content item, content presentation, and/or presentation feed, date and time, geographic metadata associated with each content item, presentation feed/user group information, user preference information, and any other information related to content items.

In addition to the content presentation database 216, and as shown in FIG. 2, the content presentation system 102 includes the user profile database 218. The media profile database 218 may store user information corresponding to each user in the content presentation system 102. The user profile database 218 may include a user profile for each user of the content presentation system 102. A user profile may include, but is not limited to, biographic information, demographic information, behavioral information, social information, or other types of descriptive information, such as work experience, educational history, hobbies or preferences, interests, affinities, and/or location information.

In addition to storing user information, the user profile database 218 may store user relationship information between users within the content presentation system 102. The user relationship information may indicate users who have similar or common work experience, group memberships, hobbies, educational history, and/or are in any way related or share common interests or attributes. The user relationship information may also include user-defined relationships between different users and content (e.g., user defined friends, groups, etc.).

Returning to FIG. 2, the content presentation system 102 may communicate with any number of client device(s) 204. For purposes of explanation, only one client device 204 is referenced for the balance of FIG. 2, but it should be understood that the principles described apply to each of a plurality of client devices associated with any number of users. As illustrated in FIG. 2, the client device 204 can include, but is not limited to, a user input detector 220, a user interface manager 222, a content item capturer 224, a status manager 226, a content item editor 228, a content presentation manager 230, and a storage manager 232.

Each component of the client device 204 may be implemented using a computing device including at least one processor executing instructions that cause the client device 204 to perform the processes described herein. In one or more embodiments, the various components are implemented using one or more applications installed and running on the client device 204. In some embodiments, the components of the client device 204 can be implemented by a client device alone, or across multiple computing devices. Although a particular number of components are shown in FIG. 2, the client device 204 can include more components or can combine the components into fewer components (such as a single component), as may be desirable for a particular implementation.

As shown in FIG. 2, the client device 204 can include the user input detector 220. Generally, the user input detector 220 detects user interactions with a user interface to determine user input (e.g., detecting a touch gesture on a touch screen corresponding to an graphical element of a user interface). More specifically, the user input detector 220 can detect, identify, and/or receive user interactions and translate user interactions into a user input (e.g., a user command or request). As referred to herein, a "user interaction" means a single interaction, or combination of interactions, received from a user by way of one or more input devices. In some embodiments, the user input detector 220 can translate a combination of user interactions as a single user input and/or translate a single user interaction into multiple user inputs.

In one or more embodiments, the user input detector 220 can detect a user interaction from a keyboard, mouse, touch screen, or any other input device. In the event a touch screen is used as an input device, the user input detector 220 can detect one or more touch gestures (e.g., swipe gestures, tap gestures, pinch gestures, shape gestures, or reverse pinch gestures) that a user provides to the touch screen. In one or more embodiments, a user can provide one or more touch gestures in relation to and/or directed at one or more graphical objects, items, or elements of a user interface presented on a display screen. The user input detector 220 may additionally, or alternatively, receive data representative of a user interaction. For example, the user input detector 220 can receive one or more user configurable parameters from a user, one or more user commands from a user, and/or any other suitable user input.

As mentioned above, the client device 204 includes a user interface manager 222. In one or more embodiments, the user interface manager 222 can process user input and/or other data received from a user (or source simulating user input) to manage, control, and/or facilitate the use of a user interface. In general, the user interface manager 222 can facilitate the presentation (e.g., by way of a display screen associated with a client device 204) of a graphical user interface (or simply "user interface") for purposes of allowing a user to access the features and benefits of the content presentation system 102 via the client device 204. In particular, and in response to the user input (e.g., detected by the user interface detector 220), the user interface manager 222 can allow a user to control a user interface to view, navigate, browse, search, edit, contribute to, share, and/or otherwise experience content items and/or content presentations. Further, the user interface manager 222 can display graphical elements (e.g., soft buttons) that enable a user to navigate through content presentations and capture content items.

To illustrate, the user interface manager 222 can provide a user interface that facilitates the display of one or more content presentations along with one or more graphical elements on the client device 204 (e.g., on a display screen). In one or more embodiments, the user interface manager 222 can present a user interface to a user as the user navigates within a content presentation feed. Further, the user interface manager 222 can change the display of the user interface as a user scrolls through a content presentation feed. For instance, in one or more embodiments, the user interface manager 222 can display a thumbnail or preview of a content presentation to represent to the content presentation. For example, the user interface manager 222 can display an image (e.g., a representative frame) from a content presentation to represent the content presentation, such as the first frame, the last played frame, or the first un-played frame.

In some example embodiments, a user can interact with a content presentation feed by providing, via a touch screen displaying a user interface, one or more vertical swipe gestures directed toward the content presentation feed, as will be further discussed below. In alternative embodiments, the user interface manager 222 can allow a user to navigate a presentation feed using other navigation techniques, such as flipping through presentation feeds (e.g., turning a graphical representation of a page with each page corresponding to a different presentation feed). In some example embodiments, the interface manager 222 may display a live image or video currently being captured by the client device 204. For example, when a user is capturing a content item, the interface manager 222 may display the content item as the content item is being captured.

As illustrated in FIG. 2 and as mentioned above, the client device 204 includes a content item capturer 224. In general, the content item capturer 224 assists a user in capturing or otherwise obtaining a content item to add to a content presentation. For example, the content item capturer 224 can use the client device 204 to capture a content item. Alternatively, the content item capturer 224 may assist a user in selecting a previously stored content item.

The content item capturer 224 can access a variety of hardware and/or software components of the client device 204 to capture content to create a content item. As one example, the content item capturer 224 can use a camera and/or microphone on the client device 204 to capture an image, video, and/or audio. For instance, a user may capture a digital photo or may record a video with audio using the client device 204. As discussed below in additional detail, the user can view or replay the captured content item and choose to accept and share the content item within a content presentation, or can delete or recapture the content item. As another example, the content item capturer 224 may use a keyboard (with hard or soft keys) to capture text and graphics (e.g., emojis) by a user via a keyboard. For instance, a user may user a keyboard to provide a comment regarding a content item in a content presentation.

In some example embodiments, upon capturing a content item, the content item capturer 224 stores the content item on the client device 204, a network device, and/or online storage (e.g., a content item accessible on cloud storage). For example, the content item capturer 224 sends a copy of the content item to the storage manager 232, described below. Further, the content item capturer 224 may provide a copy of the content item to the content presentation system 102, as described above.

The client device 204 also includes a status manager 226. In general, the status manager 226 reports the status of a user using the client device 204 to the content presentation system 102. For example, when a user is actively using the client device 204 to access his or her presentation feed, the status manager 226 sends an active status indicator to the content presentation system 102. Likewise, when a user exits the presentation feeds or becomes idle on the client device 204, the status manager 226 sends an inactive status indicator to the content presentation system 102.

Additionally, the status manager 226 may report which content items and/or content presentations the user is accessing and viewing to the content presentation system 102. For example, if a user views a previously unviewed content item within a content presentation, the status manager 226 may provide a status indicator to the content presentation system 102, including the content item identifier for the content item that the user is viewing. In some cases, the status indicator may also provide identifiers for the content presentation and/or presentation feed to which the content item belongs.

Similarly, when a user interacts with a content item (e.g., likes, shares, blocks, tags, saves, etc.), the status manager 226 can provide corresponding information to the content presentation system 102. As another example, when a user interacts with a notification, the status manager 226 may report the interaction to the content presentation system 102. As described above, the content presentation system 102 can use the report to update or remove the notification based on the user's interaction with the notification.

The status manager 226 can also provide a status update indicating when a user is actively providing content. For example, when the user is taking a digital photo or inputting text, the status manager 226 may notify the content presentation system 102 of such user action. Further, when the user is changing content attributes within a content item (e.g., before the user chooses to share the content item), the status manager 226 may indicate the modified attributes to the content presentation system 102. In turn, the content presentation system 102 can provide the status updates to one or more other users of the content presentation system 102.

The client device 204 also includes a content item editor 228 as mentioned above. In general, the content item editor 228 can provide the ability for a user to edit and/or modify content within a content item. Examples of editing content include applying themes, foreground coloring, background coloring, modifying the runtime of a content item, adding text or graphics, applying transparency levels, etc.

To illustrate, the content item editor 228 allows a user to edit a captured image or video, such as allowing a user to define the duration of a captured video, or select an extracted portion of a video to share as a content item. Further, the content item editor 228 allows a user to edit attributes of content when sharing a content item that includes text and/or graphics (e.g., emojis, stickers, ideograms, smileys, pictographs, frames, or boarders). Additional detail regarding editing content within a content item is provided below with respect to the subsequent figures.

As mentioned above, the content presentation system 102 includes a content presentation manager 230. In general, the content presentation manager 230 organizes content presentations within the content presentation feeds as well as organizes content items within each content presentation. As such, the content presentation manager 230 facilities the presentation of each content presentation and presentation feed. The content presentation manager 230 also assists a user in interacting with content presentations. Further, the content presentation manager 230 can assist a user in adding a content item to a new or existing content presentation.

In one or more embodiments, the content presentation manager 230 organizes content presentations within each content presentation feed based on information received from the content presentation system 102. For example, the content presentation manager 230 arranges content presentations in the content presentation feed according to the recency of each content presentation. To illustrate, when a new content presentation is shared with a user, or when a previously shared content presentation is updated, the content presentation manager 230 may arrange the new or updated content presentation before older content presentations.

Alternatively, the content presentation manager 230 may arrange the content presentation feed based on other criteria, such as content presentation title, creator, age of the content presentation, presentation length, contributors, number of contributors, indication as a favorite, popularity (e.g., number of viewers), etc. In some example embodiments, the content presentation manager 230 can enable a user to define, through user preferences, how the content presentation manager 230 organizes and arranges the content presentation feed.

In one or more embodiments, the content presentation manager 230 may update a content presentation upon receiving modifications and/or changes from either a user or the content presentation system 102. For example, if a user deletes, edits, or adds a content item to a content presentation, the content presentation manager 230 may reflect the deletion, modification, or addition to the content presentation. As another example, the content presentation system 102 can detect when a content presentation should be removed or archived (e.g., the content presentation is over a threshold age.).

As mentioned above, the content presentation manager 230 facilitates the presentation of one or more content presentations to a user in response to user input (e.g., by providing touch input or a touch gesture). For example, a user may navigate to a first content presentation within a content presentation feed to view the content item(s) in the first content presentation. In addition, the content presentation manager 230 may allow the user to continuing scrolling or navigating through content presentations in the content presentation feed. Further, the content presentation manager 230 can enable a user to switch (e.g., flip, swipe, turn a virtual page, etc.) between presentation feeds.

In one or more embodiments, the content presentation manager 230 may provide a user with additional information about co-users of the content presentation system 102. For example, the content presentation manager 230 may generate a list of co-users who belong to a group or who have contributed to a content presentation. Upon selecting a particular co-user, the content presentation manager 230 may present, to the user, the user profile of the selected co-user, along with other information about the selected co-user.

The content presentation manager 230 can also allow a user to "like" individual content items within a content presentation as well as "like" the content presentation as a whole. By indicating a preference for one or more content items within a content presentation, the creator of the content presentation can promote a well-liked content item (e.g., feature the content item by moving the content item to the start of the presentation) or suppress/remove an unpopular content item that receives little or no likes after a set number of views.

Along similar lines, the user may desire to view particular content items within a content presentation, such as unviewed content items or direct message content items. As such, the content presentation manager 230 may enable the user to filter which content items the content presentation manager 230 presents to the user. In some example embodiments, the content presentation manager 230 may automatically create a separate presentation feed based on content items that the user desires to view. For example, the content presentation manager 230 creates a feed that provides direct messages from other co-users.

As mentioned above, the content presentation manager 230 can also assist a user in managing content presentations. To illustrate, when a user captures a content item (e.g., using the content item capturer 224) to add to a content presentation shared with the co-users, the content presentation manager 230 may append the captured content presentation on the client device 204. As such, the content presentation manager 230 updates the content presentation shared with the user to include the captured content item.

Just as the content presentation manager 230 can send a content item to the content presentation system 102, the content presentation manager 230 can receive content items from the content presentation system 102. For example, the client device 204 may receive a content item from the content presentation system 102 along with instructions to append or include the content item to a content presentation currently shared on the client device 204. As such, the content presentation manager 230 may append the received content item to the corresponding content presentation currently on the client device 204. In this manner, the content presentation manager 230 on each client device may each append content items to corresponding presentations regardless of if the content item was captured locally by the client device 204 or captured from a co-user via another client device and provided to the client device 204 by the content presentation system 102.

In one or more example embodiments, the content presentation manager 230 can suggest other users with which to share a content item. For example, a user may capture a content item independent of a content presentation or presentation feed, and then the user may choose one or more presentation feeds and/or co-users with whom to share the content item, which is described below in greater detail. In this case, the content presentation manager 230 may recommend the user share a content presentation with specific groups or individual co-users. For example, the content presentation manager 230 may identify the topic of the content item and recommend co-users that share an interest in the same or similar topics.

FIG. 2 also illustrates a storage manager 232. The storage manager 232 may include content items 234 and user preferences 236. For example, the storage manager 232 may store content items shared with the user associated with the client device 204 as well as content items created by the user. The storage manager 232 may communicate with the content presentation system 102 to send content items, content presentations, and/or user information between the client device 204 and the content presentation system 102. For instance, the storage manager 232 may receive one or more content items from the content presentation database 216. Similarly, the storage manager 232 may send user preferences to the user profile database 218 on the content presentation system 102.

FIGS. 3A-8B and FIGS. 10A-18B illustrate various exemplary graphical user interfaces of a client device 300. The client device 300 illustrated in FIGS. 3A-8B and FIGS. 10A-18B can represent example embodiments of the user client device 104 or the co-user client device 105 described in connection with FIG. 1. For example, a user may use the client device 300 to access the content presentation system 102. While the client device 300 of FIGS. 3A-8B and FIGS. 10A-18B illustrate a mobile device, one will appreciate that a content presentation application may be executed on other types of computing devices, such as the computing and client devices described below in connection with FIGS. 20-21.

With respect to FIGS. 3A-8B and FIGS. 10A-18B, callouts and reference numbers identify features, elements, and/or components of the client device 300 illustrated in FIGS. 3A-8B and FIGS. 10A-18B. For purposes of explanation, and to decrease duplication and confusion, a reference number for a feature, element, and/or component of the client device 300 shown in one figure may relate to the same feature, element, and/or component of the client device 300 shown in another figure, even when the other figure does not include a specific callout or reference number. To illustrate, the client device 300 illustrated in FIGS. 3A-8B and FIGS. 10A-18B includes a touch screen 302. The client device 300 displays a graphical user interface 304 on the touch screen 302. The touch screen 302 and graphical user interface 304 are labeled in FIG. 3A, but equally apply to each exemplary client device 300 displayed in FIGS. 3B-8B and FIGS. 10A-18B, unless stated otherwise. In other words, to reduce clutter in the figures, the touch screen 302 and graphical user interface 304 are labeled and identified as part of the client device 300 in FIG. 3A, but apply to each embodiment of the client device 300 described in connection with FIGS. 3B-8B and FIGS. 10A-18B.

Figure 10D:
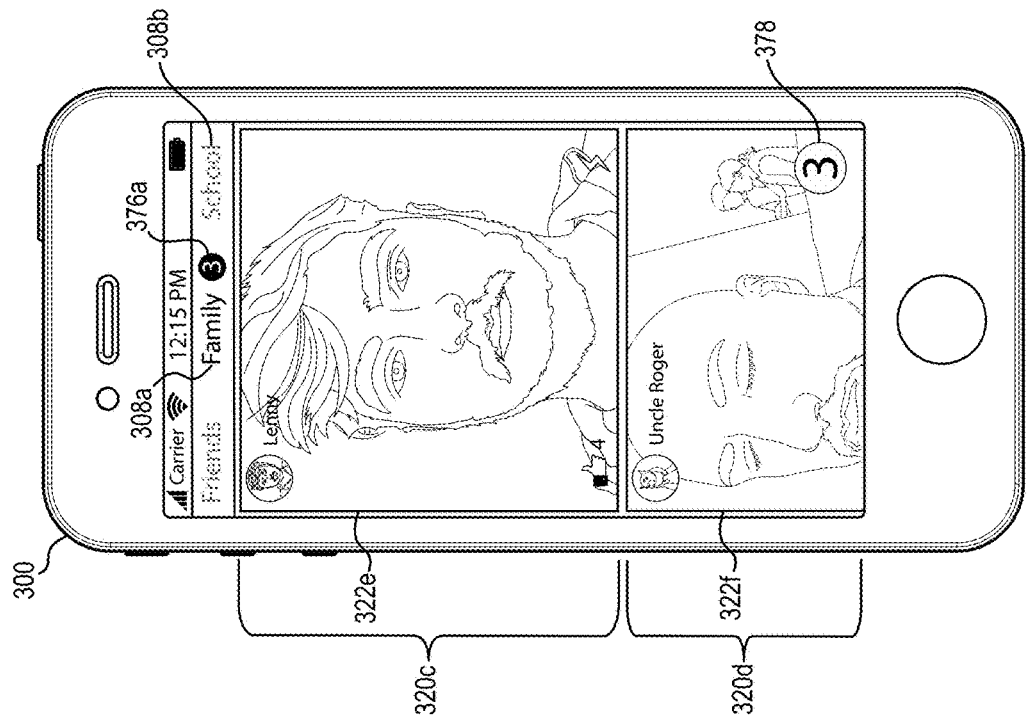

As another initial matter, it should be understood that selected figures of FIGS. 3A-8B and FIGS. 10A-18B display one or more graphical user interface areas 306 (referred to as "first area 306a," "second area 306b," "third area 306c," etc.) that correspond to a user interface of the content presentation system 102. The one or more graphical user interface areas 306 may move within the user interface 304 and, in some cases, move out of the user interface 304. While some figures in FIGS. 3A-8B and FIGS. 10A-18B do not call out and label the graphical user interface areas 306, one will appreciate the user interface 304 of the client device 300 in each of FIGS. 3A-8B and FIGS. 10A-18B generally include at least one graphical user interface area 306. Furthermore, each embodiment described in connection with FIGS. 3A-8B and FIGS. 10A-18B includes at least one figure that labels the one or more graphical user interface area(s) 306 included in the graphical user interface 304 (e.g., FIG. 10A illustrates the graphical user interface areas 306 described with respect to FIGS. 10A-10D).

Additionally, as illustrated in FIGS. 3A-8B and FIGS. 10A-18B, the client device 300 shows various user interfaces 304 illustrating one or more of presentation feeds 308, content presentations 320, and/or content items 322. In some embodiments, the client device 300 displays a user interface 304 for a mobile application. For example, the client device 300 can execute an application that facilitates interactions with the content presentation system 102 described in connection with FIG. 1 to present the one or more of presentation feeds 308, content presentations 320, and/or content items 322 within the user interface 304.

Figure 3C:
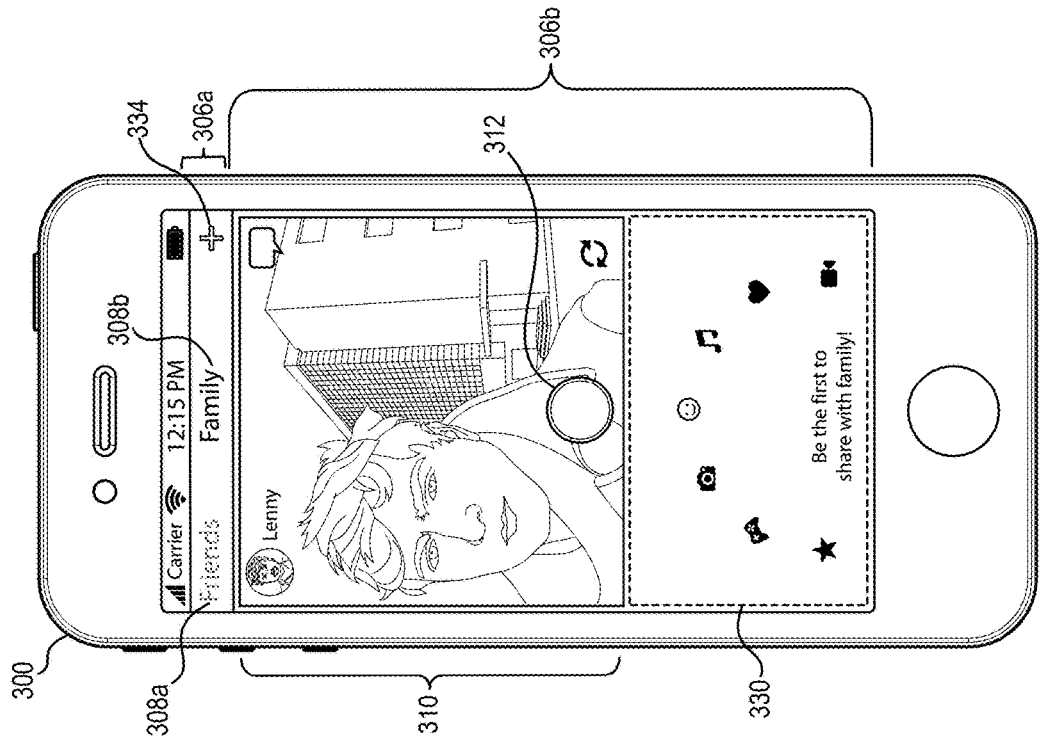

FIGS. 3A-3E provide a general overview of a client device 300 displaying presentation feeds 308, capturing content, and streaming content. In particular, FIG. 3A illustrates a client device 300 having a touch screen 302 that displays a graphical user interface 304 (as mentioned above). The graphical user interface 304 includes a first area 306a and a second area 306b. The first area 306a illustrates various presentation feeds 308a-b to which a user subscribes. As shown if FIG. 3A, the first area 306a presents a "Friends" label indicating that the user is viewing the presentation feed 308a associated with a "Friends" group (e.g., referred to as the "friends presentation feed 308a"). Further, the first area 306a also displays a sharing feed associated with the camera icon), which is described with respect to FIGS. 4A and 4B below.

In addition, and as shown in FIG. 3A, when the user is viewing the friends presentation feed 308a, the second area 306b of the client device 300 displays content presentations 320 associated with the friends presentation feed 308a. The second area 306b in FIG. 3A also shows a capture window 310. Generally, when a user first accesses a presentation feed 308, the second area 306b displays a capture window 310 above or otherwise at the start of the presentation feed 308. The capture window 310 can provides a real-time presentation of content that the client device 300 is actively capturing. Using the capture window 310, a user can quickly capture a content item and add the content item to the presentation feed 308.

As shown in FIG. 3A, the capture window 310 includes various graphical elements, such as a capture button 312. The capture button enables a user to capture content, such as an image or video. For example, a camera 315 on the client device 300 may capture an image of the user (e.g., Lenny) upon Lenny selecting the capture button 312. The capture window 310 also includes a camera flip button 314, which may switch the capturing camera on the client device 300 from a front facing camera (e.g., the camera 315) to a rear facing camera on the back of the client device 300. In addition, the capture window 310 includes a text button 316, which is also described below. Further, the capture window 310 displays a user badge 328a, which can include an image and name provided by the corresponding user (e.g., Lenny).

As mentioned above, and as shown in FIG. 3A, the second area 306b displays one or more content presentations 320 associated with the selected presentation feed 308a. Specially, the second area 306b shows a first content presentation 320a. The first content presentation 320a includes a first content item 322a posted by Danny. As shown, the first content item 322a also includes a user badge 328b. Like the user badge 328a that is displayed within the content window 310, the user badge 328b displayed in the first content item 322a displays the image and name provided by the user that posted the first content item 322a (e.g., Danny's picture and name).

Figure 3B:
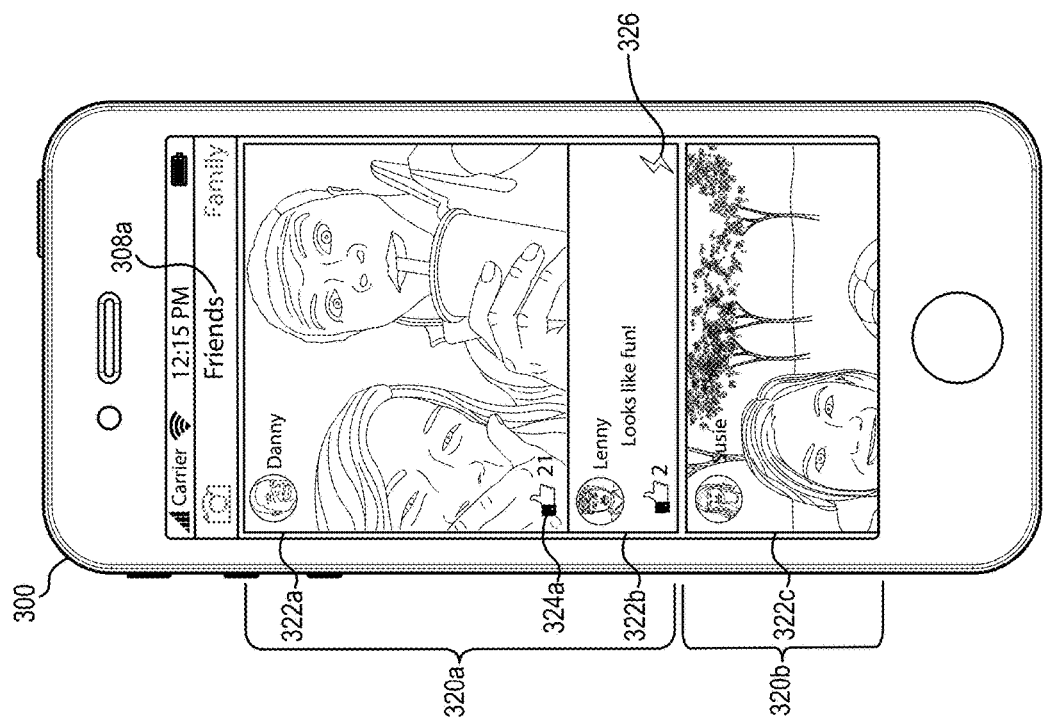

While viewing the friends presentation feed 308a, a user may navigate between the various content presentations 320 in the presentation feed 308a. For example, a user may use a touch gesture to scroll down within the second area 306b to view additional content items 322 and/or content presentations 320. As shown in FIG. 3B, after scrolling down, the second area 306b displays additional content items within the first content presentation 320a. Specifically, the first content presentation 320a illustrates the first content item 322a posted by Danny as well a second content item 322b posted by Lenny (e.g., a text comment). FIG. 3B also displays a third content item 322c posted by Susie as part of a second content presentation 320b within the friends presentation feed 308a.

As a note, a content presentation 320 may include one or more content items 322. In one or more embodiments, a content presentation 320 that includes multiple content items 322 may present two or more content items 322 as adjoining each other. For instance, as shown in FIG. 3B, the first content item 322a posted by Danny and the second content item 322b posted by Lenny touch each other with little or no separation between the two content items (e.g., no white space). Conversely, different content presentations 320 within the presentation feed 308 can have a space, border or other indicator (e.g., white space) to visually distinguish between different content presentations 320. For example, as shown, the content items 322a-b in the first content presentation 320a are separated from the third content item 322c in the second content presentation 320b.

Returning to the first content presentation 320a in FIG. 3B, the first content item 322a posted by Danny shows a "like" indicator 324a. As shown throughout the figures, each content item posted in a presentation feed can include a "like" indicator 324. The like indicator 324 can indicate the number of users that like the content item 322a that Danny shared. In addition to displaying the number of user likes for a content item 322, a user can interact (e.g., provide a touch gesture) with the like indicator 324 to indicate that the user likes a content item 322. Further, when the client device 300 detects that a user likes a content item 322, the client device 300 may report the "liking" user action to the content presentation system 102, as described above.

Each content presentation 320 displayed in a presentation feed 308 may include an append option 326, as illustrated in FIG. 3B. In general, the append option 326 is associated with the last content item of a content presentation. For example, as shown in FIG. 3B, the append option 326, which looks like a lightning bolt, is located in the bottom right of the second content item 322b. Upon a user selecting the append option 326, the client device 300 may enable the user to add a content item to the corresponding content presentation, which is described below. Alternatively, each content item in a content presentation may include an append button that allows a user to add a content item to the corresponding content presentation.

As mentioned previously, the first area 306a displays multiple presentation feeds 308a-b associated with different groups to which the user belongs. A user may switch between various presentation feeds 308 associated with the different groups (e.g., "Friends" and "Family"). When the user switches presentation feeds (e.g., selects another presentation feed), the content presentations 320 displayed in the second area 306b change to content presentations 320 associated with the selected presentation feed 308. To illustrate, FIG. 3C shows Lenny has navigated to the family presentation feed 308b (e.g., by providing a right to left swipe gesture). As such, the label for the friends presentation feed 308a shifts over to the left of the first area 306a and becomes less prominent, and the family label shifts to the center of the first area 306a and become more prominent. Further, the second area 306b in FIG. 3C displays content presentations associated with the family presentation feed 308b.

In some instances, a presentation feed does not have an active content presentation associated with it. For instance, the presentation feed may be newly created (e.g., by selecting the add presentation feed button 334, providing a name for the new feed, and inviting co-users to join the feed), or previous content presentations have been removed by users or have expired. Additionally, the presentation feed can include a placeholder content item indicating that the presentation feed is empty and/or encouraging the user to add a content item to the presentation feed. For example, FIG. 3C shows that the second area 306b displays a placeholder content item 330 with a graphic and a message to the user to add a content item (e.g., "Be the first to share with family!"). When the user or a co-user shares a content item to the family presentation feed 308b, a content presentation including the shared content item can replace the placeholder content item 330.

In addition, FIG. 3C shows the capture window 310 in the second area 306b at the top of the family presentation feed 308b. As discussed above the capture widow 310 allows a user to capture content and add a content item to the presentation feed 308b. In some example embodiments, a user can share a live video stream to other users in a group. For example, Lenny can provide a touch gesture to initiate a live video stream to other members of the family presentation feed 308b. For instance, Lenny may hold down or double tap the capture button 312 within the capture window 310 to initiate a live video stream to other users in the group. Alternately, Lenny may select an option, such as a live streaming button, to initiate a live content stream, as described further below.

FIG. 3D illustrates, for example, the user interface response to a user selecting the option to provide a live video stream. For example, FIG. 3D shows that the second area 306b displays a live content item window 340a showing the live content being streamed to other members of the family presentation feed 308b. The live content item window 340a presents to a user the streaming content that the user is currently sharing with other users associated with the family presentation feed 308b.

When a user is streaming live content, the client device 300 may provide an indicator to the streaming user reporting the number of co-users watching the live content stream. For example, a viewing indicator 342a in the live content item window 340a of FIG. 3D shows that four co-users of the family presentation feed 308b are viewing the live stream. As the number of co-users in the family presentation feed 308b watching the live content stream increases or decreases, the viewing indicator 342a may also increase or decrease. In other words, the content presentation system 102 can track the number of co-users watching the live content stream, and as the number of viewers change, the content presentation system 102 can update the viewing indicator 342a on client device 300.

In order to terminate a live content stream, the user interface can include an option to end the content stream. As shown in FIG. 3D, a user may select the end content stream button 344 in the live content item window 340a. In other words, when a user begins the live content stream, the client device 300 may replace the capture window 310 and the capture button 312 with the live content item window 340a and the end content stream button 344. Further, when switching from the capture window 310 to the live content item window 340a, the client device 300 may display the end content stream button 344 in the same location as the capture button 312.

As mentioned above, co-users belonging to the family presentation feed 308b can view Lenny's live content stream. To illustrate, FIG. 3E displays a client device 300 from the perspective of a co-user receiving and viewing Lenny's live content stream. The client device 300 in FIG. 3E displays the live content stream 340b provided by Lenny. Similar to the live content item window 340a shown in FIG. 3D, the live content item stream 340b shown in FIG. 3E displays a view indicator 342b reporting the number of active users currently viewing the live content stream. For example, the viewing indicator 342b in the live content item stream 340b indicates that four users are watching the live content stream (including the co-user associated with the client device 300 shown in FIG. 3E).

As mentioned above, FIGS. 4A-4B illustrate an embodiment of a user interface on the client device 300 for sharing content items with groups and other co-users. The client device 300 shown in FIGS. 4A-4B may be the same client device 300 illustrated in FIGS. 3A-3E. As with FIGS. 3A-3E, FIGS. 4A-4B show Lenny as the user of the client device 300. Further, as mentioned above, a user may navigate to a sharing feed 336 within the first area 306a. For instance, as shown in FIG. 4A, when Lenny selects the sharing feed 336 in the first area 306a, the second area 306b displays the capture window 310, which is described above.

When a user accesses the sharing feed 336, the client device 300 may allow the user to share a content item with one or more user groups and/or individual users. For instance, the client device 300 may provide a listing of groups the user belongs to as well as a listing of co-users with whom the user is connected. The user may select one or more groups and/or co-users with whom to share a content item. For example, a third area 306c, shown in FIG. 4A, illustrates one or more groups 332a-b and/or one or more users 352a-b. The user may select one or more groups 332a-b and/or users 352a-b before or after capturing the content item. In some example embodiments, the client device 300 grays out the third area 306c until the user captures a content item.

As described above, a user may capture a content item by selecting the capture button 312 within the capture window 310. In response, the client device 300 switches the display of the second area 306b from the capture window 310 to an approval window 311, as shown in FIG. 4B. The approval window 311 allows a user to approve or cancel a captured content item. For example, if the user is satisfied with the captured content item, the user may select the share option 348 (after selecting at least one group or user) to share the captured content item. Conversely, if the user is not satisfied with the captured content item, the user can select a cancel sharing option 346 to cancel and/or delete the captured content item. Upon the user selecting the cancel sharing option 346, the client device 300 reverts the second area 306b back to the capture window 310 (e.g., as shown if FIG. 4A).

In some example embodiments, after capturing a content item but before sharing the content item, the user may desire to edit the content item. For example, the user may desire to add a text element to enhance the content item. As shown in FIG. 4B, the user may select the add text element option 350 to add a text element or graphic to the captured content item. Additional detail regarding editing a captured content item is described below with respect to FIGS. 5A-5D.

As shown in FIG. 4B, Lenny has captured a content item as well as selected to share the content item with the "Friends" group 332a as well as Danny 352a and Susie 352b, but not the Family group 332b. Upon selecting the share option 348, the client device 300 sends the captured content item to the content presentation system 102, and the content presentation system 102 will send the content item to the selected groups and users (e.g., the Friends user group 332a, Danny 351a, and Susie 351b). As such, the content item will appear on the friends presentation feed 308a for any user that is associated with the Friends presentation feed 308a.

Further, the content item may also appear in an inbox for Danny and Susie. For example, in some example embodiments, the client device 300 may include a direct inbox 338, shown in the first area 306a. The direct inbox 338 may include content items and content presentations directly shared between the user and another co-user. For example, upon selecting the direct inbox 338, the second area 306b of the client device 300 may provide Lenny with a content presentation comprising content items exchanged exclusively between Lenny and Susie.

In one or more embodiments, the client device 300 may also provide a new or unviewed content feed to a user. For example, the client device 300 may provide the unviewed content feed within the first area 306a. Upon selecting the unviewed content feed, the client device 300 may display unviewed content items within the second area 306b. Further, one will appreciate that the client device 300 may provide a user with numerous types of content feeds in the first area 306a, such as a discovery feed, search feed, co-user management feed, user preference feed, or account settings feed.

Figure 5D:
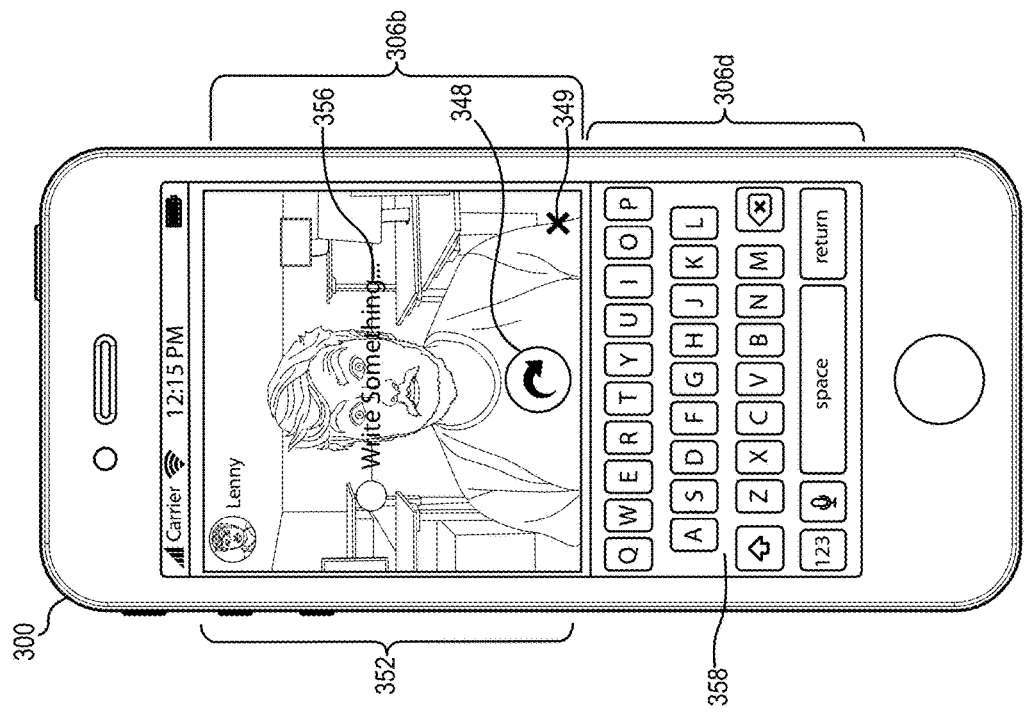

As mentioned above, FIGS. 5A-5D illustrate an embodiment of the client device 300 for appending a content item to a content presentation. As described above, a user may add a content item to an existing content presentation. To illustrate, FIG. 5A illustrates a user viewing a school presentation feed 308c. As such, the second area 306b illustrates a first content presentation 320a including a first content item 322a provided by Susie and a second content item 322b provided by Danny. Further, the second area 306b illustrates a second content presentation 320b including a third content item 322c provided by Ginger.

As discussed above, the first content presentation 320a includes the append option 326, shown in FIG. 5A. As described briefly above, a user can select the append option 326 to add a content item to a corresponding content presentation 320a. While FIG. 5A shows an append button in the lower right corner of the last content item in the content presentation (i.e., the second content item 322b), the append option 326 may be located in various locations throughout the first content presentation 320a or adjacent to the first content presentation 320a, such as just below the first content presentation 320a and above the second content presentation 320b. Further, the size, shape, and graphic or text used to represent the append option 326 may vary.

In some embodiments, the append option 326 may appear as a graphical element positioned above a portion of the first content presentation 320a, such as a semi-transparent bar spanning across the bottom of the second content item 322b. In an alternative embodiment, the append option 326 may be the first content presentation 320a itself. In other words, when a user provides a touch gesture to the first content presentation 320a (e.g., taps anywhere in the content presentation), the client device 300 may activate the append option 326.

To illustrate the append option activating, a user (e.g., Lenny) selects the append option 326 in the first content presentation 320a of FIG. 5A. In response, the client device 300 provides the capture window 310 to Lenny, as shown in FIG. 5B. More specifically, the client device 300 inserts the capture window 310 just below the second content item 322b in the first content presentation 320a. As shown in FIG. 5B, the capture window 310 joins the second content item 322b of the first content presentation 302a. In this manner, the client device 300 provides Lenny with the capture window 310 in context with of the content item to which Lenny is adding a content item.

As shown in the transition from FIG. 5A to FIG. 5B, when the client device 300 inserts the capture window 310 below the first content presentation 320a, the client device 300 may automatically adjust the display of the content within the second area 306b to accommodate the capture window 310. In other words, the client device 300 shifts the first content presentation 320a up to make room for the capture window 310 in the second area 306b, but still displays a portion of the first content presentation 320a. In this manner, the client device 300 allows Lenny to capture content while having the context of one or more other content items within the first content presentation 320a.

Further, as shown in the FIG. 5B, Lenny may select a cancel capture option 347 within the capture window 310 to hide the capture window 310. For example, upon Lenny selecting the cancel capture option 347, the client device 300 may remove the capture window 310 and revert to the configuration displayed in FIG. 5A. Additionally, when Lenny navigates away from the capture window 310 within the second area 306b (e.g., navigates to a forth content presentation or to another presentation feed), the client device 300 may remove the capture window 310 from the first content presentation 320a. As such, when a Lenny navigates back to the first content presentation 320a, the user can cause the capture window 310 to reappear by again selecting the append option 326. Further, when Lenny selects a capture option associated with a different content presentation, the client device 300 can remove the capture window 310 from the first content presentation 320a and show the capture window 310 in connection with the different content presentation.

Figure 5C:
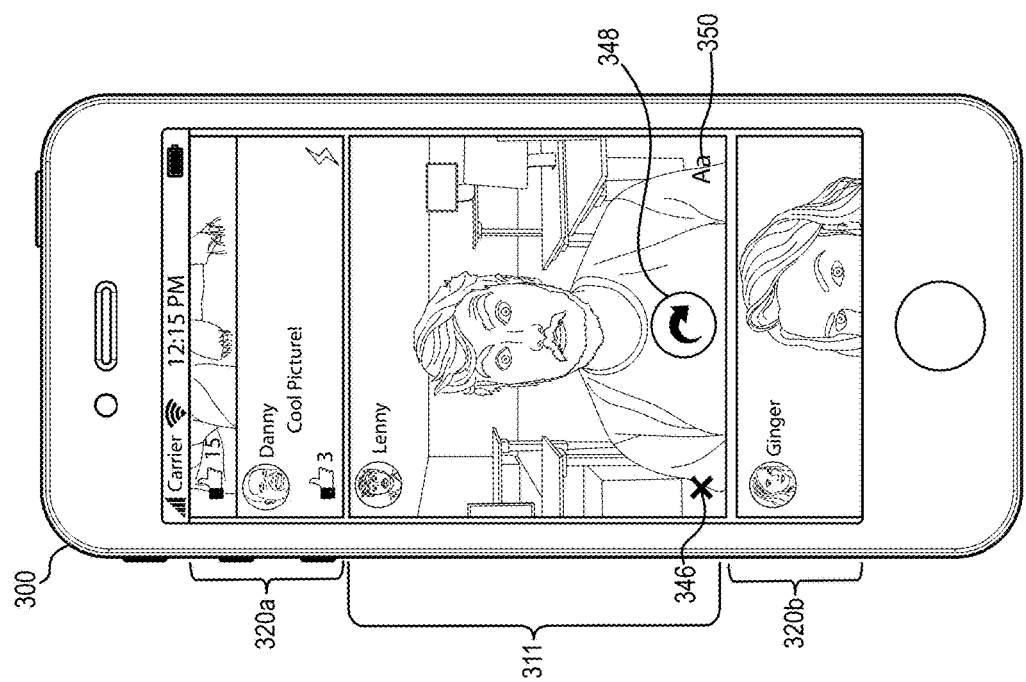

Lenny may select the capture button 312 in the capture window 310 to capture an image of him, as shown in FIG. 5B. Additionally, as FIG. 5C illustrates, upon capturing his picture, the client device 300 presents the captured content to Lenny in the approval window 311. As part of the approval window 311, the client device 300 provides corresponding options to Lenny, such as the cancel sharing option 346 and the share option 348 described above. The client device 300 may also provide the add text element option 350.

FIG. 5D illustrates the process of adding a text element in additional detail. In particular, FIG. 5D shows the client device 300 after a user selects the add text element option 350 illustrated in FIG. 5C. In addition, the second area 306b of FIG. 5D shows a text input window 352 in which a user can compose and add a text element 356 to the captured content item. In some example embodiments, the client device 300 can allow a user to add multiple text elements to the captured content item. The client device 300 also provides a fourth area 306d that includes a keyboard 358 where a user can input or modify text in the text element 356.

The second area 306b also includes a cancel text option 349. Upon a user selecting the cancel text option 349, the second area 306b may remove the text element 356. Further, the client device 300 may revert the display of the second area 306b back to the approval window 311 shown in FIG. 5C. Further, in addition to adding or modifying text in the text element 356, the client device 300 can enable a user to reposition the text element 356 within a captured content item. For instance, Lenny can drag the text element 356 to various positions within the captured content item, such as in front of his shirt or above his head.

Figure 6B:
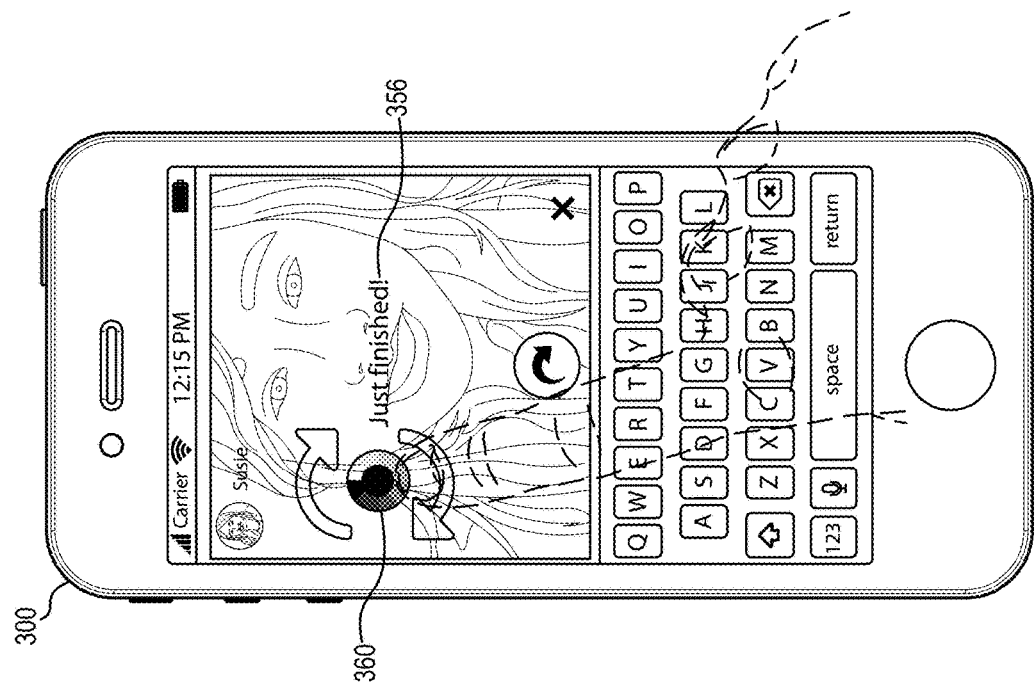
FIGS. 6A-6D illustrate an exemplary graphical user interface for modifying content within a content item using simple touch gestures in accordance with one or more embodiments described herein.
Figure 6A:
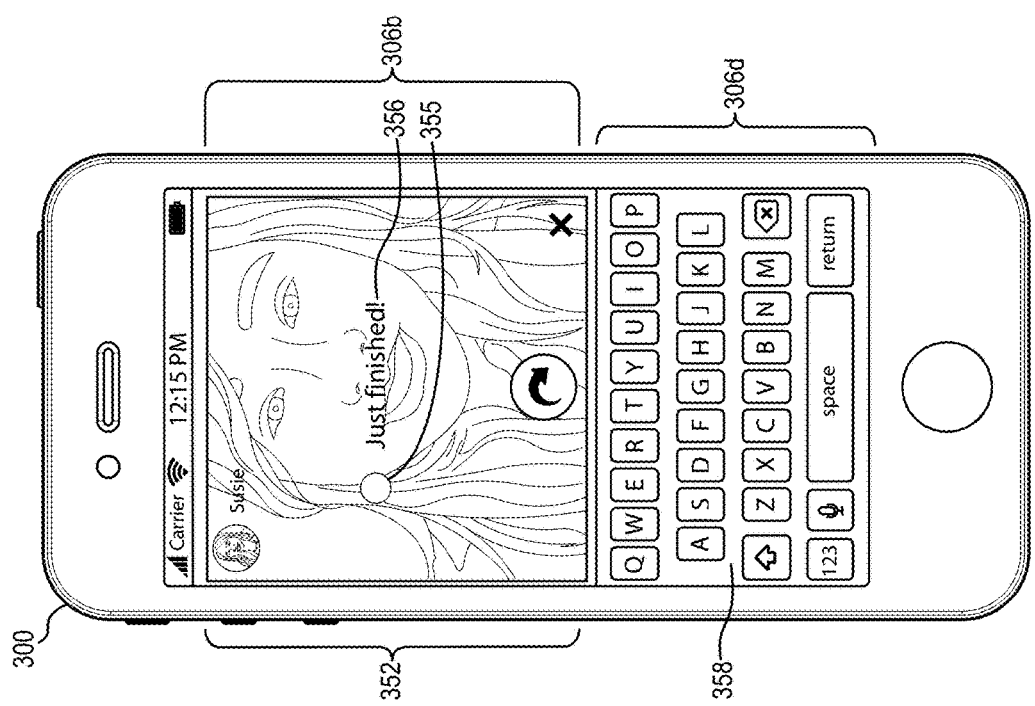

FIGS. 6A-6D, as mentioned above, provide an embodiment of the client device 300 for modifying content within a content item using simple user interactions, such as a single touch gesture. As illustrated in FIG. 6A, the client device 300 displays a text input window 352 in the second area 306b and a keyboard 358 in the fourth area 306d. The text input window 352 includes a text element 356 as described above in connection with FIG. 5D, where a user (e.g., Susie) had just wrote "Just finished!" in the text element 356.

Next to the text element 356 in the second area 306b, the client device 300 displays a text color selector 355. A user may use the color selector 355 to change the color and/or saturation of the text element 356. To illustrate, Susie may select the color selector 355 by selecting the color selector 355 with her finger (e.g., to initiate a press event). As shown in FIG. 6B, upon selecting the color selector 360, the client device 300 may replace the color selector 355 with a color wheel 360. In other words, Susie tapping or tapping and holding her finger on the color selector 355 may trigger the client device 300 to display the color wheel 360 over or in place of the color selector 355.

While holding her finger on the touch screen (e.g., maintaining the press event), Susie may rotate her finger to change the color displayed in the center of the color wheel 360, which corresponds to the color of the text in the text element 356. In other words, as Susie rotates her finger around the color wheel 360, the color of the text in the text element 356 may dynamically change and update in real-time. In some instances, the client device 300 determines the angle of rotation with respect to the center of the color wheel 360 to determine which color to display to the user within the color wheel 306. In other instances, the client device uses another focal point, such as a hidden focal point, to determine the rotational angle. In some example embodiments, Susie may rotate her finger around the color wheel 360 only once to cycle through each available color option. In alternative embodiments, depending on the number of available colors (e.g., hues) and the selection granularity, Susie may need to rotate her finger around the color wheel 360 numerous times before cycling through all of the color options.

Figure 6C:
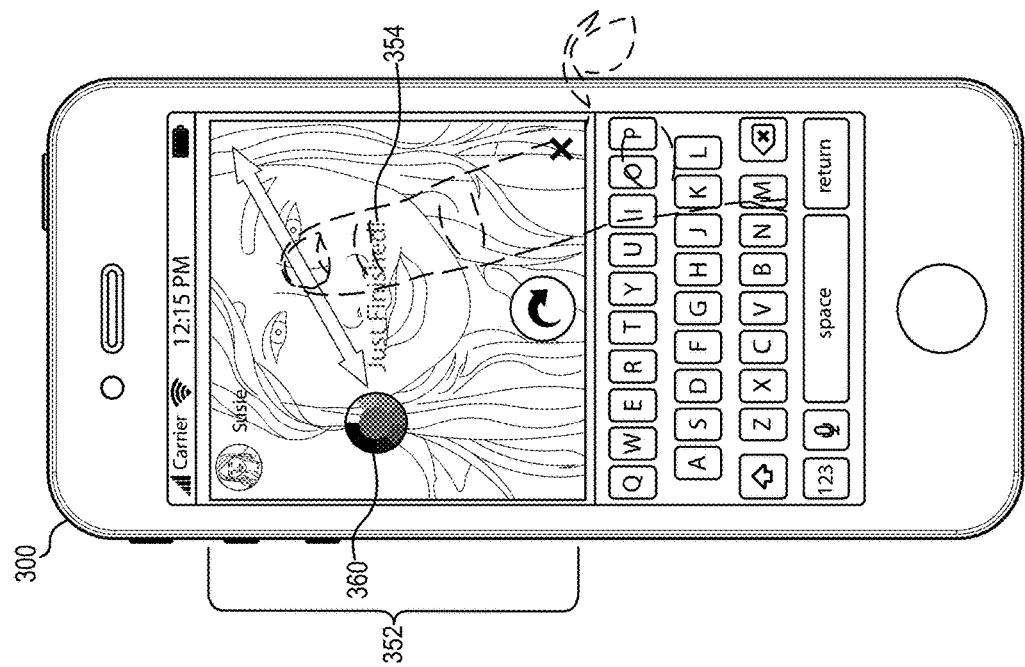

As shown in FIG. 6B, the default color shown in the color wheel 360 is black. While holding down her finger, Susie may move her finger around the color wheel 360. For example, Susie may rotate her finger around the color wheel 360 and stop when the color in the center of the color wheel 360 (referred to as the "selected color") reaches a desirable color. As shown in FIG. 6C and for purposes of explanation, Susie rotates the color wheel 360 until the selected color shows a gray color. As such, the color of the text element 354 matches the selected color from the color wheel 360.

Figure 6D:
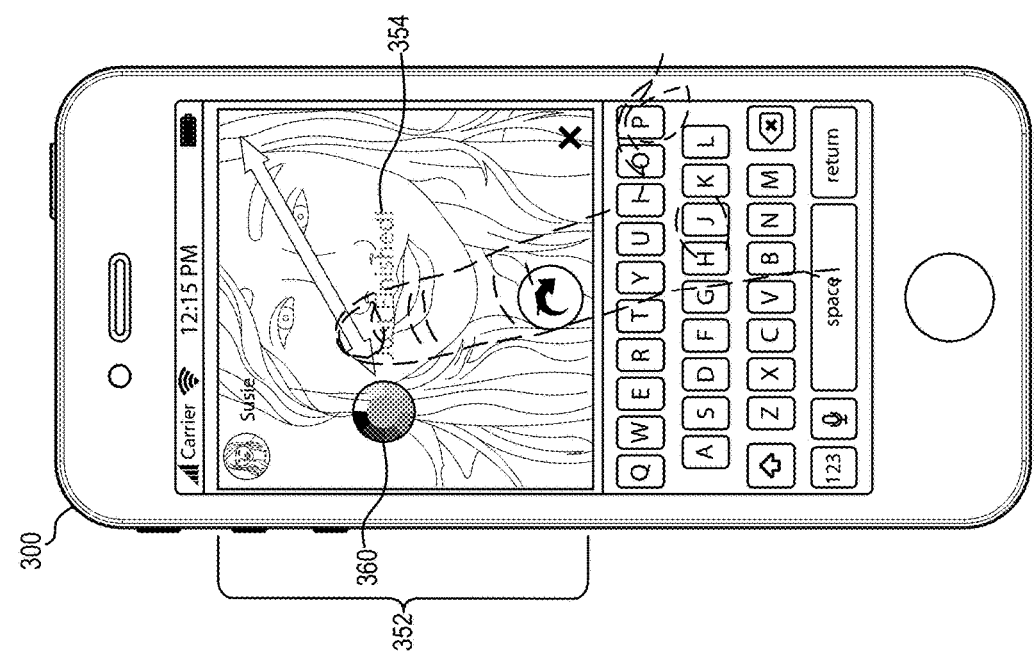

In addition to selecting a color on the color wheel 360, Susie can use the same touch gesture (e.g., while still pressing her finger to the touch screen) to change the saturation (e.g., the tone or value) of the selected color. For example, as shown in FIG. 6C, Susie can move her finger in a linear direction away from the color wheel 360 (or other selected focal point) to increase the saturation of the selected color or move her finger back towards the color wheel 360 in decrease saturation. To illustrate, FIG. 6D shows that Susie moves her finger away from the color wheel causing the select color of gray to become more saturated. Consequently, the selected color in the center of the color wheel 360 as well as the color of the text element 356 is shown as dark gray in FIG. 6D.

Upon arriving at the desired color and saturation level, Susie releases her finger. When Susie releases her finger, the client device 300 can detect a release event and lock in the selected color to the text. Further, upon detecting Susie releasing her finger, the client device 300 may hide the color wheel 360 and again display the color selector 355 next to the text element 356, as shown in FIG. 6A. The client device 300 may show the color selector 355 a white circle or a circle filled in with the selected color.

As described above, the single touch gesture of Susie touching the screen and moving her finger can result in the change in two attributes of the text element 356 (e.g., color change and color saturation). Further, Susie can change both characteristics at the same time. In other words, Susie can change both the color and the color saturation of the selected text by rotating her finger around color wheel 360 while simultaneously moving her finger away or towards the color wheel 360.

In some example embodiments, a user may select the color selector 355 to activate the color wheel 360. In these embodiments, the color wheel 360 remains activated until the user selects an additional element, such as a confirmation element, confirming the selected color displayed in the center of the color wheel 360. In some instances, the center of the color wheel 360 may serve as the confirmation element. In other instances, the client device 300 may display a separate confirmation element, such as a graphical checkmark in the corner of the text input window 352.

FIGS. 7A-7B show another embodiment of the client device 300 for modifying content within a content item using simple touch gestures. To illustrate, the client device 300 in FIGS. 7A-7B show the capture window 310 in the second area 306b and the keyboard 358 in the fourth area 306d. Further, the capture window 310 includes a real-time image of Susie. As such, Susie can cause the client device 300 to capture an image (or video) by pressing the capture option 312. While displaying the capture window 310, the client device 300 can enable Susie to add a color layer over her image. For example, a user can add a color layer by providing a touch gesture (e.g., a tap or press event) within the second area 306b. Alternatively, Susie may select a menu option or other graphical element to add a color layer over her image shown in the capture window 310.

The color of the color layer may depend on the location of the touch gesture. Further, the transparency level of the color layer may also depend of the location of the tap gesture. Details regarding selecting a color for the color layer are described with respect to FIG. 7A. Details regarding selecting a transparency level for the color layer are described with respect to FIG. 7B.

As FIG. 7A illustrates, Susie provides a continuous horizontal touch gesture 366 to change the color of the color layer. In general, the continuous horizontal touch gesture 366 may be a continuation of the touch gesture that adds the color layer over Susie's image in the capture window 310. In other words, by Susie touching her finger to the touch screen within the area of the capture window 310, the client device 300 adds the color layer, and by moving her finger horizontally along the touch screen while her finger is pressed, the client device 300 can change the color of the color layer.

As an example, if Susie presses her finger on the left side of the second area 306b, the client device 300 may show a red color layer. As Susie moves her finger to the right (e.g., provides the continuous horizontal touch gesture 366) the color in the color layer can dynamically change, in real-time, from red to orange, yellow, green, cyan, blue, violet, and finally to magenta. If Susie moves her finger back to the left, the color in the color layer can cycle back through the various colors. Alternatively, the client device 300 can randomly change the colors of the color layer as Susie moves her finger.

Specifically, in one or more embodiments, the client device 300 may map the capture window 310 into a number of columns that correspond to the number of available colors and color combinations. For example, the client device 300 may map the capture window into 256 columns corresponding to 256 color combinations. When a user selects one of the columns, by pressing or moving their finger over the column, the client device 300 may display the selected color combination. Accordingly, as Susie provides a continuous horizontal touch gesture 366 within the capture window 310, the client device 300 displays each selected color combination as the color combination is selected.

Similarly, as shown in FIG. 7B, Susie may also provide a continuous vertical touch gesture 368 within the capture window 310 to change the transparency of the color layer. For example, as Susie moves her finger up and down within the capture window 310, the color layer may change from invisible (e.g., 100% transparent) to solid (e.g., 0% transparent). Thus, when the color layer is invisible, Susie's image in the capture window 310 is clearly visible. As the color layer becomes less transparent, the color in the color layer begins to appear and Susie's image becomes clouded by the color layer. When the color layer is solid, only the color of the color image is visible and the color layer blocks Susie's image.

The client device 300 may divide the capture window 310 into rows, such as 101 rows (e.g., 0-100), where each row corresponds to a transparency level or percentage. As with the column of color combinations, the client device 300 may detect which row Susie is selecting and activate the corresponding transparency level. For example, if Susie selects row forty, the client device 300 may apply the transparency level of 40% to the color layer.

In some example embodiments, the rows are not equal in height. For example, the client device 300 may increase the row height of the first and last row to allow the user select these rows. Further, the client device 300 may increase the size of the rows corresponding to the more popular values. For example, if the most common selected transparency levels are 30%, 45%, and 60%, the client device 300 may increase the row height of rows 30, 45, and 60 to allow users to easily select these values. Likewise, the client device 300 may shirk the row height or eliminate rows corresponding to the less popular values.

The rows corresponding to the transparency level of the color layer may overlap with the columns corresponding to the color combinations of the color layer to form grid or a matrix. As such, when a user provides input (e.g., via a touch gesture), the client device 300 can detect the matching grid coordinate or matrix entry and apply the corresponding color combination and transparency level. In this manner, as the user provides a continuous touch gesture that includes both the continuous horizontal touch gesture 366 as well as the continuous vertical touch gesture 368, the client device 300 can dynamically display each combination of color and transparency level in real-time to the user within the capture window 310.

Further, if Susie is moving her finger around the capture window 310 as part of a continuous touch input, her finger may pass over other elements displayed in the capture window 310, such as the cancel capture option 347, capture option 312, add text element option 350, or other options. In some embodiments, if Susie initiates a continuous touch gesture (e.g., Susie touches the touch screen) separate from the other elements in the capture window 310 to select a color and transparency level and subsequently moves over one of the other elements as part of the same continuous touch gesture (e.g., Susie does not remove her finger from the screen), the client device 300 treats the touch input from the continuous touch gesture as user input to change the color and transparency level rather than as user input to select one of the other elements. For example, if Susie's finger passes over the capture element 312 as part of a continuous touch gesture to modify attributes of the color layer, the client device 300 detects and uses the input to modify the color layer and not to capture Susie's image.

As described above, Susie may provide a continuous touch gesture to add a color layer as well as change the color and transparency level of the color layer. In one or more embodiments, Susie can provide additional touch gestures to further change the attributes of the color layer. For instance, after selecting a color of magenta at 75% transparency for the color layer over her picture (e.g., Susie has released her finger from a first location of the touch screen), Susie may then tap a second location of the touch screen with her finger to change the color layer to green at 25% transparency.

While FIGS. 7A and 7B display a capture window 310, the client device 300 can also add the color layer to the approval window 311. To illustrate, Susie may select the capture option 312 and capture an image without first adding the color layer. While viewing the captured image approval window 311, Susie may add a color layer by using the same methods described above. For example, Susie may press the touch screen in the approval window 311 to add a color layer and Susie may further move her finger around the approval window to select a color and transparency level of the color layer. When Susie is satisfied with the color layer, Susie may select the share option 348 to post the captured content item to a content presentation.

FIGS. 8A-8B provide an embodiment of the client device 300 for resizing a content item within a presentation feed. To illustrate, the client device 300 in FIGS. 8A-8B show the capture window 310 in the second area 306b and the keyboard 358 in the fourth area 306d. Further, the capture window 310 shows a real-time image of Susie.

The capture window 310 also includes a resizing element 370. Susie can interact with the resizing element 370 using a touch gesture and use the resizing element 370 to resize the height of the capture window 310. For example, as shown in FIG. 8B, Susie selects and moves the resizing element 370 down to shrink the height of the capture window 310, as shown in FIG. 8B. While Susie can shrink the height of the capture window 310, the client device 300 may not allow Susie to shrink the capture window 310 past a minimum height (e.g., 20% of the width, 1 centimeter, 20 pixels, etc.). In a similar manner, Susie can use the resizing element 370 to increase the height of the capture window 310. In particular, Susie can select the resizing element 370 and drag the resizing element 370 up to increase the height of the capture window 310. The client device 300, however, may not let the user increase the height of beyond a maximum amount (e.g., the client device 300 may not allow the height to exceed the width or to exceed 1.5 times the width of the capture window 310).

By changing the size of the capture window 310, the user can change the size of the image or video that the client device 300 captures when the user presses the capture option 312. For example, if Susie shrinks the size of the capture window 310 to half size, captures a content item (e.g., a digital photo), and shares the content item, the shared content item appears as half of the size of a shared content item that has not been non-resized.

Because the capture window 310 provides a live preview, Susie can use the resized capture window when deciding what image to capture. For example, Susie may shrink the capture window 310 to a quarter size, then position the camera of the client device 300 to show a desired image within the resized capture window 310. Upon selecting the capture option 312, the client device 300 may capture a content item that includes the desired image having the desired size.

In an alternative embodiment, Susie can resize the height of a captured content item. For example, Susie captures a full size image and the client device 300 displays the full size image to Susie in the approval window 311. The client device 300 also provides the resizing element 370 within the approval window 311. As such, Susie can use the resizing element 370 to resize the height of the captured image within the approval window 311. When resizing the approval window 311, the client device 300 may automatically crop the captured image, such as crop the top, crop the bottom, or a combination of the top and bottom (e.g., crop equally from the top and bottom). In some cases, the client device 300 may use facial or object recognition to determine which portions to crop out as a user shrinks the height of the approval window 311. Alternatively, the client device 300 may allow a user to move the captured content item within the approval window 311 when the user shrinks the height of the approval window 311. For example, the client device 300 may allow the user to reposition the captured content item after the user shrinks the height of the approval window 311.

Figure 9:
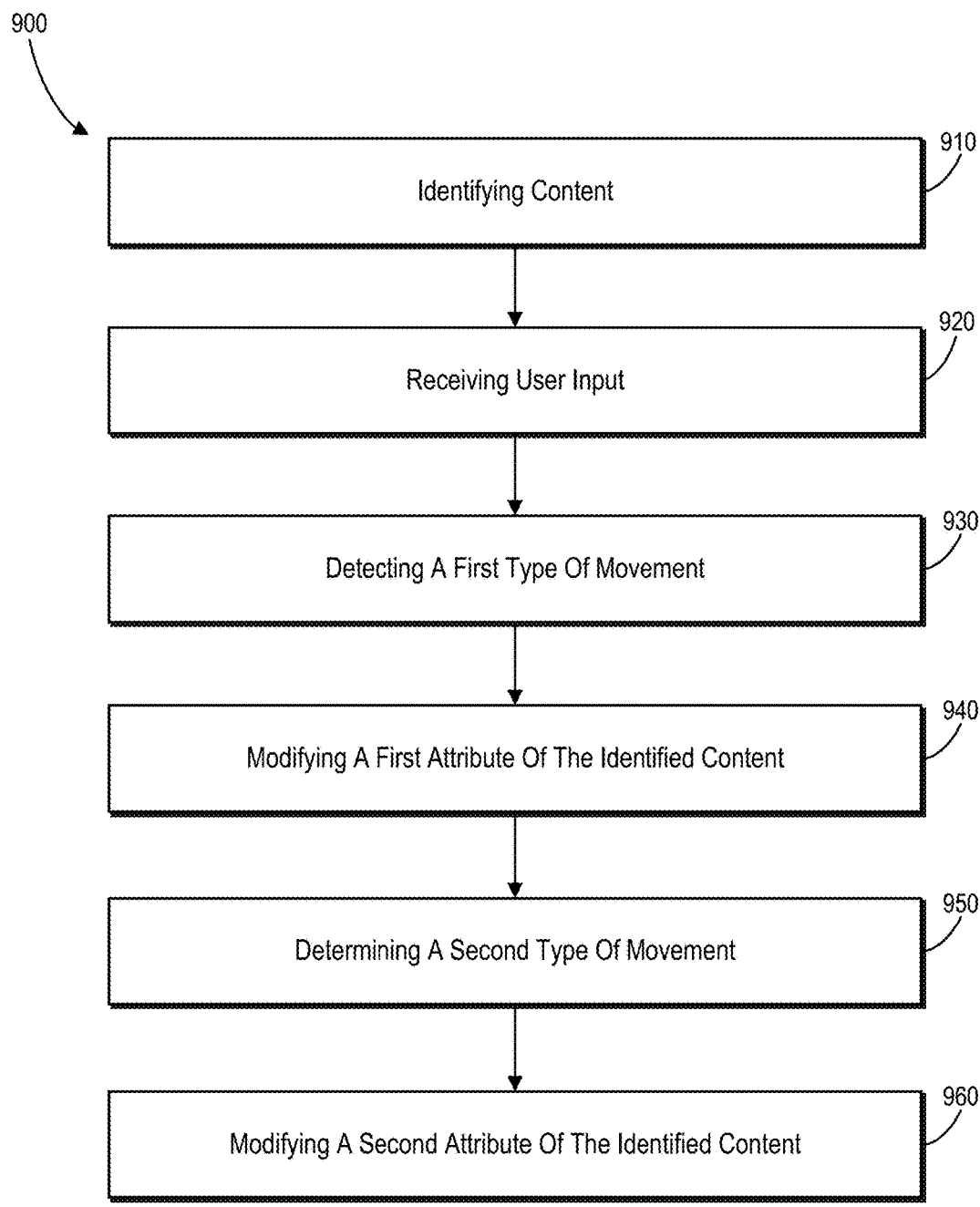
FIG. 9 illustrates a flowchart of a method for modifying content within a content item in accordance with one or more embodiments described herein.

FIG. 9 illustrates a flowchart of a method 900 for modifying content within a content item in accordance with one or more embodiments described herein. In some example embodiments, a client device, such as one of client devices 104, 105, 204, or 300 described herein, performs the method 900. Further, the client device can be in communication with a content presentation system, such as the content presentation system 102 disclosed herein.

The method 900 includes an act 910 of identifying content. In particular, the act 910 may involve identifying content on a client device 300 associated with a user within a content item. In some embodiments, the act 910 may include capturing content using the client device 300. Further, the content may include an image and/or text provided by the user. The method 900 also includes an act 920 of receiving user input. In particular, the act 920 may involve receiving continual user input corresponding to the identified content. For example, the act 920 may involve detecting a press event followed by movement with regard to the identified content before detecting a release event. Further, the act 920 may involve detecting user input from a touch gesture or from pointer movement (e.g., a user moving a mouse).

In addition, the method 900 includes an act 930 of detecting a first type of movement. In particular, the act 930 may involve detecting a first type of movement based on the continual user input. In one or more embodiments, the act 930 may involve detecting horizontal movement as the first type of movement. In other embodiments, the act 930 may involve detecting rotational movement as the first type of movement.

The method 900 includes an act 940 of modifying a first attribute of the identified content. In particular, the act 940 may involve modifying, as the continual user input is received, a first attribute of the identified content based on the first type of movement. In some embodiments, the act 930 may involve changing the color of a color layer associated with the content based on the horizontal movement. In other embodiments, the act 930 may involve changing the text color based on the rotational movement.

The method 900 includes an act 950 of determining a second type of movement. In particular, the act 950 may involve determining a second type of movement based on the continual user input. In one or more embodiments, the act 950 may involve detecting vertical movement as the second type of movement. In other embodiments, the act 950 may involve detecting linear movement as the second type of movement.

The method 900 includes an act 960 of modifying a second attribute of the identified content. In particular, the act 960 may involve modifying, as the continual user input is received, a second attribute of the identified content based on the second type of movement. In some embodiments, the act 960 may involve changing the transparency of the color layer associated with the content item based on the vertical movement. In other embodiments, the act 960 may involve changing the text color saturation based on the linear movement.

The method 900 may also include the act of resizing the content item within a content presentation based on receiving additional user input to resize the content item. Further, the method 900 may also include the act of presenting, to the user, a selectable graphical element within the content item, receiving a selection of the selectable element, capturing content via the client device based on receiving a selection of the selectable graphical element from the user, updating the visual presentation of the selectable graphical element based on capturing the content, and modifying the selectable graphical element that when selected by the user causes the client device to share the content item within the presentation feed based on updating the visual presentation of the selectable element.

FIGS. 10A-10D illustrate an embodiment of the client device 300 for providing notifications to a user and automatically navigating to specific content items based on the user's interaction with the notifications. As with previous figures, FIGS. 10A-10D illustrate the client device 300 having content presented within the first area 306a and the second area 306b. Similar to the above figures, and as shown in FIG. 10A, the first area 306a displays multiple presentation feeds 308a-b corresponding to user groups. For example, a user associated with the client device 300 belongs to the groups "Friends," "Family," and "School." When the user navigates to (e.g., selects) a particular presentation feed in the first area 306a, the client device 300 populates the second area 306b with one or more content presentations corresponding to the select presentation feed. Thus, as shown in FIG. 10A, the client device 300 displays content presentations 320a-b that correspond to the school presentation feed 308b.

In addition, the first area 306a of the client device 300 includes feed notifications 376 corresponding to the presentation feeds 308a-b. As shown in FIG. 10A, the family presentation feed 308a shows a corresponding family feed notification 376a with the number "3," and the school presentation feed 308b shows a corresponding school feed notification 376b with the number "2." A feed notification 376 can indicate that a corresponding presentation feed includes unviewed or new content items (e.g., the school presentation feed 308b includes two unviewed content item 322). Alternatively or additionally, a feed notification 376 may indicate the number of users that are currently active in a corresponding presentation feed 308. In some cases, the number of currently active users includes the user associated with the client device 300. For example, a feed notification 376 can include two numerals with one numeral representing unviewed content items and the other numeral representing the number of active users.

When the first area 306a displays a feed notification 376 for the presentation feeds, the client device 300 can display a content item notification 378 in second area 306b that also corresponds to the selected presentation feed (e.g., the school presentation feed 308b in FIG. 10A). Thus, if a user switches between presentation feeds, the client device 300 may update the content item notification 378 to match the feed notification 376 of the selected presentation feed, as further described below with respect to FIG. 10D. In one or more embodiments, the content item notification 378 can also be a selectable graphical element (e.g., a button) that allows a user to navigate to unviewed content items 322 within the second area 306b. For example, upon the user selecting the content item notification 378, the client device 300 can automatically navigate to an unviewed content item in the second area 306b.

In the case that multiple unviewed content items 322 exist for a presentation feed 308, the client device 300 may identify the next unviewed content item to provide in response to a user interacting with the content item notification 378. The determination can be based on position in the presentation feed (e.g., jump to the next closest unviewed content item), when the content item was posted (e.g., jump to the next oldest or newest unviewed content item), if the other unviewed content items are in the same content presentation, navigational distance (e.g., jump to an unviewed content item in an adjacent content presentation), user interests (e.g., jump to an unviewed content item shared by a favorite co-user), etc.

In addition, the client device 300 can decrement the display content item notification 378 (e.g., change the display number from "4" to "3") in response to navigating to the unviewed content item. Alternatively, the client device 300 can increase the display of the content item notification 378 (e.g., add a number within the display) when an unviewed content item is added to the selected presentation. More specifically, the client device 300 may maintain a record for each presentation feed indicating which content items a user has not yet viewed along with a count. Each time the user views an unviewed content item or an unviewed content item is added to a presentation feed, the client device 300 updates the count for the presentation feed. The client device 300 may display a feed notification 376 and/or content item notification 378 for each presentation feed displaying the count. In some cases, when the count is zero, the client device 300 may hide the feed notification 376 and/or content item notification 378.

To illustrate, a user may be viewing the first content item 322a of the first content presentation 320a in the school presentation feed 308b, as shown in FIG. 10A. While viewing the first content item 322a, the client device 300 may display the content item notification 378 in the second area 306b indicating that the user has two unviewed messages. The user may select (e.g., provide a touch gesture) with respect to the content item notification 378. In response, and as shown in FIG. 10B, the client device 300 navigates within the school presentation feed 308b to the third content item 322c provided by Lenny within the second content presentation 320b, which the user has not previously viewed.

As mentioned above, the content item notification 378 updates the content item notification 378 upon navigating to an unviewed content item. Thus, as shown in FIG. 10B, the content item notification 378 changed from displaying "2" (FIG. 10A) to displaying "1" (FIG. 10B), indicating that only one unviewed content item remains in the school presentation feed 308b. Further, the client device 300 updates the school feed notification 376b displayed in the first area 306a in connection with the school presentation feed 308b.

When navigating to the third content item 322c within the second content presentation 320b, the client device 300 can determine the optimal position within the second area 306b to display the third content item 322c. For example, because the third content item 322 is added to another post from Susie (i.e., the second content item 322b) in the second content presentation 322b, the client device 300 displays the second content item 322b (or a portion thereof) with the third content item 322c in the second area 306b. In this manner, a user can view the third content item 322c in context with one or more previous content items to which the third content item 322c was added. Alternatively, if the client device 300 is navigating to an unviewed content item that is the first content item in a new content presentation, the client device 300 can position the unviewed content item at the top of the second area 306b.

Further, the client device 300 can display the unviewed content item in the second area 306b such that the unviewed content item does not block the content item notification 378 when the content item notification 378 is still present after navigating to the unviewed content item. For example, as shown in FIG. 10B, the third content item 322c is presented above the content item notification 378. In this manner, the content item notification 378 does not block the options to allow a user to like, add to, or comment on a content presentation.

Figure 10C:
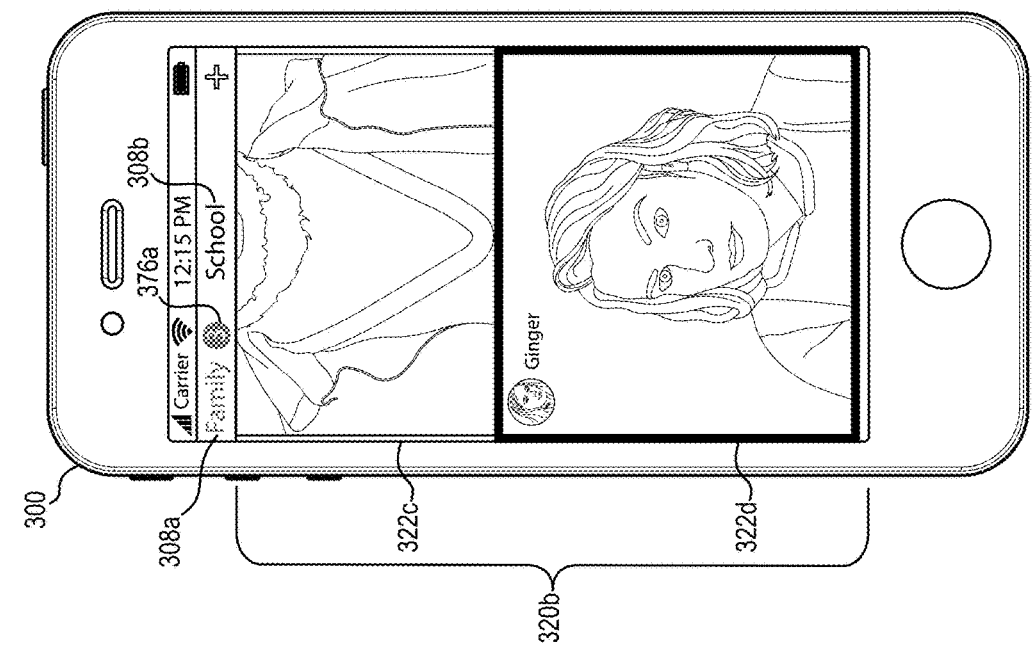

When the user again selects the content item notification 378, the client device 300 again navigates to the next unviewed content item, as shown in FIG. 10C. In particular, FIG. 10C shows the client device 300 navigating to the next unviewed client device (e.g., the fourth content item 322d, which is within the second content presentation 320b). Further, because the user has viewed all of the unviewed content items in the school presentation feed 320b, the client device 300 hides or removes both the feed notification 376 and the content item notification 378.

In some example embodiments, the client device 300 emphasizes the unviewed content item upon navigating to the content item. For example, as shown in FIG. 10C, the client device 300 temporarily enlarges the fourth content item 322d to signal to the user that the fourth content item 322d is an unviewed content item. Providing a signal, such as pulsing a content item, enlarging a content item, flashing the boarder around a content item, or flashing the content item itself can visually signal to a user to the content item to which the content item notification 378 corresponds. The signal can be especially helpful to a user if the client device 300 scrolls through through numerous content items within a presentation feed before arriving at the unviewed content item. The signal can also be helpful if the client device 300 does not navigate at all or only navigates a small distance because the next unviewed content item is already fully or partially displayed in the visible portion of the second area 306b.

As mentioned, the client device 300 may track unviewed content items for each presentation feed. Thus, as shown in FIG. 10C, the school feed notification and the content item notification is hidden because the user has navigated to the two previously unviewed content items. The family feed notification 376a, however, still indicates three unviewed content items within the family presentation feed 308a. Thus, upon the user selecting the family presentation feed 308a in the first area 306a, as shown in FIG. 10D, the second area 306b again displays the content item notification 378 with the number "3" indicating three unviewed content items within the family presentation feed 308a. Again, and described above, the user can interact with the content item notification 378 to navigate to the unviewed content items within the family presentation feed 308a.

FIGS. 11A-11B provide an embodiment of the client device 300 for displaying co-users on a presentation feed. As shown in FIG. 11A, the first area 306a of the client device 300 displays the school presentation feed 308. For purposes of explanation, the first area 306a only displays one presentation feed 308, however, one will appreciate that the first area 306a can include additional presentation feeds, as shown in previous figures. Further, as described above, the second area 306b displays content presentation 320a and content items 322a-b corresponding to the school presentation feed 308.

The first area 306a may be interactive. For example, a user may provide a gesture, such as a down swipe touch gesture through the first area 306a (e.g., when in a display state shown in the previous figures) to enlarge the first area 306a, as shown in FIG. 11A. When enlarged, the first area 306a can display user badges 328 of users have that have joined to the group corresponding to the school presentation feed 308. For example, as FIG. 11A illustrates, the enlarged first area 306a shows user badges 328 for Susie, Danny, and Lenny. As described above, the user badges 328 can include an image and name provided by the corresponding user.

The enlarged first area 306a also shows an additional users badge 329. The additional users badge 329 indicates that at least two or more additional users belong to the group. For example, as shown in FIG. 11A, seven additional users belong to the school group as indicated by the "+7" displayed in the additional users badge 329. Further, in some example embodiments, upon selecting the additional users badge 329, the client device 300 can display a list of users that belong to the group, such as providing a list in the second area 306b.

In one or more embodiments, the user may provide an additional gesture to further expand the first area 306a. Further expanding the first area 306a can allow the user to view additional user badges in the first area 306a. The additional gesture may be in addition to the gesture described above that initially expands the first area 306a. Alternatively, the additional gesture may be a continuation of the gesture described above, such as the user continuing to drag down his or her finger on the touch screen of the client device 300 to further expand the first area 306a.

To illustrate, FIG. 11B shows an expanded first area 306a. The expanded first area 306a displays more user badges 328 than shown in the enlarged first area 306a of FIG. 11A. As a result, the additional users badge 329 in the expanded first area 306a of FIG. 11B has been updated and displays fewer additional users than in FIG. 11A. In the case that the expanded first area 306a displays all of the users in the group, the client device 300 may hide the additional users badge 329.

The client device 300 may prioritize user badges 328 based on a number of factors. The order of the user badges 328 can determine which user badges 328 are displayed when the first area 306a is enlarged and/or expanded. To illustrate, the client device 300 may prioritize the user badges 328 based on recency of posting a content item. For example, the enlarged first area prioritizes and displays the last three users to post in the school presentation feed 308. As another factor, the client device 300 may display user badges 328 according to user activity in the group (e.g., prioritize the most active group users, or prioritize group users that post most frequently).

The client device 300 may order the user badges 328 based on additional factors, such as connections between the user and other co-users, alphabetical order, favorites, user-defined, or a combination of factors.

Figure 12:
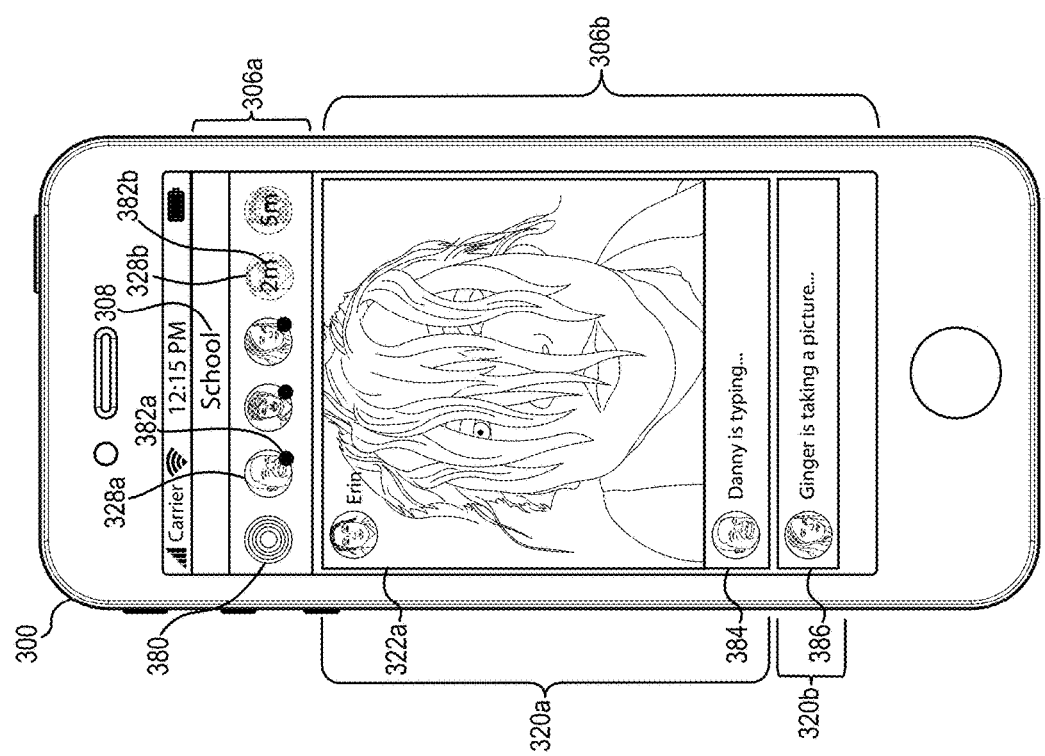
FIG. 12 illustrates an exemplary graphical user interface for displaying status indicators corresponding to co-users of a presentation feed in accordance with one or more embodiments described herein.

In some example embodiments, the client device 300 displays user-status indicators 382 along with user badges 328 in the first area 306a to indicate the status of users within the group. To illustrate, FIG. 12 shows an embodiment of the client device 300 displaying status indicators corresponding to co-users of a presentation feed 308. In particular, FIG. 12 displays user-status indicators 382 within or over user badges 328 in the first area 306a of the school presentation feed 308. As a note, in some embodiments, such as those described with respect to FIGS. 11A-11B, a user can enlarge and/or expand the first area. In other embodiments, such as the embodiment shown in connection with FIG. 12, the first area 306a may be enlarged by default.

As shown in FIG. 12, each user badges 328 is associated with a user-status indicator 382. For example, the first user badge 328a for Danny and corresponding user-status indicator 382a indicates that Danny is active within the group (or active in an application associated with the presentation feed). In other words, when a user is active in the group, the client device 300 may display a dot (e.g., a green dot) over a portion of the user's badge indicating that the user is active. As another example, the second user badge 328b for Erin and the corresponding user-status indicator 382b indicates that Erin has left the group or been idle for 2 minutes (represented by "2 m"). Accordingly, the user-status indicators 382 can inform a user of the users that are active in the group, or when a co-user was last active.

In some embodiments, the user badges 328 can allow a user to communicate with other users in the group. For example, a user can select (e.g., provide a tap gesture) the first user badge 328a to send a direct message to Danny. Alternatively, the user may tap the first user badge 328a to ping Danny (e.g., send a notification to Danny's client device indicating the user's desire to communicate with Danny within the content presentation system 102). As another example, a user can select (e.g., hold down) the first user badge 328a to initiate a live video stream with Danny as long as Danny is shown as active.

FIG. 12 also shows a broadcast element 380 within the first area 306a. A user can select (e.g., provide a tap gesture) to ping or notify all of the co-users in the school presentation feed 308, as described further below. In some example embodiments, the user can hold down the broadcast element 380 to initiate a live video stream within the school presentation feed 308. Alternatively or additionally, rather than selecting the broadcast element 380, the user holds down their own user badge to initiate a live video stream within the school presentation feed 308. For example, if Danny was the user associated with the client device 300, Danny could initiate a live video stream within the school presentation feed 308 by holding down the first user badge 328b. The user may also initiate a live video stream as described above in connection with FIGS. 3C-3D.

In addition, FIG. 12 displays added status indicators associated with users in the school presentation feed 308. Specifically, in the second area 306b, the client device 300 displays a typing message 384 where a co-user is composing a message to post in the first content presentation 320a. As shown, the typing message 384 in the second area indicates that Danny is actively typing a message to add to the first content presentation 320a. The background of the typing message 384 may match the color that Danny has selected, or currently selecting, in connection with the content item Danny is composing (as described with respect to FIGS. 7A-7B). The second area 306b also shows an image capture message 386 that indicates that Ginger is capturing an image to post within a second content presentation 320b. The client device 300 can remove or hide the image capture message 386 if Ginger cancels capturing an image to post to the second content presentation 320b or upon Ginger posting a content item of the captured image to the school presentation feed 308.

Figure 13:
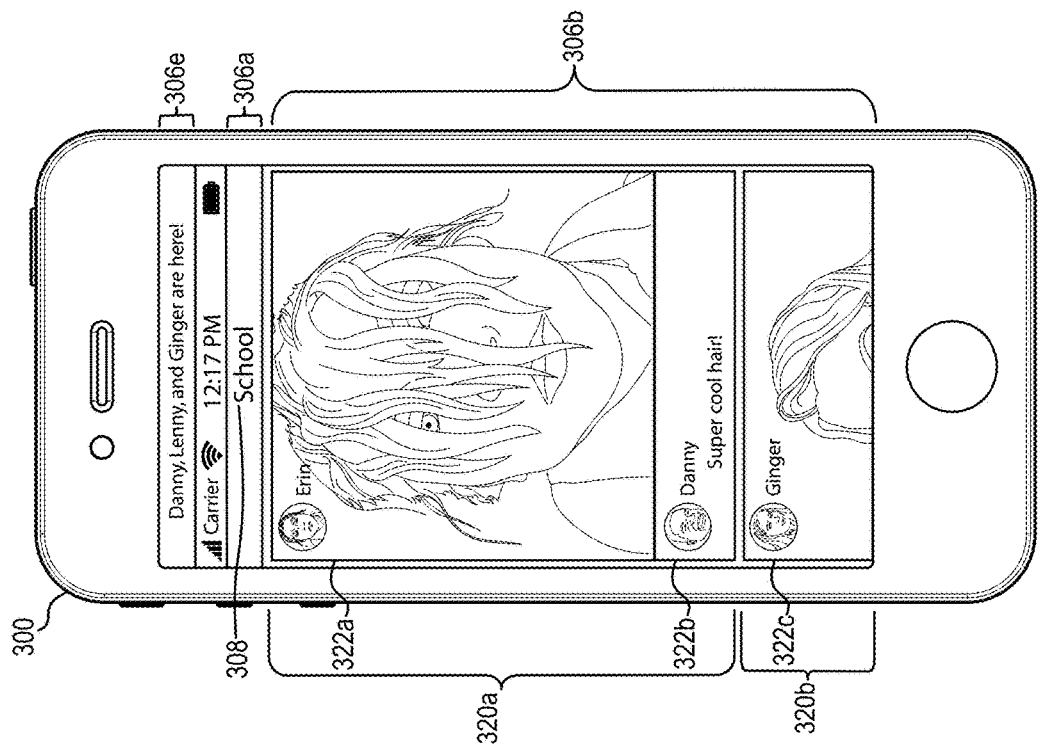
FIG. 13 illustrates an exemplary graphical user interface for displaying a status indicator corresponding to co-users active in a presentation feed in accordance with one or more embodiments described herein.

Turning now to FIG. 13, which shows a similar configuration as FIG. 12, Danny has posted the second content item 322b in the first content presentation 320a and Ginger has posted the third content item 322c as part of the second content presentation 320b. Further, FIG. 13 illustrates an alternative embodiment for the client device 300 displaying a status indicator corresponding to co-users active in a presentation feed. In particular, the client device 300 in FIG. 13 illustrates a fifth area 360a that indicates which users are active in the school presentation feed 308 (and/or other presentation feeds not shown). For example, the fifth area 306e indicates that Danny, Lenny, and Ginger are active.

In some example embodiments, the style of the fifth area 306e may be configured to match the look of the client device 300. For example, if the face of the client device 300 is white, the background of the fifth area 306e may also be white to match the client device. Alternatively, if the face of the client device 300 is black, the background of the fifth area 306e may be black. In some instances, the style of the fifth area 306e is user customizable.

Further, the client device 300 may display additional notifications in the fifth area 306e. For example, when a new user enters to the school presentation feed 308 (and/or other presentation feeds not shown), the client device 300 may flash the name of the new user in the fifth area 306e. Similarly, the client device 300 may use the fifth area 306e to indicate when another user is sending a communication to the user associated with the client device 300 (e.g., a co-user is sending a ping to the user).

Figure 14:
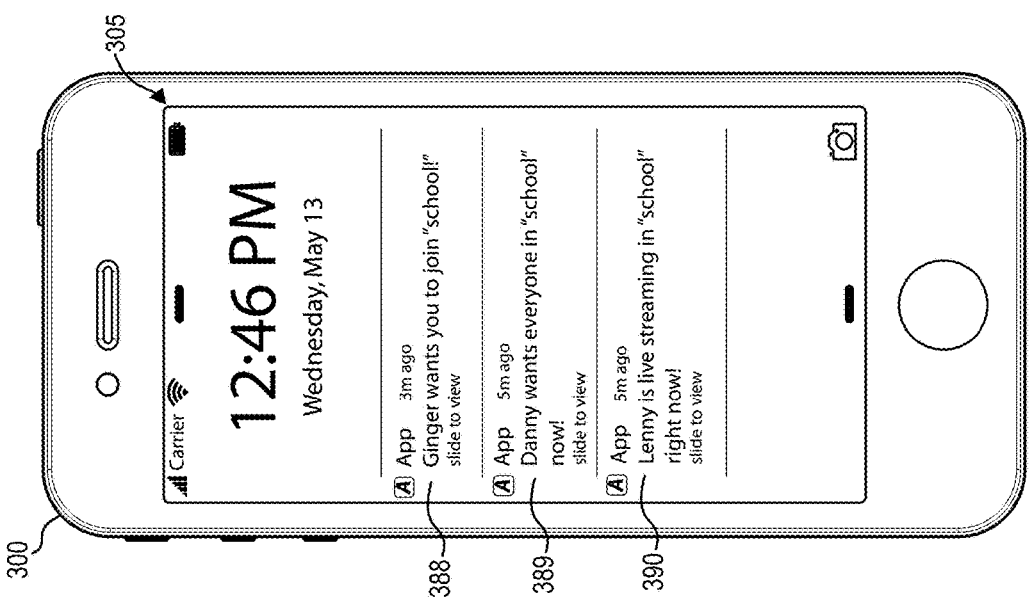
FIG. 14 illustrates an exemplary graphical user interface providing notifications to a user via the content presentation system in accordance with one or more embodiments described herein.

FIG. 14 provides an embodiment of the client device 300 for the content presentation system 102 providing notifications to a user. The client device 300 may display a second graphical user interface 305 (or simply "second interface 305"). The client device 300 may display the second interface 305 apart from the user interface 304 described above. For example, the client device 300 may display the second interface 305 on a notification screen or a lock screen associated with the client device 300.

The second interface 305 may include various notifications provided by the content presentation system 102. As described above, a user may ping another user in a group, ping all the users in a group, or start a live video stream to provide to other users in a group. Accordingly, when a user is pinged directly by another user, the content presentation system 102 may provide a personal notification 388 to the client device 300, and the client device 300 may display the personal notification 388 in the second interface 305.

To illustrate, Ginger may ping the user associated with the client device 300. In response, the second interface 305 displays the personal notification 388 saying "Ginger wants you to join 'school.'" Similarly, when a co-user in a group sends a group notification 389, the content presentation system 102 may send the group notification 389 to other users in the group. For example, Danny may send a group notification 389 to users in the school group requesting that the users join the group. As shown in FIG. 14, the second interface 305 includes a group notification 389 from Danny inviting everyone in the school group to join the school group.

The second interface 305 also displays a live streaming notification 390. For example, Lenny sends a notification to the user associated with the client device 300, via the content presentation system 102, that he is streaming live content in the school group. As such, the second interface 305 may display the live streaming notification 390 to the user indicating the live stream. The user can respond to the live streaming notification 390 by accessing the content presentation system 102 (e.g., by way of an application on client device 300) and viewing Lenny's live stream.

In general, the content presentation system 102 sends the notifications shown in FIG. 14 to a user when the user is not active on the content presentation system 102. When a user is active on the content presentation system 102, the content presentation system can provide a user notifications as discussed above with reference to FIGS. 10A-13. The content presentation system 102, however, can also send notifications shown in FIG. 14 to a user even when the user is active on the content presentation system 102. For example, a user may be active in the family group, and the content presentation system 102 sends a group notification 389 to the user indicating that Danny wants the user to switch to the school group.

Further, just as the content presentation system 102 can provide notifications, the content presentation system 102 can revoke, remove, or clear notifications. Specifically, the content presentation system 102 may provide instructions to the client device 300 to clear a notification when a user performs an action that nullifies the notification. For instance, when the user joins the school group, the content presentation system 102 may send instructions to the client device 300 to clear the personal notification 388, the group notification 389, and/or the live streaming notification 390. As another example, when all the users of a group leave, or less than a predetermined number of users remain in the group, the content presentation system 102 can clear the group notification 389.

Additionally, and/or alternatively, the content presentation system 102 can update a notification based on actions of the co-user that requested the notification. For example, as described above, Lenny requested that the content presentation system 102 send the live streaming notification 390 to the user associated with the client device 300. When Lenny finishes his live stream, the content presentation system 102 may send instructions to the client device 300 to clear the live streaming notification 390. The client device 300 may remove the corresponding live streaming notification 390 as long as the notification has not already been cleared (e.g., the user responds directly to the live streaming notification 390 or manually clears the live streaming notification 390).

Similarly, the content presentation system 102 can detect when other notifications expire or timeout. In particular, the content presentation system 102 can track when an active user sends, via the content presentation system 102, one or more notifications to other users. When the active user becomes inactive (including exiting the content presentation system 102), the content presentation system 102 can identify any pending notifications corresponding to the user, and send instructions clearing the pending notifications. In some example embodiments, the content presentation system 102 may wait a threshold amount of time after the active user becomes inactive before clearing the notifications requested by the user (e.g., 5 minutes).

Figure 15:
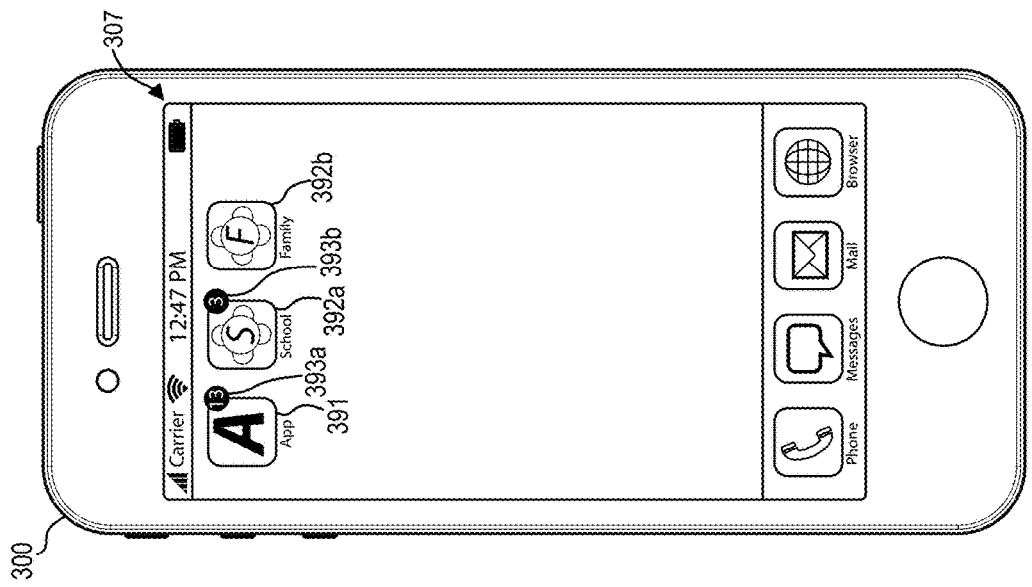
FIG. 15 illustrates another exemplary graphical user interface for providing notifications to a user via the content presentation system in accordance with one or more embodiments described herein.

FIG. 15 illustrates another embodiment of the client device 300 providing notifications to a user. The client device 300 may display a third graphical user interface 307 (or simply "third interface 307"). The client device 300 can display the third interface 307 apart from the graphical user interface 304 and the second interface 305 described above. For example, the client device 300 may display the second interface 305 on a home screen or launch screen associated with the client device 300.

As illustrated in FIG. 15, the third interface 307 includes an application icon 391. The application icon 391 may correspond to the content presentation system 102. For example, a user may select the application icon 391 to access the graphical user interface 304 to view one or more presentation feeds. The third interface 307 may also include links 392a-b to presentation feeds or groups within the content presentation system 102. For example, the school link 392a may link to the school presentation feed and the family link 392b may link to the family presentation feed within the application corresponding to the application icon 391.

The third interface 307 may also include content presentation system notification status badges 393 (or simply "status badges 393"). A status badge 393 may indicate the number of unviewed content items within a user's presentation feed. Alternatively, a status badge 393 may indicate the number of co-users actively accessing the content presentation system 102. For example, the application status badge 393a displayed over the application 391 indicates that thirteen co-users are active on the content presentation system 102. Likewise, the school status badge 393b displayed over the school link 392a indicates that three co-users are active in the school group. Further, the client device 300 may hide the family status badge from the family link 392b because no co-users belonging to the family group are active.

In another embodiment, the application status badge 393a indicates that the user has thirteen total unviewed content items, and the school status badge 393b indicates that the user has three unviewed content items in the school group. Additionally, the lack of the family status badge indicates that the user does not have any unviewed content item in the family group. Further, in some example embodiments, the client device 300 may display multiple status badges 393 for the application 391 and/or the links 392a-b, such as displaying a first application status badge indicating the number of active users and a second status badge indicating the number of unviewed content items.

The status badges 393 can dynamically update based on actions of the user and/or co-users of the content presentation system 102. For example, if a status badge 393 corresponds to the number of active users in the content presentation system 102, as the number of co-users change, the content presentation system 102 can update the number displayed in the status badge 393 to match the number of active users.

FIGS. 16A-16B show an embodiment of the client device 300 for providing notifications to a user within a social networking system application. FIG. 16A shows the client device 300 displaying a fourth graphical user interface 309 (or simply "forth interface 309"). The fourth interface 309 may include various elements associated with a social networking system application. Additionally, the fourth interface 309 may include a sixth area 306f, as shown in FIG. 16A. The sixth area 306f includes content from the content presentation system 102 and is displayed within the social networking system application. For example, the content presentation system 102 can provide a plug-in or an API to the social networking system that displays content from the content presentation system 102 (shown in the sixth area 306f) within the social networking system application.

The sixth area 306f may include group labels 333 that are associated with a user's presentation feeds (e.g., groups to which the user belongs). As shown, the sixth area 306f includes the group labels 333 of "Friends," "Family," and "School." Further, each group label 333 may include a group label notification 377 that indicates the number of unviewed content items (or number of active co-users, or both) in the corresponding presentation feed. The sixth area 306f also includes an additional groups label 335. While the additional groups label 335 does not show a label notification in FIG. 16A, one will appreciate that the additional groups label 335 can include label notifications that indicate the number of unviewed content items and/or number of active co-users on the content presentation system 102.

Upon a user selecting a group label 333, the client device 300 may display the graphical user interface 304 having the first area 306a and second area 306b that shows the presentation feed corresponding to the selected group label 333, as shown in FIG. 16B. To illustrate, upon a user selecting the friends group label 333 in FIG. 16A, the client device 300 displays the graphical user interface 304 in FIG. 16B that shows the friends presentation feed 308a in the first area 306a corresponding content presentations 320a-b in the second area 306b. Further, the first area 306a can also include a social networking option 394 that causes the client device 300 to return to the fourth interface 309 displayed in FIG. 16A.

FIGS. 17A-17B show another embodiment of the client device 300 providing status badges to a user within a social networking system application. Like FIG. 16A, FIG. 17A displays the fourth interface 309 of a social networking system application. In some embodiments, as FIG. 17A illustrates, the fourth interface 309 includes a presentation feed notification 379, which corresponds to a presentation feed 308 within the content presentation system 102. The presentation feed notification 379 may be a graphic or icon representing a group associated with a presentation feed. Alternatively, the name of a group may itself be a graphic or icon. Upon the user selecting the presentation feed notification 379 in FIG. 17A, the client device 300 may navigate the user to the octopus presentation feed 308 shown in FIG. 17B.

Along with a name or a graphic, the presentation feed notification 379 in FIG. 17A may also include a number indicating the number of unviewed content items in the corresponding presentation feed. In one or more embodiments, when a user selects the presentation feed notification 379, not only does the client device 300 navigate the user to the corresponding octopus presentation feed 308, but the client device 300 also navigates to the next unviewed content item (e.g., the second content item 322b) in the octopus presentation feed 308, as described above. Further, upon navigating to the next unviewed content item, the client device 300 can emphasize or signal the unviewed content item, as explained previously.

As shown in FIG. 17B, even though the client device 300 navigates from the fourth interface 309 to the graphical user interface 304, the presentation feed notification 379 remains in the same position. As such, even when the client device 300 passes the user between various user interfaces (or various applications), the presentation feed notification 379 provides the user with a consistent navigational guide. In a similar manner, upon the client device 300 navigating to the next unviewed content item, the client device 300 updates the number of unviewed content items displayed in the presentation feed notification 379. Further, and as described above, the user can interact with the presentation feed notification 379 to navigate to additional unviewed content items in the octopus presentation feed 308.

FIGS. 18A-18B illustrate an embodiment of the client device 300 for providing status badges to a user within a social networking system application indicating a number of active co-users within the content presentation system 102. Similar to FIG. 16A, FIG. 18A displays the fourth interface 309 showing a social networking system application. In some embodiments, as FIG. 18A illustrates, the fourth interface 309 includes an active user count notification 381, which corresponds to the number of active users within the content presentation system 102.

In some embodiments, upon selecting the active user count notification 381, the client device 300 displays the graphical user interface 304 associated with the content presentation system 102 that includes a summary page 399, as shown in FIG. 18B. Alternatively, the user can navigate within the social networking system (e.g., swipe left or right) to access the summary page 399. Further, while the summary page 399 is shown in connection with a social networking system application, one will appreciate that the summary page may be independent of the social networking system. For example, the summary page 399 may be one of the presentation feeds presented as part of the content presentation system 102 described above.

As shown in FIG. 18B, the graphical user interface 304 includes the first area 306a and a seventh area 306g. The first area 306a includes an active users count 375 of active users within the content presentation system 102. The seventh area 306g includes the summary page 399 that includes a presentation feed summary 337 of the groups to which the user belongs. For example, the seventh area 306g shows presentation feed summaries for the groups friends, family, and school.

Within each presentation feed summary 337, the client device 300 displays representative content items 339 of captured image content items from within a corresponding presentation feed. For example, the friends presentation feed summary 337 displays representative content items 339 of pictures included in the friends presentation feed. Further, the friends presentation feed summary 337 displays an active users label 398, which indicates the number of co-users currently active in the friends presentation feed.

In some example embodiments, the user can select a presentation feed summary 337 to have the client device 300 navigate to the corresponding presentation feed. For example, upon a user selecting the friends presentation feed summary 337, the client device can navigate the user to the friends presentation feed shown in FIG. 16B. Additionally, and/or alternatively, the user can select a representative content item 339 within the friends presentation feed summary 337 to have the client device 300 navigate to a corresponding content item.

Figure 19:
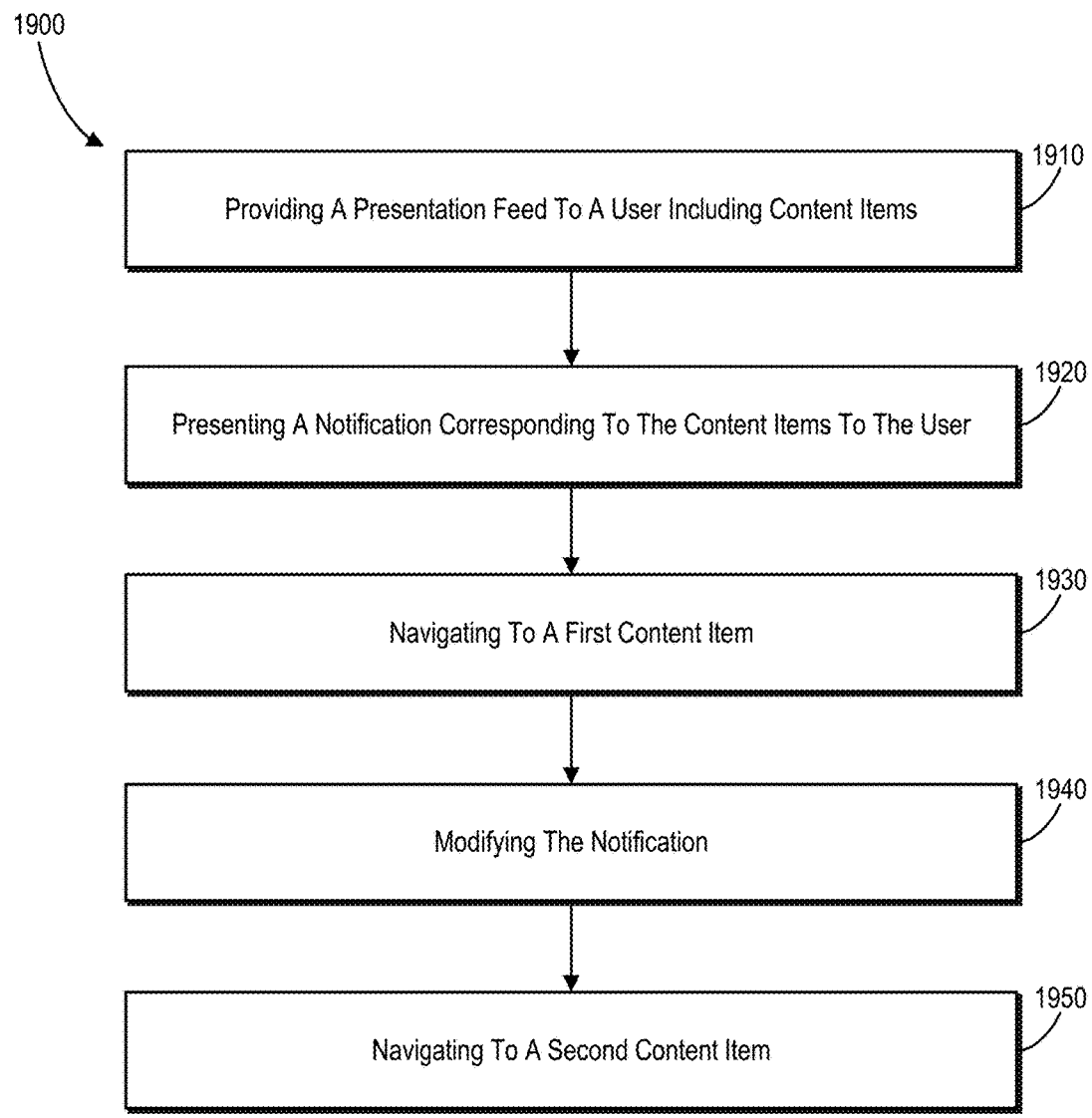
FIG. 19 illustrates a flowchart of a method for providing dynamic notifications to a user in accordance with one or more embodiments described herein.

FIG. 19 illustrates a flowchart of a method 1900 for providing dynamic notifications to a user in accordance with one or more embodiments described herein. In some example embodiments, a client device, such as one of client devices 104, 105, 204, or 300 described herein, performs the method 1900. Further, the client device can be in communication with a content presentation system, such as the content presentation system 102 disclosed herein.

The method 1900 includes an act 1910 of providing a presentation feed 308 to a user including content items 322. In particular, the act 1910 may involve providing, to a user via a client device 300, a presentation feed 308 comprising one or more content presentations 320, the one or more content presentations 320 comprising one or more content items 322. The act 1910 may also involve providing the presentation feed 308 with a graphical user interface 304 of the client device 300, in any suitable manner as described herein.

The method 1900 includes an act 1920 of presenting a notification 378 corresponding to the content items 322 to the user. In particular, the act 1920 may involve presenting, to the user, a notification 378 corresponding to a plurality of content items 322 within the presentation feed 308. For instance, the act 1920 may involve providing a notification that displays a number corresponding to the first content item and the second content item.

The method 1900 includes an act 1930 of navigating to a first content item. In particular, the act 1940 may involve navigating to a first content item of the plurality of content items 322 within the presentation feed 308 upon detecting a first user input with respect to the notification 378. To illustrate, the act 1930 may involve emphasizing the first content item upon navigating to the first content item, in any suitable manner as described herein. Emphasizing the first content item upon navigating to the first content item may include emphasizing the first content item by temporarily enlarging the size of the first content item, pulsing the first content item, changing the color of the first content item, or flashing the first content item.

The method 1900 includes an act 1940 of modifying the notification 378. In particular, the act 1940 may involve modifying the notification 378 based on navigating to the first content item. In some example embodiments, the act 1940 may involve decrementing or subtracting the number displayed in the notification 378 upon navigating to the first content item.

The method 1900 includes an act 1950 of navigating to a second content item. In particular, the act 1950 may involve navigating to a second content item of the plurality of content items 322 within the presentation feed 308 upon detecting user input with respect to the updated notification 378. In one or more embodiments, the act 1950 may further include removing the notification upon navigating to the second content item of the plurality of content items within the presentation feed.

In some example embodiments, the method 1900 may include the act of detecting when a user of a group of users is composing a content item within the presentation feed. Further, the method 1900 may include the act of providing, to the other users in the group of users, a real-time status indication that the user is composing a content item.

In addition to the foregoing, embodiments of the present invention also can be described in terms of flowcharts comprising acts and steps in a method for accomplishing a particular result. For example, FIGS. 9 and 19, which are described above, illustrate flowcharts of exemplary methods in accordance with one or more embodiments of the present invention. The methods described in relation to FIGS. 9 and 19 can be performed with less or more steps/acts or the steps/acts can be performed in differing orders. Additionally, the steps/acts described herein can be repeated or performed in parallel with one another or in parallel with different instances of the same or similar steps/acts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 20:
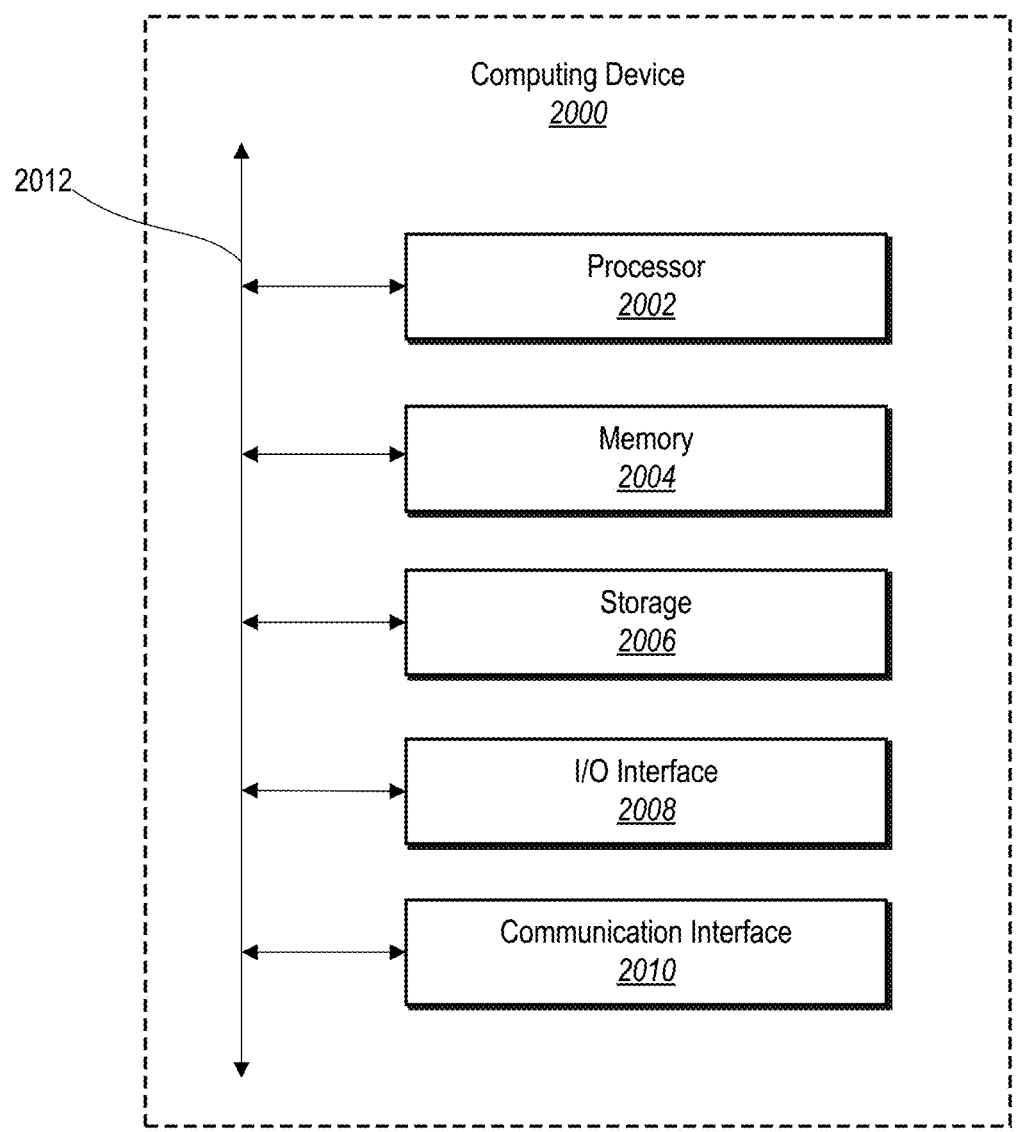
FIG. 20 illustrates a block diagram of a client device in accordance with one or more embodiments described herein.

FIG. 20 illustrates a block diagram of exemplary computing device 2000 that may be configured to perform one or more of the processes described above. One will appreciate that one or more computing devices such as the computing device 2000 may implement the content presentation system 102 and/or computing devices 104, 105, 204, and 300. As shown by FIG. 20, the computing device 2000 can comprise a processor 2002, a memory 2004, a storage device 2006, an I/O interface 2008, and a communication interface 2010, which may be communicatively coupled by way of a communication infrastructure 2012. While an exemplary computing device 2000 is shown in FIG. 20, the components illustrated in FIG. 20 are not intended to be limiting. Additional or alternative components may be used in other embodiments. Furthermore, in certain embodiments, the computing device 2000 can include fewer components than those shown in FIG. 20. Components of the computing device 2000 shown in FIG. 20 will now be described in additional detail.

In one or more embodiments, the processor 2002 includes hardware for executing instructions, such as those making up a computer program. As an example and not by way of limitation, to execute instructions, the processor 2002 may retrieve (or fetch) the instructions from an internal register, an internal cache, the memory 2004, or the storage device 2006 and decode and execute them. In one or more embodiments, the processor 2002 may include one or more internal caches for data, instructions, or addresses. As an example and not by way of limitation, the processor 2002 may include one or more instruction caches, one or more data caches, and one or more translation lookaside buffers (TLBs). Instructions in the instruction caches may be copies of instructions in the memory 2004 or the storage 2006.

The memory 2004 may be used for storing data, metadata, and programs for execution by the processor(s). The memory 2004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 2004 may be internal or distributed memory.

The storage device 2006 includes storage for storing data or instructions. As an example and not by way of limitation, storage device 2006 can comprise a non-transitory storage medium described above. The storage device 2006 may include a hard disk drive (HDD), a floppy disk drive, flash memory, an optical disc, a magneto-optical disc, magnetic tape, or a Universal Serial Bus (USB) drive or a combination of two or more of these. The storage device 2006 may include removable or non-removable (or fixed) media, where appropriate. The storage device 2006 may be internal or external to the computing device 2000. In one or more embodiments, the storage device 2006 is non-volatile, solid-state memory. In other embodiments, the storage device 2006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 2008 allows a user to provide input to, receive output from, and otherwise transfer data to and receive data from computing device 2000. The I/O interface 2008 may include a mouse, a keypad or a keyboard, a touch screen, a camera, an optical scanner, network interface, modem, other known I/O devices or a combination of such I/O interfaces. The I/O interface 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 2008 is configured to provide graphical data to a display for presentation to a user. The graphical data may be representative of one or more graphical user interfaces and/or any other graphical content as may serve a particular implementation.

The communication interface 2010 can include hardware, software, or both. In any event, the communication interface 2010 can provide one or more interfaces for communication (such as, for example, packet-based communication) between the computing device 2000 and one or more other computing devices or networks. As an example and not by way of limitation, the communication interface 2010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 2010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 2010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof Additionally, the communication interface 2010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 2012 may include hardware, software, or both that couples components of the computing device 2000 to each other. As an example and not by way of limitation, the communication infrastructure 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof As mentioned above, the communication system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 21:
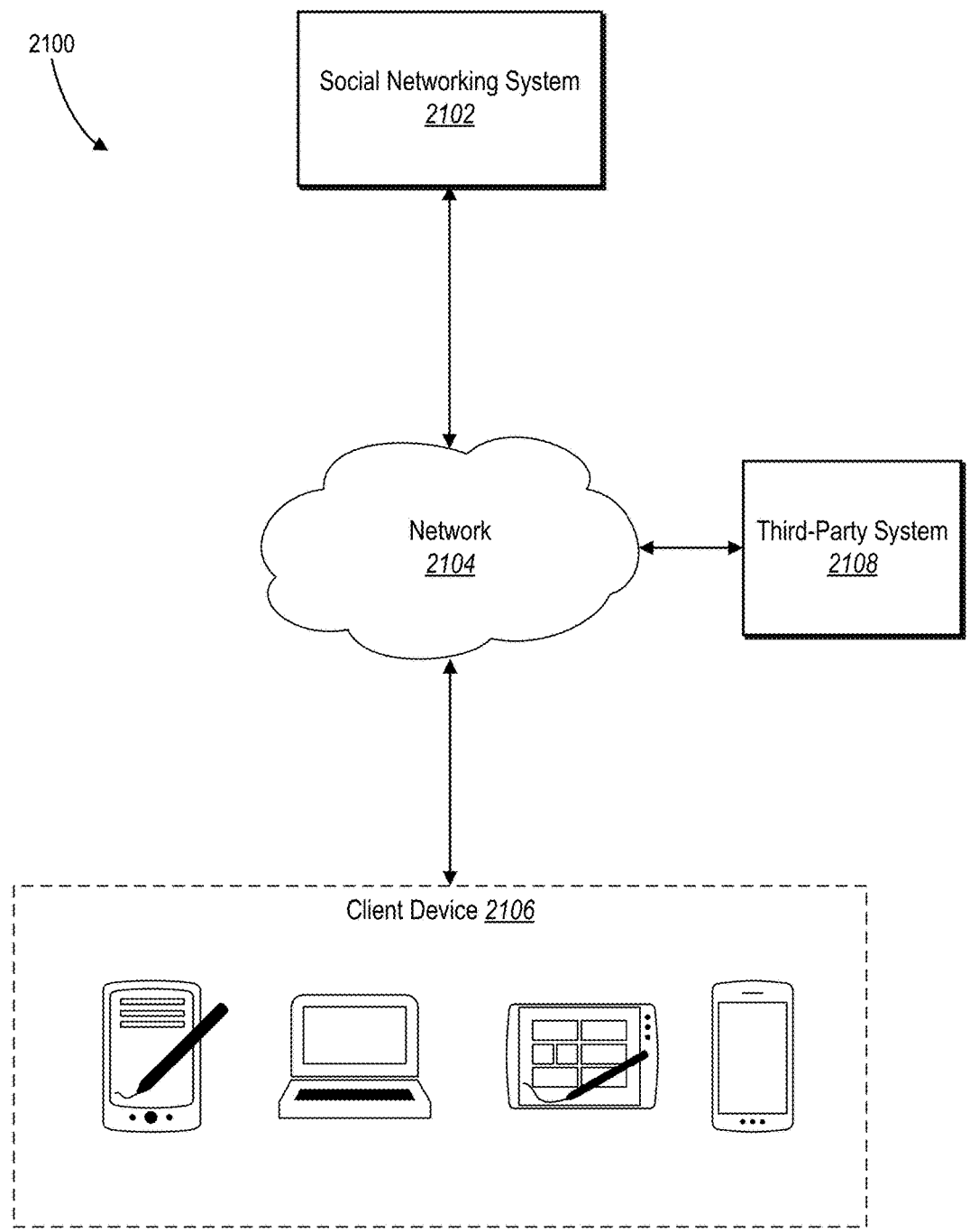
FIG. 21 illustrates a network environment of a social networking system in accordance with one or more embodiments described herein.

FIG. 21 illustrates an example network environment 2100 of a social networking system. Network environment 2100 includes a client system 2106, a social networking system 2102, and a third-party system 2108 connected to each other by a network 2104. Although FIG. 21 illustrates a particular arrangement of client system 2106, social networking system 2102, third-party system 2108, and network 2104, this disclosure contemplates any suitable arrangement of client system 2106, social networking system 2102, third-party system 2108, and network 2104. As an example and not by way of limitation, two or more of client system 2106, social networking system 2102, and third-party system 2108 may be connected to each other directly, bypassing network 2104. As another example, two or more of client system 2106, social networking system 2102, and third-party system 2108 may be physically or logically co-located with each other in whole, or in part. Moreover, although FIG. 21 illustrates a particular number of client systems 2106, social networking systems 2102, third-party systems 2108, and networks 2104, this disclosure contemplates any suitable number of client systems 2106, social networking systems 2102, third-party systems 2108, and networks 2104. As an example and not by way of limitation, network environment 2100 may include multiple client system 2106, social networking systems 2102, third-party systems 2108, and networks 2104.

This disclosure contemplates any suitable network 2104. As an example and not by way of limitation, one or more portions of network 2104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 2104 may include one or more networks 2104.

Links may connect client system 2106, social networking system 2102, and third-party system 2108 to communication network 2104 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 2100. One or more first links may differ in one or more respects from one or more second links.

In particular embodiments, client system 2106 may be an electronic device including hardware, software, or embedded logic components or a combination of two or more such components and capable of carrying out the appropriate functionalities implemented or supported by client system 2106. As an example and not by way of limitation, a client system 2106 may include any of the client devices or systems described in the above figures. A client system 2106 may enable a network user at client system 2106 to access network 2104. A client system 2106 may enable its user to communicate with other users at other client systems 2106.

In particular embodiments, client system 2106 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 2106 may enter a Uniform Resource Locator (URL) or other address directing the web browser to a particular server (such as server, or a server associated with a third-party system 2108), and the web browser may generate a Hyper Text Transfer Protocol (HTTP) request and communicate the HTTP request to server. The server may accept the HTTP request and communicate to client system 2106 one or more Hyper Text Markup Language (HTML) files responsive to the HTTP request. Client system 2106 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 2102 may be a network-addressable computing system that can host an online social network. Social networking system 2102 may generate, store, receive, and send social-networking data, such as, for example, user-profile data, concept-profile data, social-graph information, or other suitable data related to the online social network. Social networking system 2102 may be accessed by the other components of network environment 2100 either directly or via network 2104. In particular embodiments, social networking system 2102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 2102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 2106, a social networking system 2102, or a third-party system 2108 to manage, retrieve, modify, add, or delete, the information stored in data store.

In particular embodiments, social networking system 2102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 2102 may provide users of the online social network the ability to communicate and interact with other users. In particular embodiments, users may join the online social network via social networking system 2102 and then add connections (e.g., relationships) to a number of other users of social networking system 2102 whom they want to be connected to. Herein, the term "friend" may refer to any other user of social networking system 2102 with which a user has formed a connection, association, or relationship via social networking system 2102.

In particular embodiments, social networking system 2102 may provide users with the ability to take actions on various types of items or objects, supported by social networking system 2102. As an example and not by way of limitation, the items and objects may include groups or social networks to which users of social networking system 2102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 2102 or by an external system of third-party system 2108, which is separate from social networking system 2102 and coupled to social networking system 2102 via a network 2104.

In particular embodiments, social networking system 2102 may be capable of linking a variety of entities. As an example and not by way of limitation, social networking system 2102 may enable users to interact with each other as well as receive content from third-party systems 2108 or other entities, or to allow users to interact with these entities through an application programming interfaces (API) or other communication channels.

In particular embodiments, a third-party system 2108 may include one or more types of servers, one or more data stores, one or more interfaces, including but not limited to APIs, one or more web services, one or more content sources, one or more networks, or any other suitable components, e.g., that servers may communicate with. A third-party system 2108 may be operated by a different entity from an entity operating social networking system 2102. In particular embodiments, however, social networking system 2102 and third-party systems 2108 may operate in conjunction with each other to provide social-networking services to users of social networking system 2102 or third-party systems 2108. In this sense, social networking system 2102 may provide a platform, or backbone, which other systems, such as third-party systems 2108, may use to provide social-networking services and functionality to users across the Internet.

In particular embodiments, a third-party system 2108 may include a third-party content object provider. A third-party content object provider may include one or more sources of content objects, which may be communicated to a client system 2106. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 2102 also includes user-generated content objects, which may enhance a user's interactions with social networking system 2102. User-generated content may include anything a user can add, upload, send, or "post" to social networking system 2102. As an example and not by way of limitation, a user communicates posts to social networking system 2102 from a client system 2106. Posts may include data such as status updates or other textual data, location information, photos, videos, links, music or other similar data or media. Content may also be added to social networking system 2102 by a third-party through a "communication channel," such as a newsfeed or stream.

In particular embodiments, social networking system 2102 may include a variety of servers, sub-systems, programs, modules, logs, and data stores. In particular embodiments, social networking system 2102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 2102 may also include suitable components such as network interfaces, security mechanisms, load balancers, failover servers, management-and-network-operations consoles, other suitable components, or any suitable combination thereof. In particular embodiments, social networking system 2102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 2102 to one or more client systems 2106 or one or more third-party system 2108 via network 2104. The web server may include a mail server or other messaging functionality for receiving and routing messages between social networking system 2102 and one or more client systems 2106. An API-request server may allow a third-party system 2108 to access information from social networking system 2102 by calling one or more APIs. An action logger may be used to receive communications from a web server about a user's actions on or off social networking system 2102. In conjunction with the action log, a third-party-content-object log may be maintained of user exposures to third-party-content objects. A notification controller may provide information regarding content objects to a client system 2106. Information may be pushed to a client system 2106 as notifications, or information may be pulled from client system 2106 responsive to a request received from client system 2106. Authorization servers may be used to enforce one or more privacy settings of the users of social networking system 2102. A privacy setting of a user determines how particular information associated with a user can be shared. The authorization server may allow users to opt in to or opt out of having their actions logged by social networking system 2102 or shared with other systems (e.g., third-party system 2108), such as, for example, by setting appropriate privacy settings. Third-party-content-object stores may be used to store content objects received from third parties, such as a third-party system 2108. Location stores may be used for storing location information received from client systems 2106 associated with users. Advertisement-pricing modules may combine social information, the current time, location information, or other suitable information to provide relevant advertisements, in the form of notifications, to a user.

Figure 22:
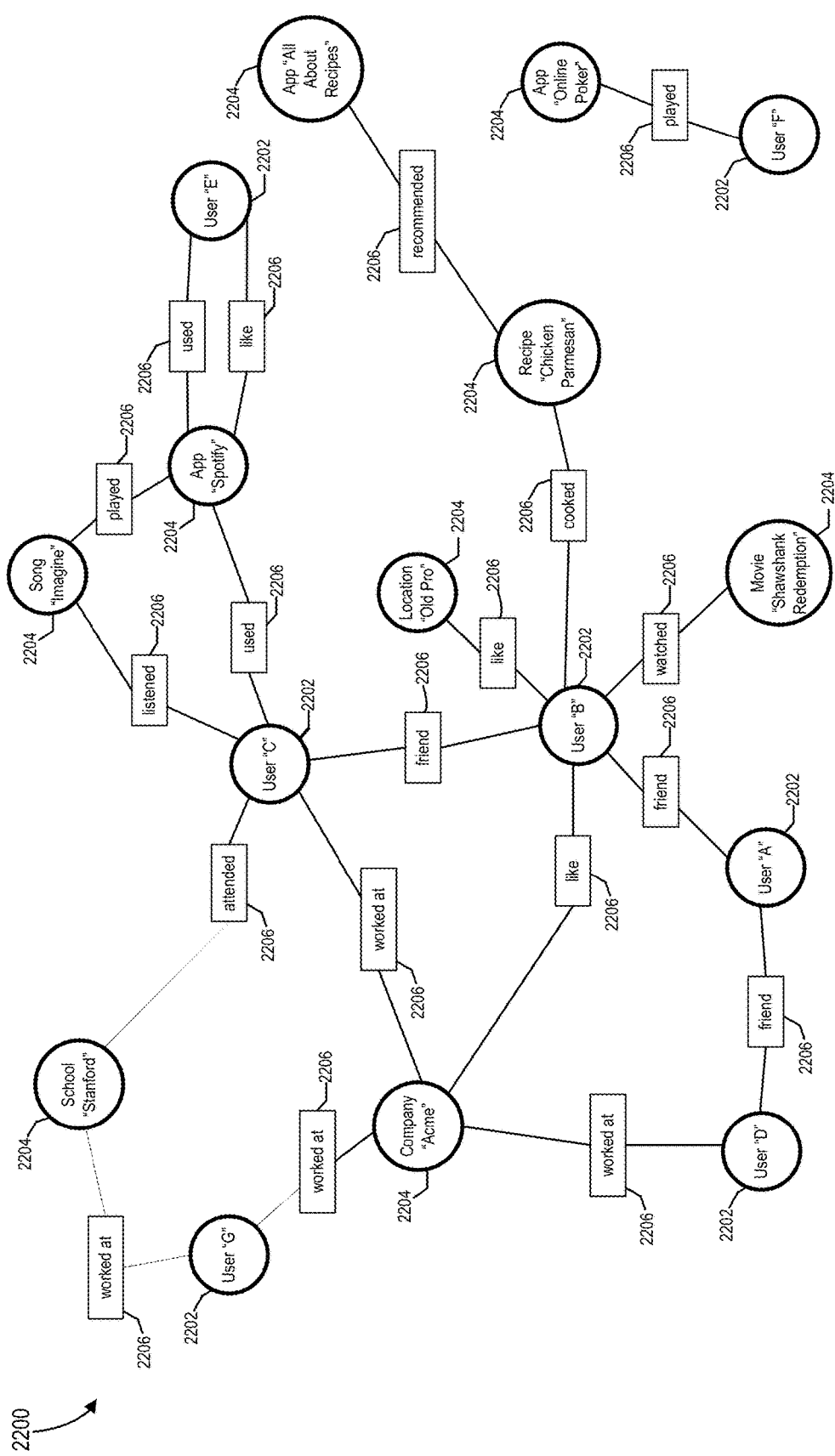
FIG. 22 illustrates an example social graph of a social networking system in accordance with one or more embodiments described herein.

FIG. 22 illustrates example social graph 2200. In particular embodiments, social networking system 2102 may store one or more social graphs 2200 in one or more data stores. In particular embodiments, social graph 2200 may include multiple nodes—which may include multiple user nodes 2202 or multiple concept nodes 2204—and multiple edges 2206 connecting the nodes. Example social graph 2200 illustrated in FIG. 22 is shown, for didactic purposes, in a two-dimensional visual map representation. In particular embodiments, a social networking system 2102, client system 2106, or third-party system 2108 may access social graph 2200 and related social-graph information for suitable applications. The nodes and edges of social graph 2200 may be stored as data objects, for example, in a data store (such as a social-graph database). Such a data store may include one or more searchable or query able indexes of nodes or edges of social graph 2200.

In particular embodiments, a user node 2202 may correspond to a user of social networking system 2102. As an example and not by way of limitation, a user may be an individual (human user), an entity (e.g., an enterprise, business, or third-party application), or a group (e.g., of individuals or entities) that interacts or communicates with or over social networking system 2102. In particular embodiments, when a user registers for an account with social networking system 2102, social networking system 2102 may create a user node 2202 corresponding to the user, and store the user node 2202 in one or more data stores. Users and user nodes 2202 described herein may, where appropriate, refer to registered users and user nodes 2202 associated with registered users. In addition or as an alternative, users and user nodes 2202 described herein may, where appropriate, refer to users that have not registered with social networking system 2102. In particular embodiments, a user node 2202 may be associated with information provided by a user or information gathered by various systems, including social networking system 2102. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 2204 may correspond to a concept. As an example and not by way of limitation, a concept may correspond to a place (such as, for example, a movie theater, restaurant, landmark, or city); a website (such as, for example, a website associated with social-network system 2102 or a third-party website associated with a web-application server); an entity (such as, for example, a person, business, group, sports team, or celebrity); a resource (such as, for example, an audio file, video file, digital photo, text file, structured document, or application) which may be located within social networking system 2102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 2204 may be associated with information of a concept provided by a user or information gathered by various systems, including social networking system 2102. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 2204 may be associated with one or more data objects corresponding to information associated with concept node 2204. In particular embodiments, a concept node 2204 may correspond to one or more webpages.

In particular embodiments, a node in social graph 2200 may represent or be represented by a webpage (which may be referred to as a "profile page"). Profile pages may be hosted by or accessible to social networking system 2102. Profile pages may also be hosted on third-party websites associated with a third-party server 2108. As an example and not by way of limitation, a profile page corresponding to a particular external webpage may be the particular external webpage and the profile page may correspond to a particular concept node 2204. Profile pages may be viewable by all or a selected subset of other users. As an example and not by way of limitation, a user node 2202 may have a corresponding user-profile page in which the corresponding user may add content, make declarations, or otherwise express himself or herself. As another example and not by way of limitation, a concept node 2204 may have a corresponding concept-profile page in which one or more users may add content, make declarations, or express themselves, particularly in relation to the concept corresponding to concept node 2204.

In particular embodiments, a concept node 2204 may represent a third-party webpage or resource hosted by a third-party system 2108. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 2106 to send to social networking system 2102 a message indicating the user's action. In response to the message, social networking system 2102 may create an edge (e.g., an "eat" edge) between a user node 2202 corresponding to the user and a concept node 2204 corresponding to the third-party webpage or resource and store edge 2206 in one or more data stores.

In particular embodiments, a pair of nodes in social graph 2200 may be connected to each other by one or more edges 2206. An edge 2206 connecting a pair of nodes may represent a relationship between the pair of nodes. In particular embodiments, an edge 2206 may include or represent one or more data objects or attributes corresponding to the relationship between a pair of nodes. As an example and not by way of limitation, a first user may indicate that a second user is a "friend" of the first user. In response to this indication, social networking system 2102 may send a "friend request" to the second user. If the second user confirms the "friend request," social networking system 2102 may create an edge 2206 connecting the first user's user node 2202 to the second user's user node 2202 in social graph 2200 and store edge 2206 as social-graph information in one or more of data stores. In the example of FIG. 22, social graph 2200 includes an edge 2206 indicating a friend relation between user nodes 2202 of user "A" and user "B" and an edge indicating a friend relation between user nodes 2202 of user "C" and user "B." Although this disclosure describes or illustrates particular edges 2206 with particular attributes connecting particular user nodes 2202, this disclosure contemplates any suitable edges 2206 with any suitable attributes connecting user nodes 2202. As an example and not by way of limitation, an edge 2206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 2200 by one or more edges 2206.

In particular embodiments, an edge 2206 between a user node 2202 and a concept node 2204 may represent a particular action or activity performed by a user associated with user node 2202 toward a concept associated with a concept node 2204. As an example and not by way of limitation, as illustrated in FIG. 22, a user may "like," "attended," "played," "listened," "cooked," "worked at," or "watched" a concept, each of which may correspond to a edge type or subtype. A concept-profile page corresponding to a concept node 2204 may include, for example, a selectable "check in" icon (such as, for example, a clickable "check in" icon) or a selectable "add to favorites" icon. Similarly, after a user clicks these icons, social networking system 2102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 2102 may create a "listened" edge 2206 and a "used" edge (as illustrated in FIG. 22) between user nodes 2202 corresponding to the user and concept nodes 2204 corresponding to the song and application to indicate that the user listened to the song and used the application. Moreover, social networking system 2102 may create a "played" edge 2206 (as illustrated in FIG. 22) between concept nodes 2204 corresponding to the song and the application to indicate that the particular song was played by the particular application. In this case, "played" edge 2206 corresponds to an action performed by an external application (SPOTIFY) on an external audio file (the song "Imagine"). Although this disclosure describes particular edges 2206 with particular attributes connecting user nodes 2202 and concept nodes 2204, this disclosure contemplates any suitable edges 2206 with any suitable attributes connecting user nodes 2202 and concept nodes 2204. Moreover, although this disclosure describes edges between a user node 2202 and a concept node 2204 representing a single relationship, this disclosure contemplates edges between a user node 2202 and a concept node 2204 representing one or more relationships. As an example and not by way of limitation, an edge 2206 may represent both that a user likes and has used at a particular concept. Alternatively, another edge 2206 may represent each type of relationship (or multiples of a single relationship) between a user node 2202 and a concept node 2204 (as illustrated in FIG. 22 between user node 2202 for user "E" and concept node 2204 for "SPOTIFY").

In particular embodiments, social networking system 2102 may create an edge 2206 between a user node 2202 and a concept node 2204 in social graph 2200. As an example and not by way of limitation, a user viewing a concept-profile page (such as, for example, by using a web browser or a special-purpose application hosted by the user's client system 2106) may indicate that he or she likes the concept represented by the concept node 2204 by clicking or selecting a "Like" icon, which may cause the user's client system 2106 to send to social networking system 2102 a message indicating the user's liking of the concept associated with the concept-profile page. In response to the message, social networking system 2102 may create an edge 2206 between user node 2202 associated with the user and concept node 2204, as illustrated by "like" edge 2206 between the user and concept node 2204. In particular embodiments, social networking system 2102 may store an edge 2206 in one or more data stores. In particular embodiments, an edge 2206 may be automatically formed by social networking system 2102 in response to a particular user action. As an example and not by way of limitation, if a first user uploads a picture, watches a movie, or listens to a song, an edge 2206 may be formed between user node 2202 corresponding to the first user and concept nodes 2204 corresponding to those concepts. Although this disclosure describes forming particular edges 2206 in particular manners, this disclosure contemplates forming any suitable edges 2206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 2102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 2102 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 2102) or RSVP (e.g., through social networking system 2102) to an event associated with the advertisement. In addition or as an alternative, an advertisement may include social-networking-system context directed to the user. As an example and not by way of limitation, an advertisement may display information about a friend of the user within social networking system 2102 who has taken an action associated with the subject matter of the advertisement.

In particular embodiments, social networking system 2102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 2108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 2102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 2102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 220%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 2102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 2102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 2102 may calculate a coefficient based on a user's actions. Social networking system 2102 may monitor such actions on the online social network, on a third-party system 2108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 2102 may calculate a coefficient based on the user's actions with particular types of content. The content may be associated with the online social network, a third-party system 2108, or another suitable system. The content may include users, profile pages, posts, news stories, headlines, instant messages, chat room conversations, emails, advertisements, pictures, video, music, other suitable objects, or any combination thereof. Social networking system 2102 may analyze a user's actions to determine whether one or more of the actions indicate an affinity for subject matter, content, other users, and so forth. As an example and not by way of limitation, if a user may make frequently posts content related to "coffee" or variants thereof, social networking system 2102 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 2102 may calculate a coefficient based on the type of relationship between particular objects. Referencing the social graph 2200, social networking system 2102 may analyze the number and/or type of edges 2206 connecting particular user nodes 2202 and concept nodes 2204 when calculating a coefficient. As an example and not by way of limitation, user nodes 2202 that are connected by a spouse-type edge (representing that the two users are married) may be assigned a higher coefficient than a user nodes 2202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 2102 may determine that the user has a higher coefficient with respect to the first photo than the second photo because having a tagged-in-type relationship with content may be assigned a higher weight and/or rating than having a like-type relationship with content. In particular embodiments, social networking system 2102 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 2102 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 2200. As an example and not by way of limitation, social-graph entities that are closer in the social graph 2200 (i.e., fewer degrees of separation) may have a higher coefficient than entities that are further apart in the social graph 2200.

In particular embodiments, social networking system 2102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 2106 of the user). A first user may be more interested in other users or concepts that are closer to the first user. As an example and not by way of limitation, if a user is one mile from an airport and two miles from a gas station, social networking system 2102 may determine that the user has a higher coefficient for the airport than the gas station based on the proximity of the airport to the user.

In particular embodiments, social networking system 2102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 2102 may provide information that is relevant to user's interests and current circumstances, increasing the likelihood that they will find such information of interest. In particular embodiments, social networking system 2102 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 2102 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 2102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 2108 (e.g., via an API or other communication channel), or from another suitable system. In response to the request, social networking system 2102 may calculate the coefficient (or access the coefficient information if it has previously been calculated and stored). In particular embodiments, social networking system 2102 may measure an affinity with respect to a particular process. Different processes (both internal and external to the online social network) may request a coefficient for a particular object or set of objects. Social networking system 2102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 20, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 2204 corresponding to a particular photo may have a privacy setting specifying that the photo may only be accessed by users tagged in the photo and their friends. In particular embodiments, privacy settings may allow users to opt in or opt out of having their actions logged by social networking system 2102 or shared with other systems (e.g., third-party system 2108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 2108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 2102 may send a request to the data store for the object. The request may identify the user associated with the request and may only be sent to the user (or a client system 2106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
providing, on a client device associated with a user, a content item comprising a plurality of content elements;
detecting a continuous user input with respect to a selection element corresponding to a first content element of the plurality of content elements within the content item;
replacing the selection element corresponding to the first content element with a control element corresponding to the first content element based on the continuous user input with respect to the selection element;
detecting a first continuous user input;
modifying, by at least one processor, a first attribute or a second attribute of the first content element based on detected movement types of the first continuous user input;
adding a color layer as an additional content element to the content item based on detecting a second continuous user input to a second content element of the content item;
modifying a color of the color layer based on a first type of movement detected from the second continuous user input; and
modifying a transparency of the color layer based on a second type of movement detected from the second continuous user input.

2. The method of claim 1, wherein:
the first content element is text within the content item;
the first type of movement is a rotational movement;
the second type of movement is linear movement; and
the client device is a mobile client device that captured the content item.

3. The method of claim 2, wherein the first attribute is a color of the text, and wherein modifying the first attribute of the first content element based on the first type of movement comprises changing the color of the text in response to the rotational movement without modifying attributes of other content elements within the content item.

4. The method of claim 3, wherein the second attribute is a color saturation of the text, and wherein modifying the second attribute of the first content element based on the second type of movement comprises changing the color saturation of the text in response to the linear movement without modifying attributes of other content elements within the content item.

5. The method of claim 4, wherein the rotational movement and the linear movement are relative to a focal point within the content item, and wherein the focal point corresponds to a location of the control element corresponding to the first content element.

6. The method of claim 2, further comprising:
detecting a second continuous user input with respect to a second selection element corresponding to a second content element of the plurality of content elements within the content item;
replacing the second selection element corresponding to the second content element with a second control element corresponding to the second content element based on the second continuous user input with respect to the second selection element;
detecting a first type of movement of the second continuous user input;
modifying a first attribute of the second content element based on the first type of movement;
detecting a second type of movement of the second continuous user input; and
modifying a second attribute of the second content element based on the second type of movement, wherein the first attribute and the second attribute of the second content element are modified without modifying attributes of the first content element within the content item.

7. The method of claim 1, wherein:
the first type of movement detected from the second continuous user input comprises a horizontal movement of the second continuous user input; and
the second type of movement detected from the second continuous user input comprises a vertical movement of the second continuous user input.

8. The method of claim 7, wherein modifying the color based on the horizontal movement of the second continuous user input comprises changing the color of the color layer based on a horizontal distance of the horizontal movement from a focal point.

9. The method of claim 7, wherein modifying the transparency based on the vertical movement of the second continuous user input comprises changing opacity of the color layer based on a vertical distance of the vertical movement from a focal point.

10. The method of claim 9, wherein the focal point is centered on the content item.

11. The method of claim 1, further comprising:
providing, to the user via the client device, a presentation feed comprising content presentations, the content presentations comprising one or more content items, wherein a first content presentation of the content presentations is associated with the content item having the plurality of content elements.

12. The method of claim 11, further comprising resizing a vertical height of the content item within the first content presentation of the content presentations based on receiving additional user input to resize the content item, wherein the presentation feed is arranged in a vertically with the content presentations stacked on top of each other.

13. A system comprising:
at least one processor; and
at least one non-transitory computer readable storage medium storing instructions thereon that, when executed by the at least one processor, cause the system to:
provide, on a client device associated with a user, a content item comprising a plurality of content elements;
detect a continuous user input with respect to a selection element corresponding to a first content element of the plurality of content elements within the content item;
replace the selection element corresponding to the first content element with a control element corresponding to the first content element based on the continuous user input with respect to the selection element;
detect a first continuous user input;
modify a first attribute or a second attribute of the first content element based on detected movement types of the first continuous user input;
adding a color layer as an additional content element to the content item based on detecting a second continuous user input to a second content element of the content item;
modifying a color of the color layer based on a first type of movement detected from the second continuous user input; and
modifying a transparency of the color layer based on a second type of movement detected from the second continuous user input.

14. The system of claim 13, further comprising instructions that, when executed by the at least one processor, cause the system to continue to detect the continuous user input over a period of time starting from detecting a press event and ending at detecting a release event.

15. The system of claim 13, further comprising instructions that, when executed by the at least one processor, cause the system to continue to add the content item to a content presentation feed that comprises a plurality of content presentations, each of the plurality of content presentations comprising one or more content items.

16. The system of claim 13, further comprising instructions that, when executed by the at least one processor, cause the system to:
present, within the content item, a selectable graphical element having a first visual presentation;
receive an indication of a selection, by the user, of the selectable graphical element having the first visual presentation;
capture, based on receiving the indication of the selection of the selectable graphical element having the first visual presentation, an additional content item via one or more capturing devices on the client device;
update, after capturing the content on the client device and while displaying the captured content on the client device, the selectable graphical element to have a second visual presentation;
receive an indication of a selection, by the user, of the updated selectable graphical element having the second visual presentation; and
appending, upon detecting selection of the second visual presentation the additional content item comprising the captured content to a content presentation that comprises the content item.

17. The system of claim 16, further comprising instructions that, when executed by the at least one processor, cause the system to share the additional content item within the content presentation with one or more other users.

18. A non-transitory computer readable medium storing instructions thereon that, when executed by at least one processor, cause a computer system to:
provide, on a client device associated with a user, a content item comprising a plurality of content elements;
detect a continuous user input with respect to a selection element corresponding to a first content element of the plurality of content elements within the content item;
replace the selection element corresponding to the first content element with a control element corresponding to the first content element based on the continuous user input with respect to the selection element;
detect a first continuous user input;
modify a first attribute or a second attribute of the first content element based on detected movement types of the first continuous user input;
adding a color layer as an additional content element to the content item based on detecting a second continuous user input to a second content element of the content item;
modifying a color of the color layer based on a first type of movement detected from the second continuous user input; and
modifying a transparency of the color layer based on a second type of movement detected from the second continuous user input.

19. The non-transitory computer readable medium of claim 18, wherein:
the first type of movement detected from the second continuous user input comprises a horizontal movement of the second continuous user input; and
the second type of movement detected from the second continuous user input comprises a vertical movement of the second continuous user input.

20. The non-transitory computer readable medium of claim 19, wherein:
modifying the color based on the horizontal movement of the second continuous user input comprises changing the color of the color layer based on a horizontal distance of the horizontal movement from a focal point; and
modifying the transparency based on the vertical movement of the second continuous user input comprises changing an opacity of the color layer based on a vertical distance of the vertical movement from the focal point.

* * * * *